(12) United States Patent
Seki

(10) Patent No.: US 8,359,943 B2
(45) Date of Patent: Jan. 29, 2013

(54) GEARSHIFT DEVICE

(75) Inventor: Yoshiyuki Seki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 1056 days.

(21) Appl. No.: 12/262,293

(22) Filed: Oct. 31, 2008

(65) Prior Publication Data

US 2009/0107287 A1 Apr. 30, 2009

(30) Foreign Application Priority Data

Oct. 31, 2007 (JP) .................................. 2007-284055
Oct. 31, 2007 (JP) .................................. 2007-284056

(51) Int. Cl.
*F16H 59/04* (2006.01)

(52) U.S. Cl. ..................................... 74/473.3; 74/473.21

(58) Field of Classification Search .................. 74/10 R, 74/10.2, 473.1, 473.12, 473.3, 473.21, 473.22, 74/553, 469, 480 R, 485, 334, 335; 200/61.88; 340/456

See application file for complete search history.

(56) References Cited

U.S. PATENT DOCUMENTS

| | | | | |
|---|---|---|---|---|
| 4,583,171 A * | 4/1986 | Hara et al. | ........................ | 701/62 |
| 6,046,673 A * | 4/2000 | Michael et al. | ............... | 340/456 |
| 6,360,624 B1 * | 3/2002 | Sedlmaier et al. | .............. | 74/335 |
| 6,500,092 B2 * | 12/2002 | Syamoto | .......................... | 477/99 |
| 6,564,661 B2 * | 5/2003 | DeJonge | ......................... | 74/335 |
| 2002/0152827 A1 * | 10/2002 | Hayashi et al. | .............. | 74/473.3 |
| 2003/0178291 A1 * | 9/2003 | Schilling | ........................ | 200/6 R |
| 2004/0007450 A1 | 1/2004 | Kojima et al. | | |
| 2005/0183523 A1 | 8/2005 | Kojima et al. | | |
| 2005/0183537 A1 | 8/2005 | Kojima et al. | | |
| 2005/0193859 A1 | 9/2005 | Kojima et al. | | |
| 2005/0235769 A1 | 10/2005 | Kliemannel et al. | | |
| 2006/0169085 A1 * | 8/2006 | Peuster | ...................... | 74/473.12 |
| 2007/0101819 A1 * | 5/2007 | Kerber et al. | ................... | 74/335 |
| 2007/0261509 A1 | 11/2007 | Meyer et al. | | |
| 2009/0000407 A1 | 1/2009 | Meyer et al. | | |

FOREIGN PATENT DOCUMENTS

| | | |
|---|---|---|
| DE | 10217614 | 11/2003 |
| JP | 11-306917 | 11/1999 |
| JP | 2002-147594 | 5/2002 |
| JP | 2002-254946 | 9/2002 |

(Continued)

OTHER PUBLICATIONS

European Search Report, dated Aug. 7, 2009, issued in corresponding European Application No. 08 16 8085.

*Primary Examiner* — Richard W Ridley
*Assistant Examiner* — Thomas Diaz
(74) *Attorney, Agent, or Firm* — Saul Ewing LLP

(57) ABSTRACT

A gearshift device for an automatic transmission that prevents inadvertent gearshift operations. The gearshift device includes a shaft-shaped gearshift member partially exposed from a housing so as to be rotatable relative to the housing about a rotation axis and movable sidewards in at least a first direction that intersects the rotation axis. The gearshift member is rotated to a plurality of rotation positions respectively corresponding to the gear positions of the automatic transmission. A movement restriction unit permits movement of the gearshift member in the first direction only when the gearshift member is rotated to a selected one of the rotation positions to determine shifting to the gear position corresponding to the selected one of the rotation positions. A control unit provides the automatic transmission with a gearshift control signal corresponding to the selected one of the rotation positions.

27 Claims, 20 Drawing Sheets

FOREIGN PATENT DOCUMENTS

| | | |
|---|---|---|
| JP | 2002-254954 | 9/2002 |
| JP | 2003-045293 | 2/2003 |
| JP | 2006-264509 | 10/2006 |
| JP | 2008-044540 | 2/2008 |
| WO | 2006/021198 A1 | 3/2006 |
| WO | WO2006050702 * | 5/2006 |

* cited by examiner

Fig.4
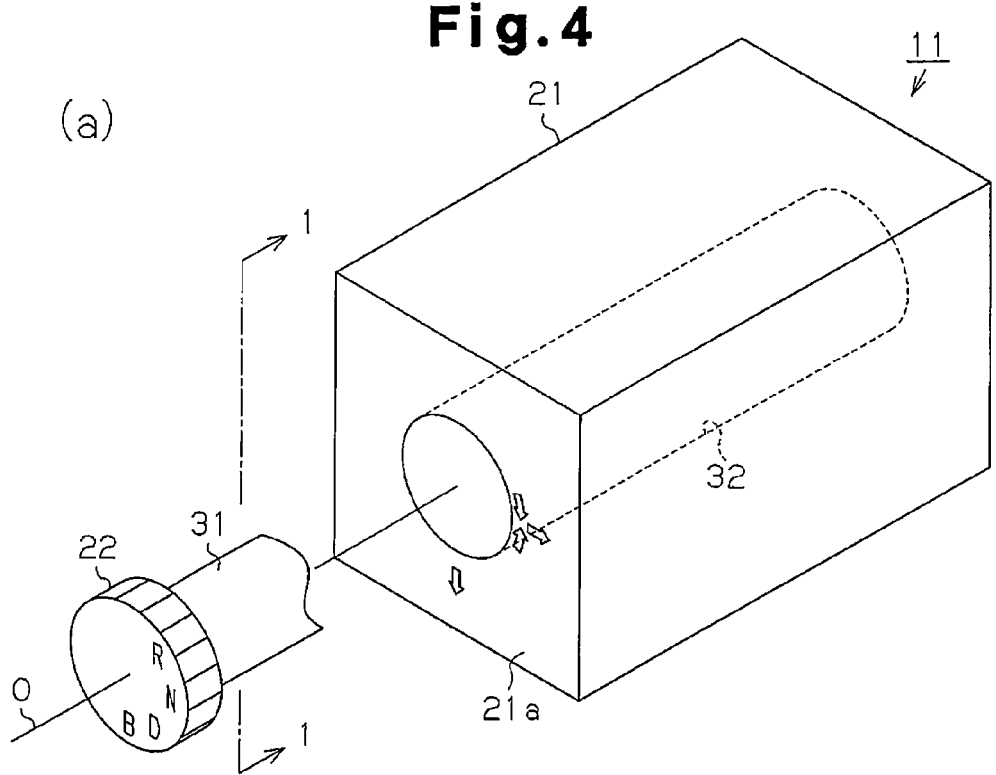
(a)
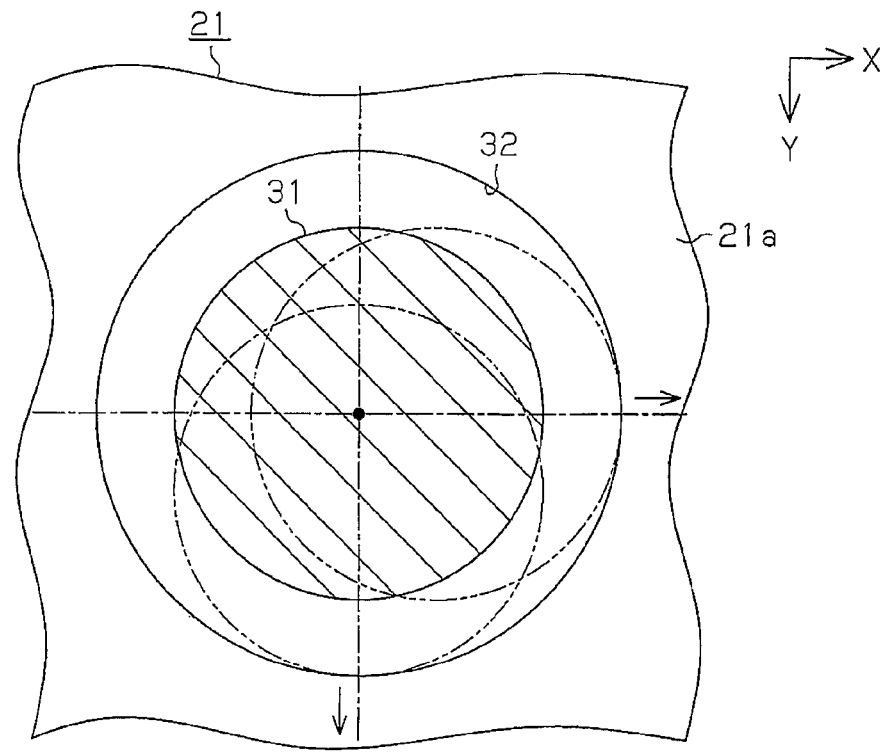
(b)

Fig. 16
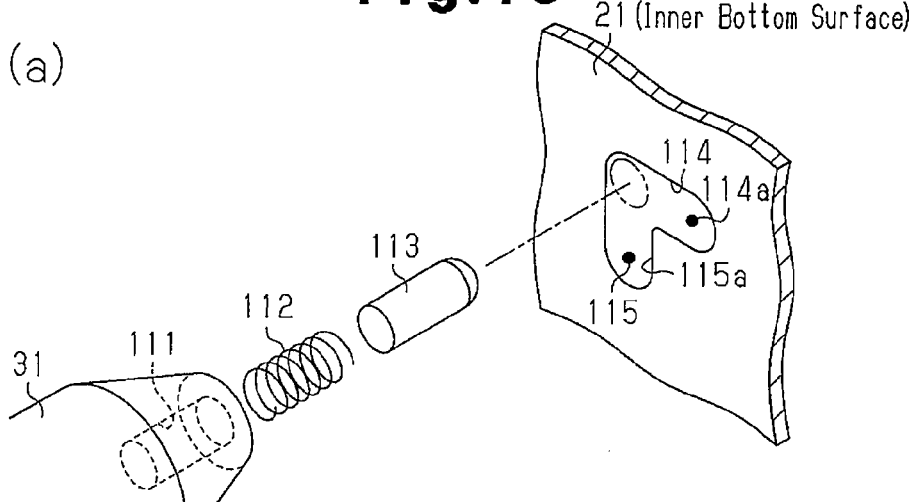
(a)
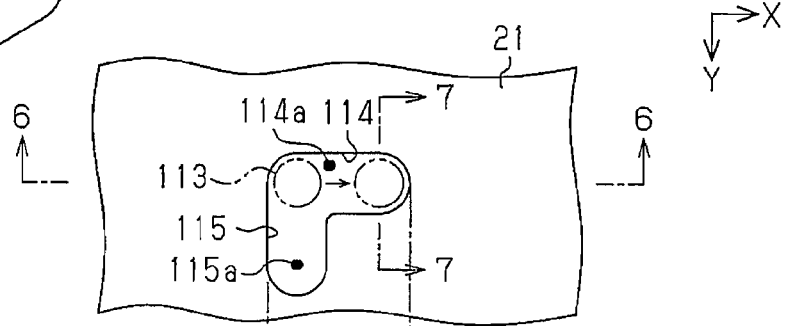
(b)
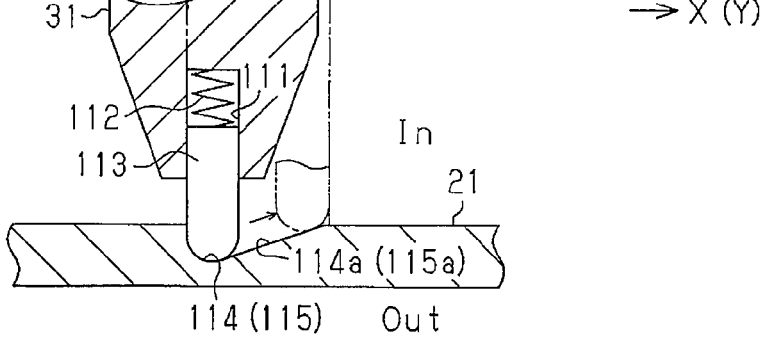
(c)
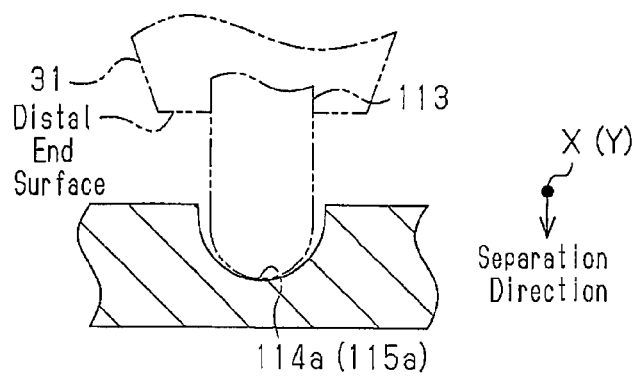
(d)

Fig.17
(a) 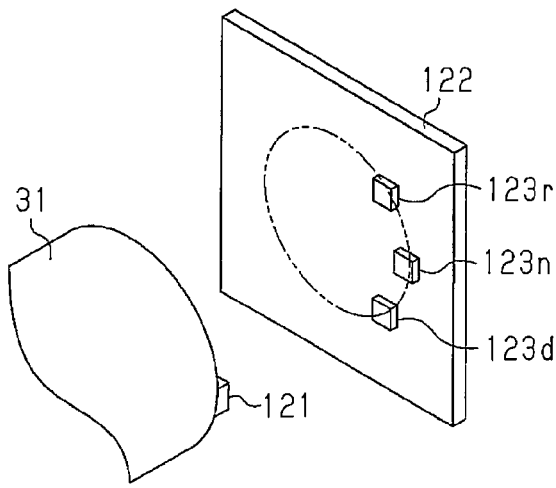
(b) 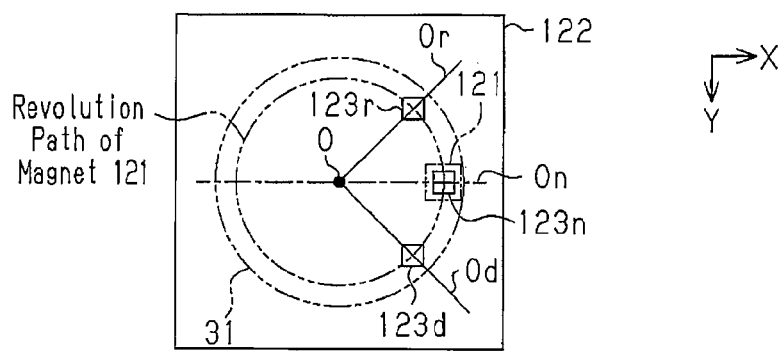
(c) 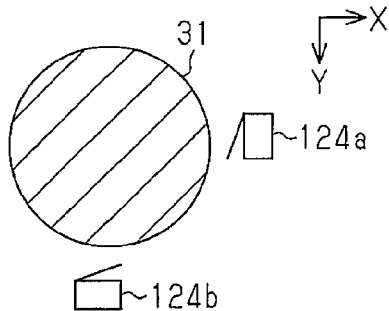 (d) 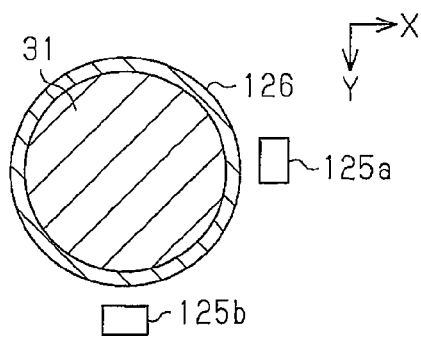
(e) 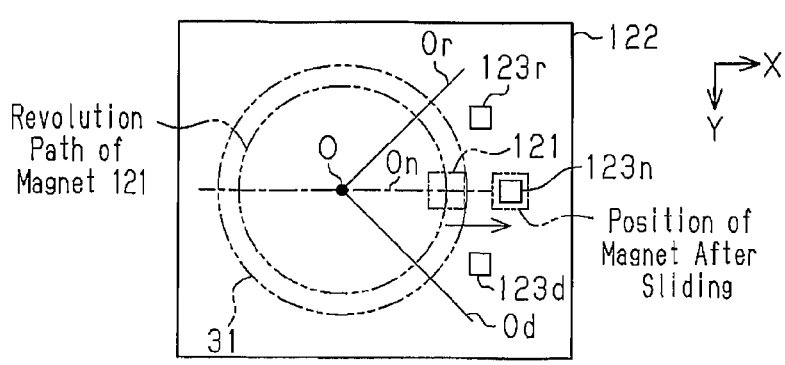

Fig.18
(a)
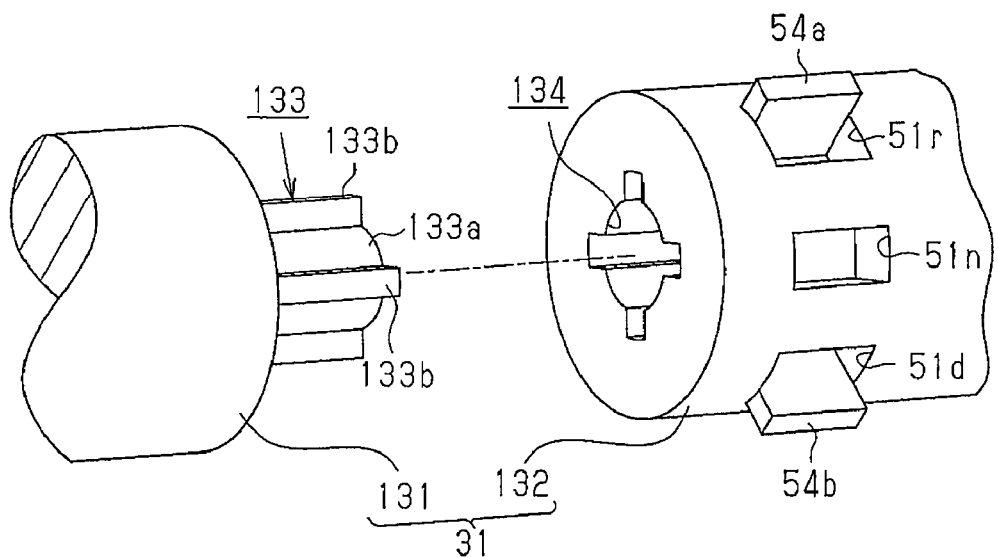
(b)
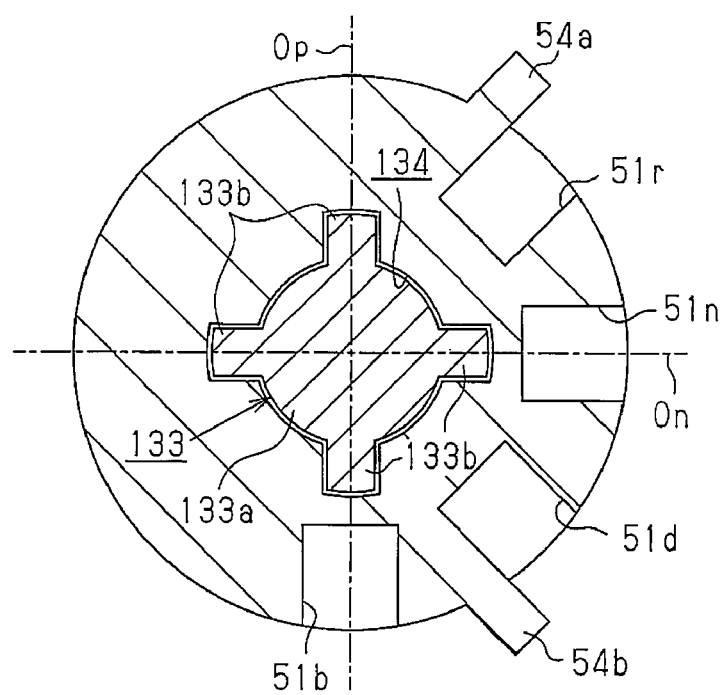

GEARSHIFT DEVICE

CROSS-REFERENCE TO RELATED APPLICATIONS

This application is based upon and claims the benefit of priority from the prior Japanese Patent Applications No. 2007-284055, filed on Oct. 31, 2007, and No. 2007-284056, filed on Oct. 31, 2007, the entire contents of which are incorporated herein by reference.

BACKGROUND OF THE INVENTION

The present invention relates to a gearshift device for switching a gear position of an automatic transmission.

In the prior art, a so-called by-wire gearshift device which is a gearshift device mechanically separated from an automatic transmission in a vehicle is widely used. The gearshift device detects the position of a gearshift lever serving as a gearshift means operated by a user as an electric signal and electronically shifts the gear position (connection state) of the automatic transmission based on the detection signal. A mechanical structure such as link mechanism is thus unnecessary. This reduces limitations on the location of the gearshift device and facilitates miniaturization.

Further miniaturization of the gearshift device is required to provide more space for the passenger compartment, reduce the space occupied by the gearshift device, and other reasons. To satisfy such a requirement, a rotary type gearshift knob, which is rotatable relative to an object on which it is arranged, may be used as the gearshift means in place of the above-described gearshift lever, as described in, for example, Japanese Laid-Open Patent Publication No. 2002-254946. Such a knob is merely rotated about a single axis. Thus, less space is occupied by the gearshift device compared to the above-described gearshift lever. More specifically, when using a gearshift lever, a gearshift gate would be necessary to guide the lever in a predetermined direction, whereas such guiding means is unnecessary when using the rotary gearshift knob.

The gearshift device described in the above publication includes a lock device for restricting rotation of the gearshift knob and serving as an erroneous operation prevention device for preventing erroneous operation of the gearshift knob. The lock device includes an engagement member which, in cooperation with the projection and retraction of a solenoid plunger, moves between an engaged position to engage an engagement portion of the gearshift knob and a disengaged position disengaged from the engagement portion. Rotation of the gearshift knob is restricted when the engagement member is held at the engaged position. Rotation of the gearshift knob is permitted when the engagement member is held at the disengaged position.

For instance, when the gearshift knob is held at a parking position, the engagement member holds the gearshift knob at the engaged position to restrict rotation of the gearshift knob. When driving the vehicle, the rotation restriction of the gearshift knob is canceled in the following manner. When depression of a brake pedal is detected in a state in which the engine has been started, the solenoid is driven to move the engagement member from the engaged position to the disengaged position. The gear position of the automatic transmission is then shifted to a position corresponding to the position of the gearshift knob when the knob is rotated.

In the gearshift device described in the above publication, the rotation restriction of the gearshift knob cannot be canceled by just operating the knob. However, for example, when the brake pedal is inadvertently depressed, the gearshift knob may be unintentionally rotated. The gearshift knob may also be rotated in such an unintentional manner when the rotation of the gearshift knob cannot be restricted for one reason or the other such as failure of the solenoid. Therefore, in the gearshift device of the above publication, there still remains the possibility of erroneous operation of the gearshift knob. There is thus still room for improvement in this respect.

SUMMARY OF THE INVENTION

Accordingly, it is an object of the present invention to provide a gearshift device ensuring the prevention of unintentional gearshift operations.

One aspect of the present invention is a by-wire gearshift device for shifting gear positions of an automatic transmission for a vehicle. The gearshift device includes a housing fixed to the vehicle. A shaft-shaped gearshift member is arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission. A movement restriction unit is arranged between the gearshift member and the housing which permits movement of the gearshift member in the first direction only when the gearshift member is rotated to a selected one of the rotation positions to determine shifting to the gear position corresponding to the selected one of the rotation positions. A detector detects movement of the gearshift member in the first direction and generates a first detection signal in accordance with the selected one of the rotation positions. A control unit generates and provides the automatic transmission with a gearshift control signal corresponding to the selected one of the rotation positions based on the first detection signal from the detector.

A further aspect of the present invention is a by-wire gearshift device for shifting gear positions of an automatic transmission for a vehicle. The gearshift device includes a housing fixed to the vehicle. A shaft-shaped gearshift member is arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission. A movement restriction unit is arranged between the gearshift member and the housing which permits movement of the gearshift member in the first direction only when the gearshift member is rotated to a selected one of the rotation positions to determine shifting to the gear position corresponding to the selected one of the rotation positions. A detector detects movement of the gearshift member in the first direction and generates a first detection signal in accordance with the selected one of the rotation positions. A movement recovery unit returns the gearshift member to its original position with respect to a movement direction when force applied to the gearshift member in the movement direction is eliminated. A rotation recovery unit returns the gearshift member to its original position with respect to a rotation direction when force applied to the gearshift member in the rotation direction is eliminated. A control unit generates and provides the automatic transmission with a gearshift control signal corresponding to the selected one of the rotation positions based on the first detection signal from the detector.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(a) is a schematic exploded perspective view of the knob and a shaft attached to a housing, and FIG. 4(b) is a cross-sectional view taken along line 1-1 of FIG. 4(a) showing a gap between the shaft and an insertion hole of the housing;

FIG. 16(a) is an exploded perspective view showing a distal end of a shaft in a third embodiment, FIG. 16(b) is a front view of a substrate including first and the second guide grooves in which a slidable member arranged at the distal end of the shaft can slide, FIG. 16(c) is a cross-sectional view taken along line 6-6 of FIG. 16(b) showing an engagement state of the slidable member of the shaft and the first and the second guide grooves, and FIG. 16(d) is a cross-sectional view taken along line 7-7 of FIG. 16(b);

FIG. 17(a) is a perspective view showing a distal end of a shaft in a fourth embodiment, FIG. 17(b) is a front view of a substrate showing an arrangement relationship of magnetic sensors arranged in correspondence to a revolution path of a magnet of the shaft, FIG. 17(c) is a cross-sectional view showing an arrangement relationship of micro-switches for detecting the sideward sliding of the knob, FIG. 17(d) is a cross-sectional view showing an arrangement relationship of a magnet and a magnetic sensor in a modification of the fourth embodiment, and FIG. 17(e) is a front view of a substrate showing another arrangement of the magnetic sensor;

FIG. 18(a) is a perspective view of the main parts showing a plurality of divided bodies of the shaft in another embodiment, and FIG. 18(b) is a cross-sectional view at a coupled portion of the divided bodies;

DETAILED DESCRIPTION OF THE PREFERRED EMBODIMENTS

First Embodiment

A by-wire type gearshift device 11 according to a first embodiment of the present invention will now be discussed with reference to FIGS. 1 to 13(e). The gearshift device 11 is applied to a hybrid vehicle using an engine and a motor as drive sources.

<Brief Overview of the Operation of the Gearshift Device>

Figure 1:
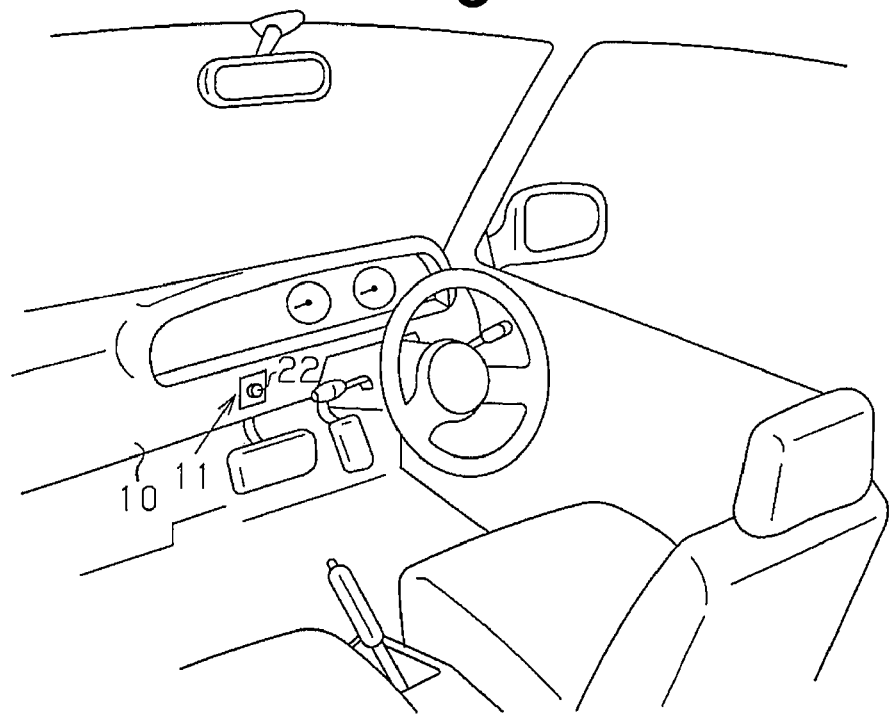
FIG. 1 is a schematic perspective view of the inside of a passenger compartment arranged with a gearshift device of a first embodiment.
Figure 2:
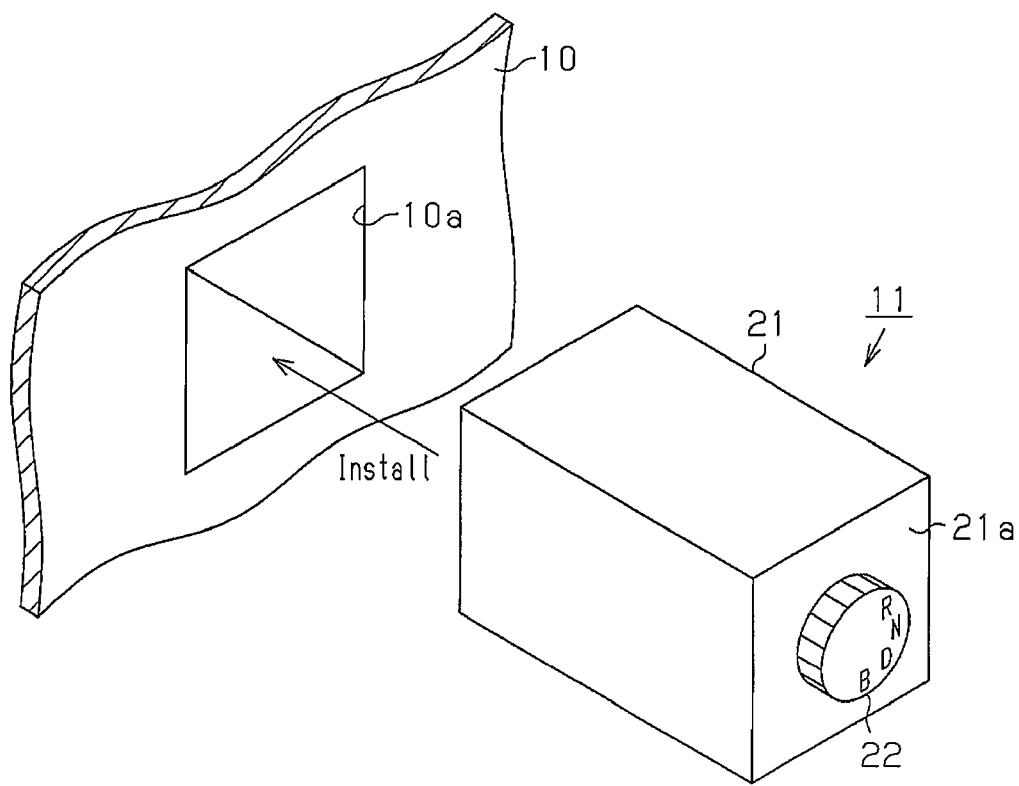
FIG. 2 is a schematic perspective view of the gearshift device of FIG. 1.

As shown in FIG. 1, the gearshift device 11 for shifting a gear position (gear-stage; gear) of an automatic transmission through operation of a user is arranged at a portion located on the left front side of a driver's seat on an instrument panel 10 in a passenger compartment. As shown in FIG. 2, the gearshift device 11 includes a box-shaped housing 21 arranged in an accommodation portion 10a serving as an attachment portion that opens in the instrument panel 10, which serves as an attaching object, and a cylindrical knob 22 arranged on an ornamental surface 21a, or one side surface, of the housing 21 exposed from the accommodation portion 10a.

Figure 3:
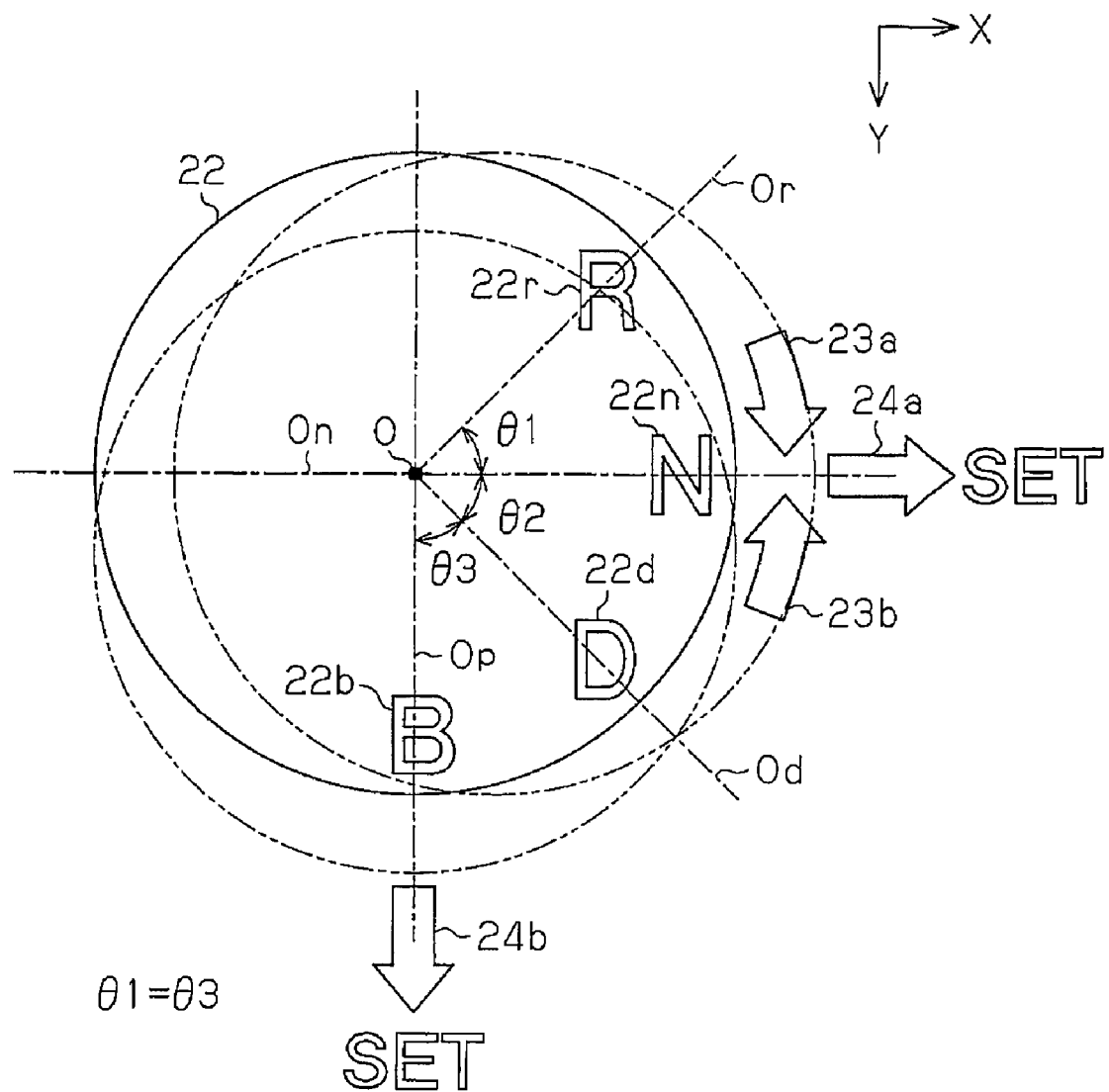
FIG. 3 is a front view showing an operation position of a knob arranged on the gearshift device of FIG. 1.

Referring to FIG. 3, the knob 22 is rotatable relative to the ornamental surface 21a about a rotation axis O and slidable in two directions intersecting the rotation axis O. In the first embodiment, the knob 22 is movable in two orthogonal directions, as shown by arrows X and Y in FIG. 3.

The knob 22 is set at a reverse drive position "R", a neutral position "N", and forward drive position "D", which serve as a plurality of rotation positions for shifting the gear positions of the automatic transmission. A manual operation position "B" is set as a rotation position corresponding to a specific function (regenerative brake by the motor herein) of the vehicle. Four indicators 22r, 22n, 22d, and 22b respectively indicating the reverse drive position "R, the neutral position "N", the forward drive position "D", and the manual operation position "B" are arranged on the surface of the knob 22. The indicators 22r, 22n, 22d, and 22b are formed in the shapes of alphabets "R", "N", "D", and "B".

The indicator 22n indicating the neutral position "N" is arranged on a center axis On orthogonal to the rotation axis O and extending in a horizontal direction of the knob 22 when the knob 22 is seen from the rotation axis O. The indicator 22r indicating the reverse drive position "R" is arranged on a center axis Or at a predetermined angle θ1 in a left rotation direction of the knob 22 with respect to the center axis On. The indicator 22d indicating the forward drive position "D" is arranged on a center axis Od at a predetermined angle θ2 in a right rotation direction of the knob 22 with respect to the center axis On. The indicator 22b indicating the manual operation position "B" is arranged on a center axis Op at a predetermined angle θ3 in a right rotation direction of the knob 22 with respect to the center axis Od and extending in a vertical direction orthogonal to the center axis On.

Two indicators 23a, 23b indicating the rotation direction of the knob 22, and indicators 24a, 24b indicating the movement direction of the knob 22 are arranged in the vicinity of the knob 22 at the ornamental surface 21a of the housing 21. The indicator 23a is formed to have an arrow shape indicating the right rotation direction of the knob 22, and the indicator 23b is formed to have an arrow shape indicating the left rotation direction of the knob 22. The indicator 24a is formed to have an arrow shape indicating the direction of the arrow X (right side in FIG. 3) as the movement direction of the knob 22, and the indicator 24b is formed to an arrow shape indicating the direction of the arrow Y (lower side in FIG. 3) as the movement direction of the knob 22. Each of the indicators 23a, 23b, 24a, and 24b is lighted if the knob 22 can be operated to the indicated direction.

The two indicators 23a, 23b indicating the rotation directions of the knob 22 are arranged facing each other with the center axis On extending in the horizontal direction in between when the gearshift device 11 is seen from the knob 22. The indicator 24a indicating the movement direction to the right side of the knob 22 is positioned on the center axis On extending in the horizontal direction when the gearshift device 11 is seen from the knob 22. Furthermore, the indicator 24b indicating the movement direction to the lower side of the knob 22 is positioned on the center axis Op extending in the vertical direction when the gearshift device 11 is seen from the knob 22.

When switching the gear position of the automatic transmission, the user rotates the knob 22 to the rotation position corresponding to the desired gear position (gear stage), and moves the knob 22 sidewards as indicated by the arrow X in FIG. 3 while holding the rotation position. The gear position of the automatic transmission is thereby switched to the desired position. In the first embodiment, the knob 22 is shifted to the forward drive position "D" when driving the vehicle forward, the neutral position "N" when cutting the power transmission of the drive source of the vehicle, and the reverse drive position "R" when driving the vehicle rearward. In other words, the gears are shifted when the knob 22 is rotated so that each indicator 22r, 22n, or 22d indicating the rotation position is positioned on the center axis On extending in the horizontal direction, and the knob 22 is moved sidewards in the direction of the arrow X from that position.

As described above, when the indicator 22n indicating the neutral position "N" is on the center axis On extending in the horizontal direction and at the position corresponding to the indicator 24a indicating the direction of the arrow X, the indicator 22b indicating the manual operation position "B" is on the center axis Op extending in the vertical direction and at the position corresponding to the indicator 24b indicating the direction of the arrow Y. The knob 22 can be moved sidewards in the direction of the arrow Y only at this position. When the knob 22 is moved sidewards in the direction of the arrow Y, the function of the vehicle corresponding to the manual operation position "B" is activated. In the first embodiment, the regenerative brake is applied by the motor, which functions as the drive source for driving the vehicle.

<Detailed Structure of the Gearshift Device>

As shown in FIG. 4(a), a cylindrical shaft 31 extending in a direction along the rotation axis O of the knob 22 is coaxially arranged at the side surface the knob 22 facing toward the housing 21. The outer diameter of the shaft 31 is smaller than the outer diameter of the knob 22. The shaft 31 serves as a gearshift member of the present invention together with the knob 22.

As shown in FIG. 4(b), in the housing 21, the ornamental surface 21a or the attachment portion of the knob 22 includes an insertion hole 32 that opens in the ornamental surface 21a and has a circular cross-section into which the shaft 31 is inserted. The inner diameter of the insertion hole 32 is larger than the outer diameter of the shaft 31 and smaller than the outer diameter of the knob 22. The shaft 31 is inserted into the insertion hole 32 from the outer side. The shaft 31 is held so as to be rotatable relative to the housing 21 and slidable in a radial direction of the shaft 31 within a gap formed between an outer surface of the shaft 31 and an inner circumferential surface of the insertion hole 32. When force in the rotation direction and force in the movement direction of the knob 22 are eliminated, a recovery mechanism 40 automatically returns the knob 22 to an original position in the rotation direction and the movement direction as shown by solid lines in FIG. 3.

<Recovery Mechanism>

Figure 5:
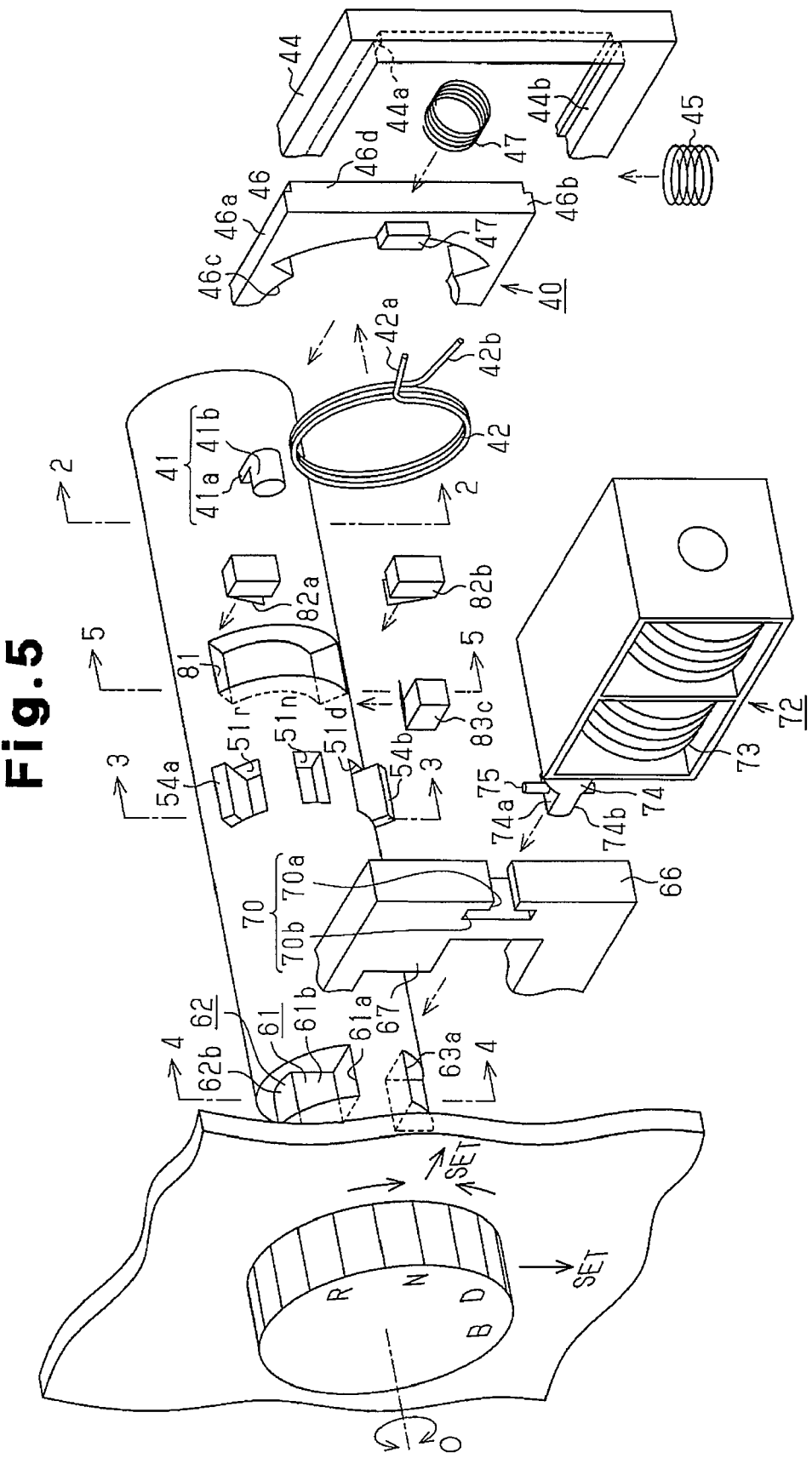
FIG. 5 is a schematic exploded perspective view of the gearshift device of FIG. 1.

As shown in FIG. 5, an engagement member 41 projecting in the direction of the arrow X is arranged on the outer surface at the distal end side of the shaft 31. The engagement member 41 includes a flat plate-shaped arm member 41a projecting in the direction of the arrow X from the outer surface of the shaft 31, and a cylindrical lock projection 41b arranged on the side surface on the knob 22 side of the arm member 41b. The shaft 31 is inserted through a torsion coil spring 42. The torsion coil spring 42 is positioned on the side surface of the arm member 41a, which forms the engagement member 41, facing toward the knob 22. As shown in FIG. 6(a), the two ends 42a, 42b of the torsion coil spring 42 extend across each other and are curved to form a U-shape that opens in the direction of the arrow X when the shaft 31 is seen from the knob 22 along the axial direction. The lock projection 41b of the engagement member 41 is arranged between the basal ends of the ends 42a and 42b of the torsion coil spring 42.

<Outer Slide Member>

As also shown in FIGS. 6(a) and (b), a box-shaped slide member accommodation portion 43 communicating with the insertion hole 32 is formed in the housing 21 at a portion corresponding to the engagement member 41 of the shaft 31. The slide member accommodation portion 43 accommodates an outer slide member, which has a rectangular frame shape, and is slidable in the direction of the arrow Y. A gap dy is defined between a lower surface of the outer slide member 44 and an inner bottom surface of the slide member accommodation portion 43. A compression coil spring 45 is arranged in the gap dy, that is, between the lower surface of the outer slide member 44 and the inner bottom surface of the slide member accommodation portion 43. The outer slide member 44 is constantly urged towards the upper side (direction opposite to the movement direction indicated by the arrow Y) by the force of the compression coil spring 45. Upward movement of the outer slide member 44 is restricted when the upper surface of the outer slide member 44 contacts the inner top surface of the slide member accommodation portion 43. Therefore, the outer slide member 44 moves in the direction of the arrow Y against the force of the compression coil spring 45 when the force in the direction of arrow Y is applied to the outer slide member 44. In this case, two side surfaces of the outer slide member 44 positioned on opposite sides in the direction of the arrow X are slidably moved and guided along the two inner side surfaces of the slide member accommodation portion 43 facing each other in the direction of the arrow X. That is, the side surface on the arrow X side and the side surface on the side opposite to the arrow X of the outer slide member 44 contact the inner side surface on the arrow X side and the inner side surface on the side opposite to the arrow X of the slide member accommodation portion 43. The outer slide member 44 is thus prevented from sliding along the direction of the arrow X and the direction opposite to the arrow X.

On the two inner side surfaces facing the outer slide member 44 in the upward and downward directions, guide members 44a, 44b are formed over the entire length in the direction of the arrow X. As shown in FIG. 6(b), a step d1 is formed between the side surface of the guide members 44a, 44b facing the knob 22 and the side surface of the outer slide member 44 facing the knob 22.

<Inner Slide Member>

An inner slide member 46 having a rectangular plate shape and slidable in the direction of the arrow X is arranged in the inner region of the outer slide member 44. The thickness of the inner slide member 46 is set to be substantially the same as the thickness of the outer slide member 44 (see FIG. 6(b)). On the two outer side surfaces positioned on opposite sides of the inner slide member 46 in the upward and downward directions, extensions 46a and 46b are formed over the entire length in the direction of the arrow X. As shown in FIG. 6(b), a step d2 is formed between the side surface of the extensions 46a, 46b on the side opposite to the knob 22 and the side surface of the inner slide member 46 facing the knob 22. The width of the step d2 is substantially the same as the width of the step d1 described above. The inner slide member 46 is engaged to the outer slide member 44 such that the side surface on the side opposite to the knob 22 of the extension 46a, 46b closely contacts the side surface of the guide member 44a, 44b facing the knob 22. The side surface of the inner slide member 46 facing the knob 22 side is flush with the side surface of the outer slide member 44 facing the knob 22.

A gap dx is formed between an outer side surface on the arrow X side of the inner slide member 46 and an inner side surface on the arrow X side of the outer slide member 44. A compression coil spring 47 is arranged in the gap dx, that is, between the side surface on the arrow X side of the inner slide member 46 and an inner side surface on the arrow X side of the outer slide member 44. The inner slide member 46 is constantly urged towards the left side (direction opposite to the movement direction indicated by the arrow X) by the force of the compression coil spring 47. Movement to the left side of the inner slide member 46 is restricted when the outer side surface on the left side of the inner slide member 46 contacts the inner side surface on the left side of the outer slide member 44. Therefore, when the force in the direction of the arrow X acts on the inner slide member 46, the inner slide member 46 moves in the direction of the arrow X against the force of the compression coil spring 47. In this case, the side surface on the side opposite to the knob 22 of the extension 46a, 46b in the inner slide member 46 is slidably moved and guided along the side surface of the guide member 44a, 44b facing the knob 22 in the outer slide member 44.

Furthermore, the inner slide member 46 includes a circular insertion hole 46c through which the shaft 31 is inserted, and a fan-shaped clearance opening 46d communicating to the insertion hole 46c is formed on the inner side portion on the arrow X side of the insertion hole 46c. The clearance opening 46d receives the lock projection 41b, described above, from the side opposite to the knob 22. As described above, the lock projection 41b is arranged between the basal ends of the ends 42a, 42b of the torsion coil spring 42. A box-shaped spring seat projection 48 is arranged in the side surface of the inner slide member 46 facing the knob 22 at the center of the side edge of the clearance opening 46d opposite to the insertion hole 46c. The spring seat projection 48 is arranged between the distal ends of the ends 42a, 42b of the torsion coil spring 42.

At normal times when the knob 22 is not rotated, the lock projection 41b is held at the center of the clearance opening 46d, as shown by a solid line in FIG. 6(a). The lock projection 41b moves between an upper position of engaging the inner side surface on the left rotation side of the clearance opening 46d and a lower position of engaging the inner side surface on the right rotation side, as shown with a double-dashed line in FIG. 6(a), with the rotation of the knob 22. In other words, if the knob 22 is rotated from the neutral position "N" to the reverse drive position "R", the lock projection 41b moves from the central position shown by a solid line in FIG. 6(a) to the lower position shown by the double-dashed line against the force of the torsion coil spring 42. If the knob 22 is rotated from the neutral position "N" to the forward drive position "D", the lock projection 41b moves from the central position shown by a solid line in FIG. 6(a) to the upper position shown by the double-dashed line against the force of the torsion coil spring 42. When the force on the knob 22 is eliminated, the lock projection 41b returns to the central position shown with the solid line in FIG. 6(a) by the force of the torsion coil spring 42. This returns the rotation position of the knob 22 to the neutral position.

When the shaft 31 is moved in the direction of the arrow X by sliding the knob 22 in the direction of arrow X, the inner slide member 46 moves in the direction of the arrow X against the force of the compression coil spring 47. The outer slide member 44 does not move in the direction of the arrow X. This is because the outer side surface on the right side of the outer slide member 44 contacts the inner side surface on the right side of the slide member accommodation portion 43, and the movement in the direction of the arrow X of the outer slide member 44 is restricted, as described above. When the force in the direction of the arrow X on the knob 22 is eliminated, the inner slide member 46 is moved in the direction opposite to the arrow X by the force of the compression coil spring 47, and returns to the original position where the outer side surface on the left side of the inner slide member 46 contacts the inner side surface on the left side of the outer slide member 44.

When the shaft 31 is moved in the direction of the arrow Y by sliding the knob 22 in the direction of arrow Y, the inner slide member 46 and the outer slide member 44 integrally move in the direction of the arrow Y against the force of the compression coil spring 45. When the force in the direction of the arrow Y of the knob 22 is eliminated, the inner slide member 46 and the outer slide member 44 are integrally moved in the direction opposite to the arrow Y by the force of the compression coil spring 45, and return to the original position where the outer side surface on the upper side of the outer slide member 44 contacts the inner top surface of the slide member accommodation portion 43.

Thus, the recovery mechanism 40 functions as a rotation recovery means for returning the knob 22 to the original position in the rotation direction when the force in the rotation direction applied to the knob 22 is eliminated. The recovery mechanism 40 also functions as a movement recovery means for returning the knob 22 to the original position in the movement direction when the force in the movement direction indicated by arrows X, Y on the knob 22 is eliminated. The shaft 31 is positioned in the horizontal direction in the insertion hole 32 as the outer side surface on the left side of the inner slide member 46 is pressed against the inner side surface on the left side of the slide member accommodation portion 43 by the force of the compression coil spring 47. The shaft 31 is also positioned in the vertical direction in the insertion hole 32 as the outer side surface on the upper side of the outer slide member 44 is pressed against the inner top surface of the slide member accommodation portion 43 by the force of the compression coil spring 45. The shaft 31 is thereby held inside the insertion hole 32.

<Movement Restriction Means>

The shaft 31 includes a movement restriction means which permits the sideward sliding of the knob 22 to determine the shifting of gears to the gear position corresponding to one rotation position only when the knob 22 is rotated to one of the plurality of rotation positions. As shown in FIG. 5, fitting recesses 51r, 51n, 51d, and 51b, the quantity (four herein) of which is the same as the rotation positions of the knob 22 are formed in the outer surface of the shaft 31 at portions closer to the knob 22 than the engagement member 41. In FIG. 5, only three fitting recesses 51r, 51n, and 51d are shown.

Figure 7:
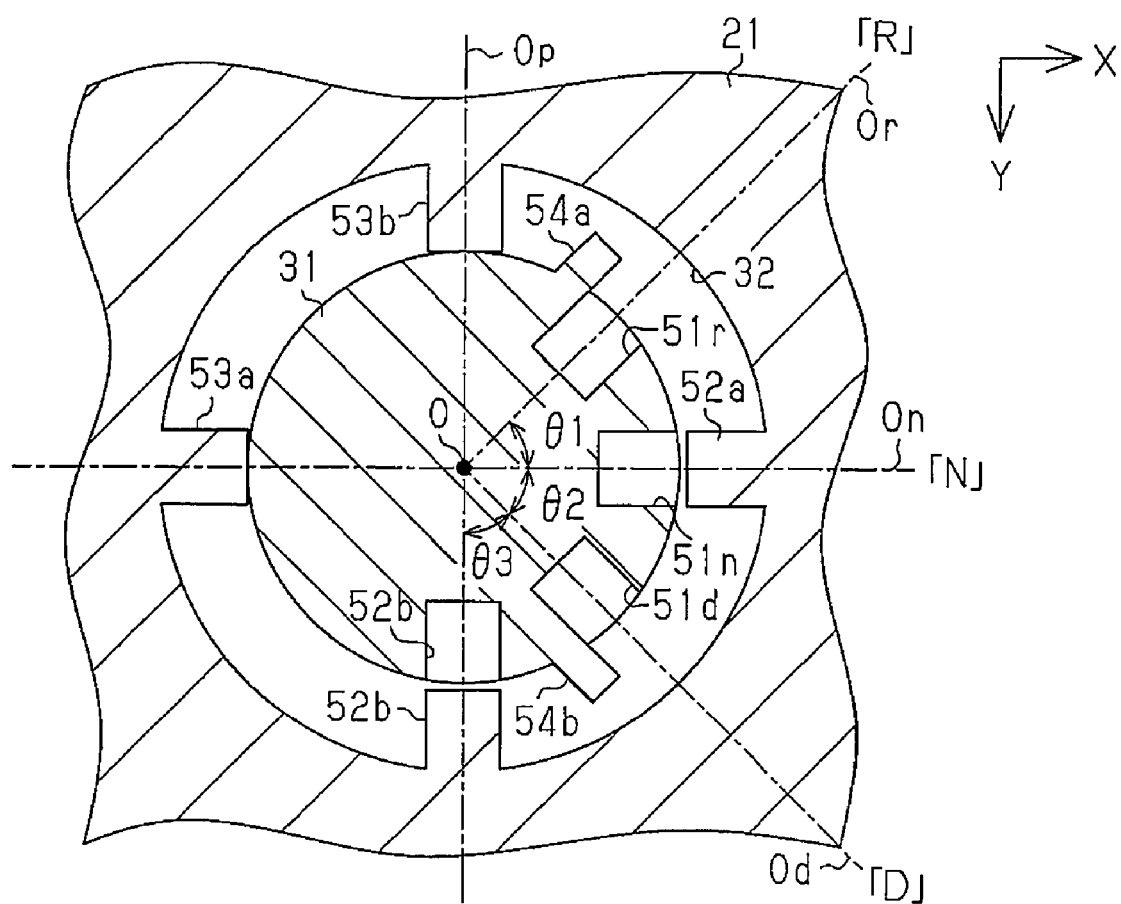
FIG. 7 is a cross-sectional view taken along line 3-3 of FIG. 5.

As shown in FIG. 7, the four fitting recesses 51r, 51n, 51d, and 51b correspond to the reverse drive position "R", the neutral position "N", the forward drive position "D", and the manual operation position "B", which are the four rotation positions of the knob 22 described above.

The fitting recess 51n corresponding to the neutral position "N" is arranged at the portion (right side in FIG. 7) of the shaft 31 positioned on the sideward sliding side of the knob 22 on the center axis On extending in the horizontal direction (x direction) when the shaft 31 is seen from its axial direction. The fitting recess Sir corresponding to the reverse drive position "R" is arranged so as to be adjacent to the fitting recess 51n on the center axis Or at the predetermined angle θ1 in the left rotation direction of the shaft 31 with respect to the center axis On when the shaft 31 is seen from its axial direction. The fitting recess Sid corresponding to the forward drive position "D" is arranged so as to be adjacent to the fitting recess 51n on the center axis Od at the predetermined angle θ2 in the right rotation direction of the shaft 31 with respect to the center axis On when the shaft 31 is seen from its axial direction. The fitting recess 51b corresponding to the manual operation position "B" is arranged so as to be adjacent to the fitting recess 51d on the center axis Op orthogonal to the center axis On when the shaft 31 is seen from its axial direction.

At the inner circumferential surface of the insertion hole 32, a first fitting projection 52a selectively fitted to the three fitting recesses 51r, 51n, and 51d is formed at a portion (right inner side in FIG. 7) located on the center axis On extending in the horizontal direction (X direction) and on the sideward sliding side of the knob 22 when the shaft 31 is seen from its axial direction. Furthermore, at the inner circumferential surface of the insertion hole 32, a second fitting projection 52b fitted to the fitting recess 51b is formed at a portion (lower inner side in FIG. 7) located on the center axis Op extending in the vertical direction (Y direction) and on the sideward sliding side of the knob 22 when the shaft 31 is seen from its axial direction.

Moreover, at the inner circumferential surface of the insertion hole 32, first and second projections 53a, 53b (guide members) are formed at a predetermined interval in the circumferential direction of the shaft 31 at portions corresponding to the central part in the axial direction of the shaft 31. The first and the second projections 53a, 53b have a predetermined length along the axial direction of the shaft 31. When the insertion hole 32 is seen from its axial direction, the first projection 53a is formed at the portion on the center axis On extending in the horizontal direction (X direction) and in the direction opposite to the movement direction of the knob 22 at the inner circumferential surface of the insertion hole 32. The second projection 53b is formed at the portion on the center axis Op extending in the vertical direction (Y direction) and in the direction opposite to the movement direction of the knob 22 at the inner circumferential surface of the insertion hole 32.

Figure 6:
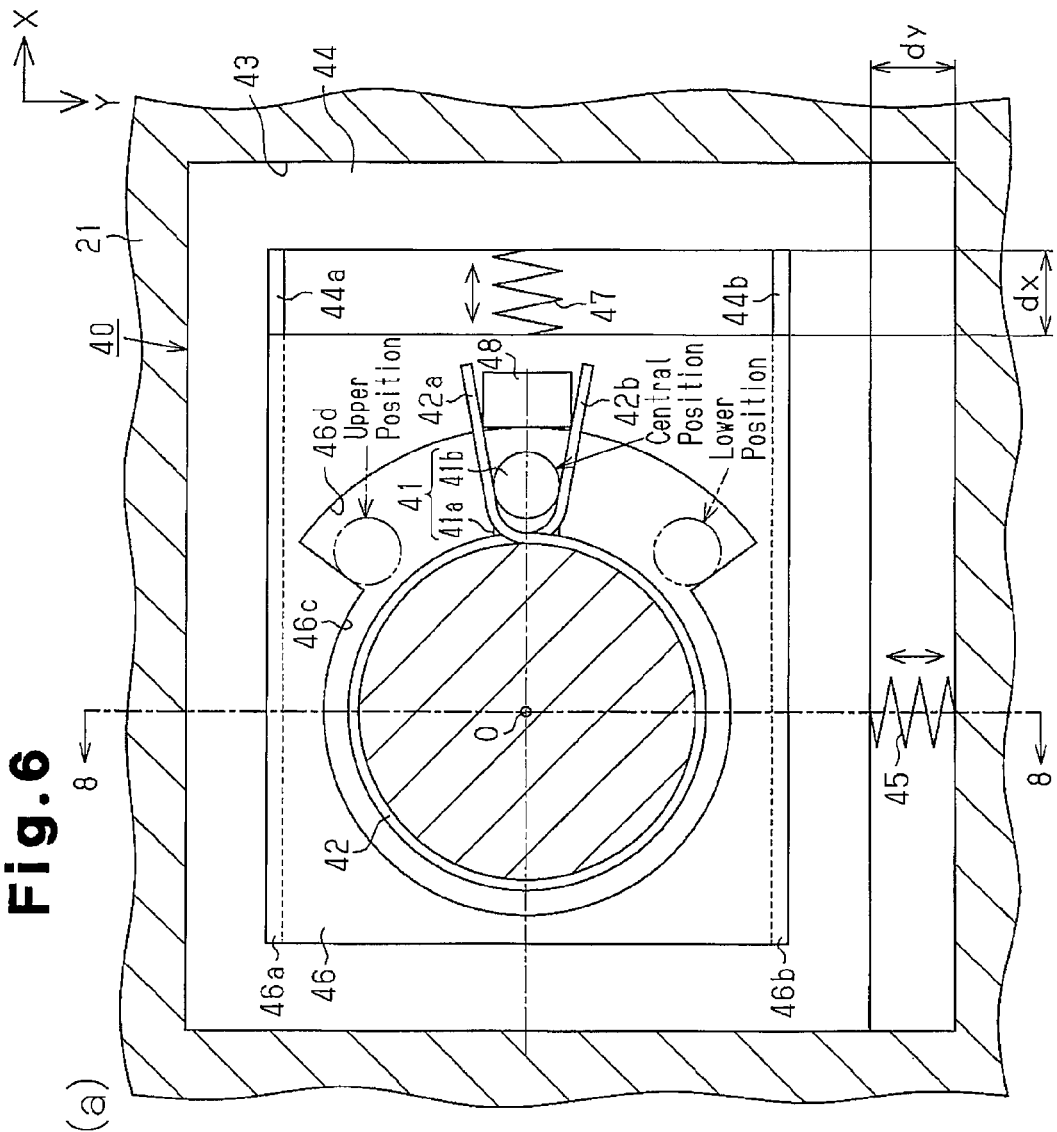
FIG. 6(a) is a cross-sectional view taken along line 2-2 of FIG. 5.
FIG. 6(b) is a cross-sectional view taken along line 8-8 of FIG. 6(a)

In the normal state shown in FIG. 6 where the outer side surface on the upper side of the outer slide member 44 contacts the inner top surface of the slide member accommodation portion 43, and the side surface on the left side of the inner slide member 46 contacts the inner side surface on the left side of the slide member accommodation portion 43, the distal ends of the first and the second projections 53a, 53b contact the outer surface of the shaft 31 in a slidably moving manner. The projecting height from the inner circumferential surface of the insertion hole 32 of the first and the second fitting projections 52a, 52b is smaller than the distance between the outer surface of the shaft 31 and the inner circumferential surface of the insertion hole 32 with the outer surface of the shaft 31 contacting the distal ends of the first and the second projections 53a, 53b.

Therefore, when one of the three fitting recesses 51r, 51n, and 51d is rotated to the position facing the first fitting projection 52a by the rotation of the knob 22, the shaft 31 can be moved sidewards in the direction of the arrow X (right side in FIG. 7) along the center axis On. That is, the shaft 31 moves in the direction of the arrow X against the force of the compression coil spring 47 of the recovery mechanism 40 described above. The rightward movement of the shaft 31 is permitted when the first fitting projection 52a fits into one of the three fitting recesses 51r, 51n, and 51d. The movement in the direction of the arrow X of the shaft 31 is restricted when the distal end of the first fitting projection 52a contacts the outer surface of the shaft 31 with none of the three fitting recesses 51r, 51n, and 51d facing the first fitting projection 52a. When the movement force in the direction of the arrow X applied to the knob 22 is eliminated, the shaft 31 returns to the original position in the horizontal direction where the outer surface of the shaft 31 contacts the distal end of the first projection 53a by the force of the compression coil spring 47 of the recovery mechanism 40.

When the knob 22 is moved sidewards in the direction of the arrow Y with the fitting recess 51n corresponding to the neutral position "N" facing the first fitting projection 52a, the shaft 31 moves in the direction of the arrow Y against the force of the compression coil spring 45 of the recovery mechanism 40. That is, the movement in the direction of the arrow Y of the shaft 31 is permitted when the second fitting projection 52b is fitted in the fitting recess 51b corresponding to the manual operation position "B". The movement in the direction of the arrow Y of the shaft 31 is restricted when the distal end of the second fitting projection 52b contacts the outer surface of the shaft 31 with the fitting recess 51b not facing the second fitting projection 52b. When the movement force in the direction of the arrow Y applied to the knob 22 is eliminated, the shaft 31 returns to the original position in the vertical direction where the outer surface of the shaft 31 contacts the distal end of the second projection 53b by the force of the compression coil spring 45 of the recovery mechanism 40.

At a normal time when the knob 22 is not operated, the knob 22 is held so that the indicator 22n corresponding to the neutral position "N" is held at a position corresponding to the indicator 24a indicating the direction of the arrow X (FIG. 3). Here, the shaft 31 is held at the neutral state where the fitting recess 51n corresponding to the neutral position "N" faces the first fitting projection 52a, and the fitting recess Sib corresponding to the manual operation position "B" faces the second fitting projection 52b. The fitting recess Sir corresponding to the reverse drive position "R" faces the first fitting projection 52a when the shaft 31 is rotated to the right by the predetermined angle θ1 by the right rotation operation of the knob 22 in the neutral state. Furthermore, the fitting recess 51d corresponding to the forward drive position "D" faces the first fitting projection 52a when the shaft 31 is rotated to the left by the predetermined angle θ2 in the neutral state.

Therefore, the sideward sliding of the knob 22 in the direction of the arrow X is permitted only when the knob 22 is rotated to one of the plurality of rotation positions "R", "N", or "D". The sideward sliding of the knob 22 in the direction of the arrow Y is also permitted when the knob 22 is rotated to the rotation position "N".

<Stopper>

As shown in FIG. 7, a first contact wall 54a projecting radially outward of the shaft 31 is formed on the outer surface of the shaft 31 adjacent to the open end edge on the left rotation direction side of the fitting recess 51r. A second contact wall 54b projecting radially outward of the shaft 31 is formed on the outer surface of the shaft 31 adjacent to the open end edge on the right rotation direction side of the fitting recess Sid. The side surface of the first contact wall 54a facing the fitting recess 51r is flush with the inner side surface of the fitting recess 51r. The side surface of the second contact wall 54b facing the fitting recess 51d is flush with the inner side surface of the fitting recess Sid. The projecting heights from the outer surface of the shaft 31 of the first and the second contact walls 54a, 54b are greater than the distance between the outer surface of the shaft 31 and the distal end surfaces of the first and the second fitting projections 52a, 52b with the outer surface of the shaft 31 contacting the distal ends of the first and the second projections 53a, 53b.

Therefore, the rightward rotation of the shaft 31 is restricted by contact of the side surface of the first contact wall 54a facing the fitting recess 51r with the first fitting projection 52a. The leftward rotation of the shaft 31 is restricted by the contact of the side surface of the second contact wall 54b facing the fitting recess 51d with the first fitting projection 52a. That is, the shaft 31 is rotatable between a position where the first contact wall 54a contacts the first fitting projection 52a and a position where the second contact wall 54b contacts the first fitting projection 52a. Thus, the first and the second contact walls 54a, 54b function as a stopper for restricting the rotation range of the shaft 31, and furthermore, the knob 22 to a predetermined angular range.

When the first contact wall 54a is located at the position contacting the first fitting projection 52a, the lock projection 41b of the engagement member 41 is at the lower position engaging the inner side surface on the right rotation side of the clearance opening 46d in the inner slide member 46, as shown by the double-dashed line in FIG. 6(a). When the second contact wall 54b is located at the position contacting the first fitting projection 52a, the lock projection 41b of the engagement member 41 is at the upper position engaging the inner side surface on the left rotation side, as shown by the double-dashed line in FIG. 6(a). Therefore, the lock projection 41b of the engagement member 41 also functions as a stopper for restricting the rotation range of the shaft 31, and furthermore, the knob 22 to a predetermined angular range in cooperation with the first and the second contact walls 54a, 54b.

<Rotation Restriction Means>

As shown in FIG. 5, first and second engagement recesses 61, 62 are formed in the outer surface of the shaft 31 at portions further toward the knob 22 than the portions including the fitting recesses 51r, 51n, 51d, and 51b.

Figure 8:
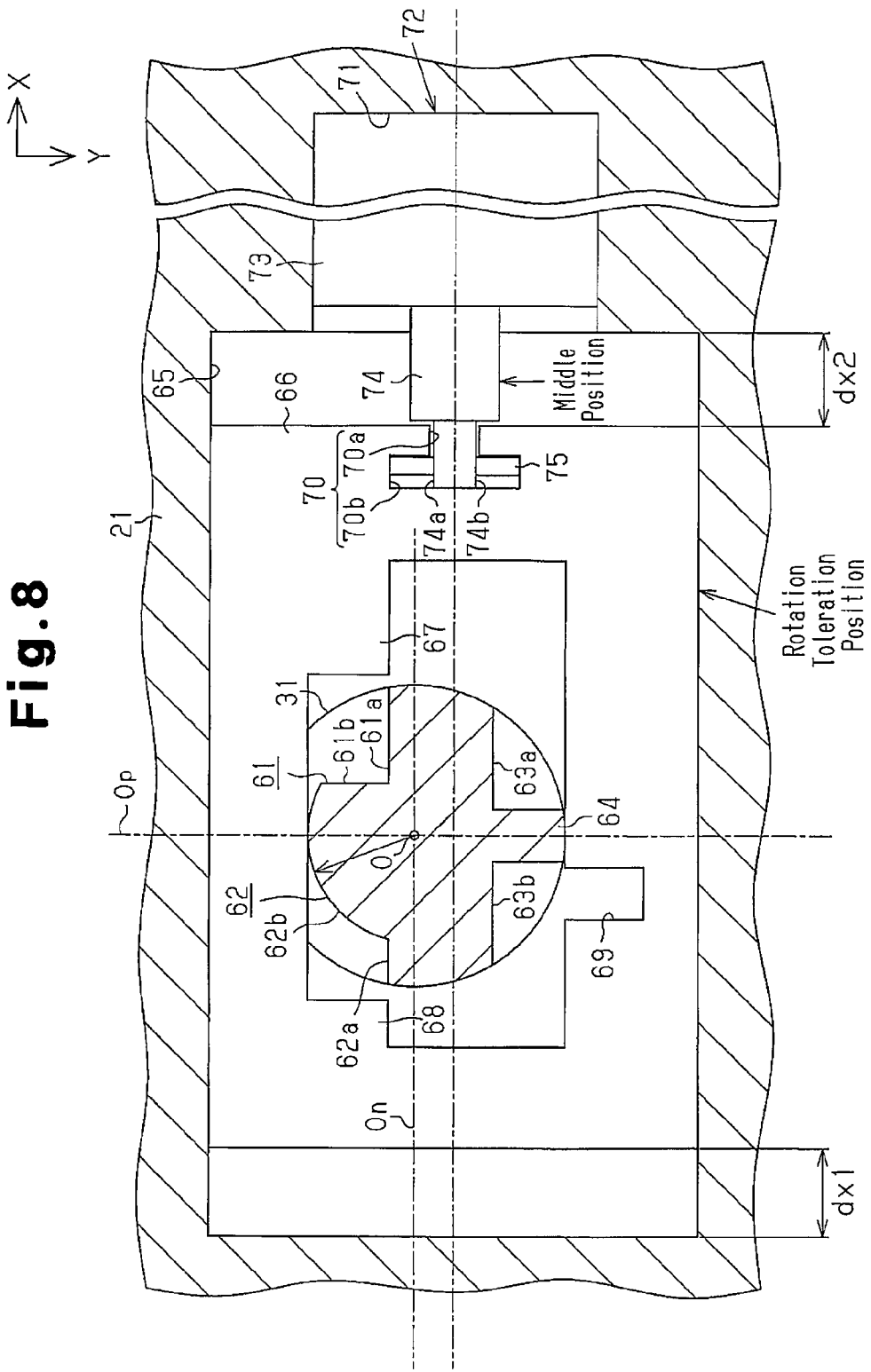
FIG. 8 is a cross-sectional view taken along line 4-4 of FIG. 5 showing a rotation permission position of a lock.

More specifically, as shown in FIG. 8, the first engagement recess 61 is formed upward from the center axis On extending in the direction of the arrow X and on the right side than the center axis Op extending in the direction of the arrow Y when the shaft 31 is seen from its axial direction. The inner bottom surface of the first engagement recess 61 forms a lock surface 61a parallel to the center axis On. The inner side surface on the side opposite to the arrow X of the first engagement recess 61 forms a vertical surface 61b parallel to the center axis Op.

The second engagement recess 62 is formed upward from the center axis On extending in the direction of the arrow X and on the left side than the center axis Op extending in the direction of the arrow Y when the shaft 31 is seen from its axial direction. The inner bottom surface of the second engagement recess 62 forms a lock surface 62a parallel to the center axis On. The inner side surface on the arrow X side of the second engagement recess 62 forms a curved surface 62b that curves in the direction of the arrow X in the upward direction and extends towards the first engagement recess 61. The curved surface 62b is an arcuate surface extending about the rotation axis O of the knob 22 and has a smaller diameter than the shaft 31.

Furthermore, when the shaft 31 is seen from its axial direction, two recesses 63a, 63b are symmetrically formed with the center axis Op in between on the lower side than the center axis On, which two recesses 63a, 63b form a lock wall 64. The two lock surfaces 61a, 62a described above are located on the same virtual plane.

As shown in FIG. 8, a box-shaped lock accommodation portion 65 communicating with the insertion hole 32 is formed at portions corresponding to the first and the second engagement recesses 61, 62 of the shaft 31 in the housing 21. A lock 66 having a rectangular frame shape is accommodated in the lock accommodation portion 65 so as to be slidable in the direction of the arrow X when the shaft 31 is inserted. Specifically, a gap dx1 is formed between the outer side surface on the side opposite to the arrow X of the lock 66 and the inner side surface on the left side of the lock accommodation portion 65. A gap dx2 is formed between the outer side surface on the arrow X side of the lock 66 and the inner side surface on the right side of the lock accommodation portion 65. The upper surface of the lock 66 is closely contacted so as to be slidably movable in the direction of the arrow X with respect to an inner top surface of the lock accommodation portion 65, and the lower surface with respect to the inner bottom surface of the lock accommodation portion 65. Furthermore, the two side surfaces of the lock 66 positioned on opposite sides to each other in the axial direction of the shaft 31 are slidably moved and guided by the two inner side surfaces of the lock accommodation portion 65 facing each other in the axial direction of the shaft 31.

Furthermore, as shown in FIG. 8, when the lock 66 is seen from the axial direction of the shaft 31, a rectangular first lock strip 67 is formed on the upper right inner corner at the inner side surface of square frame shape of the lock 66, and a rectangular second lock strip 68 is formed on the upper left inner corner. The lower surfaces (side surface on the arrow Y side) of the first and the second lock strips 67, 68 are on the same virtual plane as the lock surfaces 61a, 62a of the first and the second engagement recesses 61, 62 formed in the shaft 31.

Therefore, the lock 66 moves in the direction opposite to the arrow X when the force in the direction opposite to the arrow X acts on the lock 66. This movement is permitted when the first lock strip 67 enters the first engagement recess 61. Here, the lower surface of the first lock strip 67 slidably moves on the lock surface 61a or the inner bottom surface of the first engagement recess 61. The left operation of the shaft 31, and furthermore, the rotation of the knob 22 in the direction indicated by the indicator 23b are restricted by the locking of the inner bottom surface of the first engagement recess 61 to the lower surface of the first lock strip 67.

The lock 66 moves in the direction of the arrow X when the force in the direction of the arrow X acts on the lock 66. This movement is permitted when the second lock strip 68 enters the second engagement recess 62. Here, the lower surface of the second lock strip 68 slidably moves on the lock surface 62a or the inner bottom surface of the second engagement recess 62. The right operation of the shaft 31, and furthermore, the rotation of the knob 22 in the direction indicated by the indicator 23a are restricted by the locking of the inner bottom surface of the second engagement recess 62 to the lower surface of the second lock strip 68.

A cutout 69 extending in the direction of the arrow Y is formed at a portion closer to the lower left inner corner at the inner bottom surface of the lock 66. The width in the direction of the arrow X of the cutout 69 is slightly larger than the width in the direction of the arrow X of the lock wall 64 of the shaft 31 described above. Thus, when the lock 66 moves in the direction of the arrow X and the shaft 31 moves in the direction of the arrow Y with the cutout 69 facing the lock wall 64, the lock wall 64 of the shaft 31 enters the cutout 69. This permits movement of the shaft 31 in the direction of the arrow Y.

An engagement hole 70 opening to the arrow X side is formed on the outer side surface on the right side of the engagement member 66. The engagement hole 70 is formed by an open hole 70a opening to the arrow X side of the lock 66, and an engagement hole 70b communicating to the open hole 70a and extending in the upward and downward directions. The cross-sectional shape of the engagement hole 70b is similar to the shape of alphabet "T" that is rotated to the left by 90°.

<Solenoid Mechanism>

As shown in FIG. 8, a solenoid accommodation portion 71 communicating to the lock accommodation portion 65 is formed at a portion corresponding to the lock accommodation portion 65 in the housing 21. The solenoid accommodation portion 71 accommodates a solenoid mechanism 72 for sliding the lock 66 in the direction of the arrow X. The solenoid mechanism 72 includes an exciting coil 73 accommodated in the solenoid accommodation portion 71 and a flange 74 which projection amount in the direction of the arrow X with respect to the exciting coil 73 varies based on the excited state of the exciting coil 73.

Two planes 74a, 74b are formed on opposite sides of a distal end of a plunger 74 and extend in the direction of the arrow Y. An engagement pin 75 orthogonal to the two planes 74a, 74b is fixed at the distal end of the plunger 74. In other words, the engagement pin 75 vertically extends through the distal end of the plunger 74. The plunger 74 projects into the lock accommodation portion 65. The distal end of the plunger 74 is inserted into the engagement hole 70b through the open hole 70a. The distal end surface of the plunger 74 is maintained in a state contacting the inner side surface on the left side (side opposite to the arrow X) of the engagement hole 70b. The engagement pin 75 is held inside the engagement hole 70b and is engageable with the inner side surface on the right side (arrow X side) of the engagement hole 70b.

Figure 9:
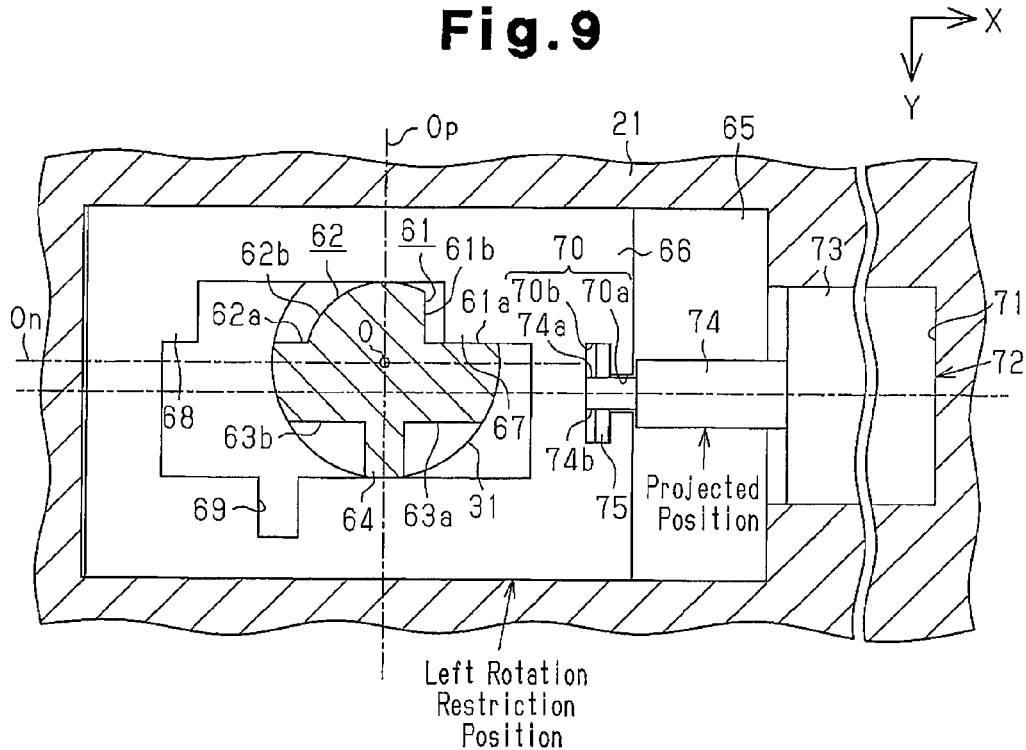
FIG. 9 is a cross-sectional view taken along line 4-4 of FIG. 5 showing a left rotation restriction position of the lock.
Figure 10:
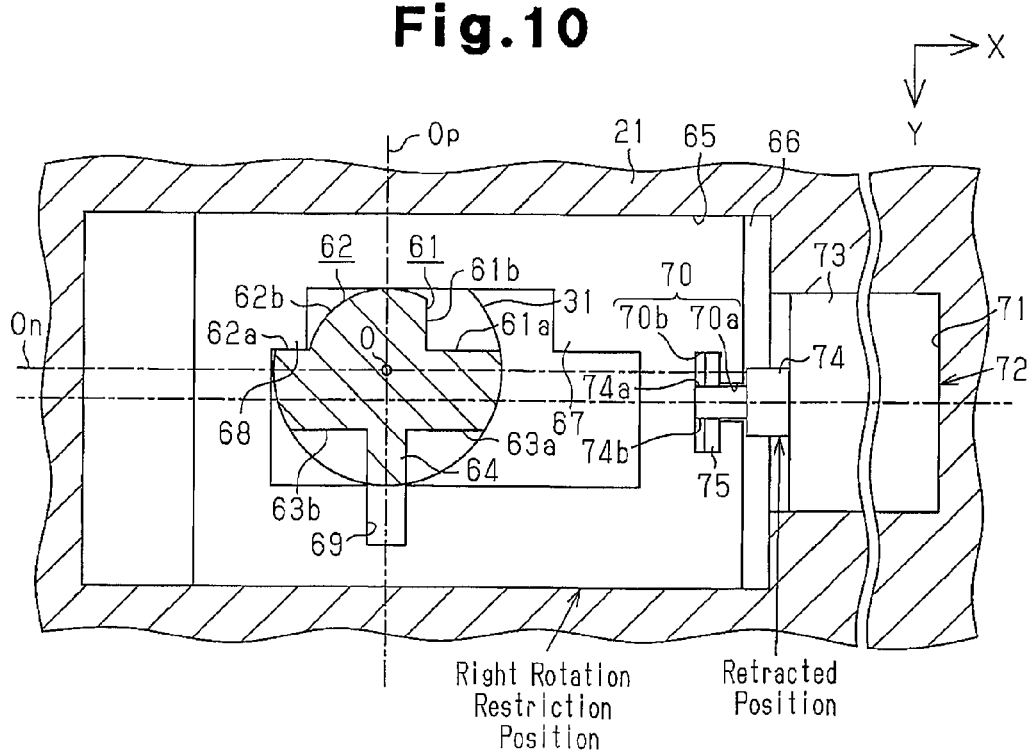
FIG. 10 is a cross-sectional view taken along line 4-4 of FIG. 5 showing a right rotation restriction position of the lock.

In the first embodiment, the plunger 74 moves between three positions, a middle position shown in FIG. 8, a projected position shown in FIG. 9, and a retracted position shown in FIG. 10. The plunger 74 is held at the middle position shown in FIG. 8 when the exciting coil 73 is not receiving current. In this case, the rotation of the shaft 31 is permitted since the shaft 31 is not engaged to any portion of the inner side surface of the lock 66. That is, the lock 66 is held at a rotation permission position (rotation permission state) for permitting the rotation of the shaft 31, and furthermore, the knob 22.

When excitation current having positive polarity is supplied to the exciting coil 73, the plunger 74 moves in the direction opposite to the direction of the arrow X from the middle position to the projected position shown in FIG. 9. The inner side surface on the left side of the engagement hole 70b is then pushed in the direction opposite to the direction of the arrow X by the distal end surface of the plunger 74, whereby the lock 66 slides in the direction opposite to the direction of the arrow X with the plunger 74. In a state the plunger 74 has reached the projected position, as shown in FIG. 9, the first lock strip 67 of the lock 66 is maintained in the state entering the first engagement recess 61 of the shaft 31. The left rotation of the shaft 31, and furthermore, the rotation of the knob 22 in the direction indicated by the indicator 23b are then restricted by the locking of the inner bottom surface of the first engagement recess 61 with the lower surface of the first lock strip 67. That is, the rotation to the forward drive position "D" of the knob 22 is restricted.

Therefore, the lock 66 moves from the rotation permission position shown in FIG. 8 to a left rotation restriction position (rotation restriction state) shown in FIG. 9 restricting the left rotation of the shaft 31, and furthermore, the knob 22 when the exciting coil 73 receives current of positive polarity. This holds the rotation position of the knob 22. When the lock 66 is at the left rotation restriction position shown in FIG. 9, the cutout 69 does not face the lock wall 64 of the shaft 31. That is, the distal end surface of the lock wall 64 is in contact with the inner side surface on the lower side of the lock 66. Therefore, the movement in the direction of the arrow Y of the shaft 31 is restricted.

When an excitation current having negative polarity is supplied to the exciting coil 73, the plunger 74 moves in the direction of the arrow X from the middle position to the retracted position shown in FIG. 10. In this case, the engagement pin 75 engages the inner side surface on the right side of the engagement hole 70b, whereby the lock 66 slides in the direction of the arrow X with the plunger 74. In a state the plunger 74 has reached the retracted position, as shown in FIG. 10, the second lock strip 68 of the lock 66 is maintained in the state entering the second engagement recess 62 of the shaft 31. The right rotation of the shaft 31, and furthermore, the rotation of the knob 22 in the direction indicated by the indicator 23a are then restricted by the locking of the inner bottom surface of the second engagement recess 62 with the lower surface of the second lock strip 68. That is, the rotation to the reverse drive position "R" of the knob 22 is restricted.

Therefore, the lock 66 moves from the rotation permission position shown in FIG. 8 to a right rotation restriction position (rotation restriction state) shown in FIG. 10 restricting the right rotation of the shaft 31, and furthermore, the knob 22 when the exciting coil 73 receives current of negative polarity. This holds the rotation position of the knob 22. When the lock 66 is at the right rotation restriction position shown in FIG. 10, the cutout 69 faces the lock wall 64 of the shaft 31 and can relatively enter the lock wall 64. Therefore, the movement in the direction of the arrow Y of the shaft 31 is permitted.

<Detection Means>

As shown in FIG. 5, an elongated groove 81 extending in the circumferential direction of the shaft 31 and opening in the movement direction indicated by the arrow X is formed between the portion formed with the fitting recesses 51*r*, 51*n*, 51*d*, and 51*b*, and the engagement member 41 in the outer surface of the shaft 31. The length of the elongated groove 81 in the circumferential direction of the shaft 31 corresponds to the rotation range of the shaft 31 determined based on the engagement relationship of the first and the second contact walls 54*a*, 54*b* and the first fitting projection 52*a*. Furthermore, the elongated groove 81 is formed such that the center axis On extending in the horizontal direction passes through the center in the extending direction of the elongated groove 81 when the rotation position of the knob 22 is at the neutral position "N", as shown in FIG. 11(*a*).

A switch accommodation portion (not shown) opening to the inner circumferential surface of the insertion hole 32 is formed in the housing 21. The switch accommodation portion includes first to third micro-switches 82*a*, 82*b*, and 82*c* as a detection means for detecting rotation to each rotation position of the shaft 31 and thus the sliding of the knob 22 and in the directions of the arrows X, Y at each rotation position. The first to the third micro-switches 82*a* to 82*c* have a size enabling entry into the elongated groove 81.

Figure 11:
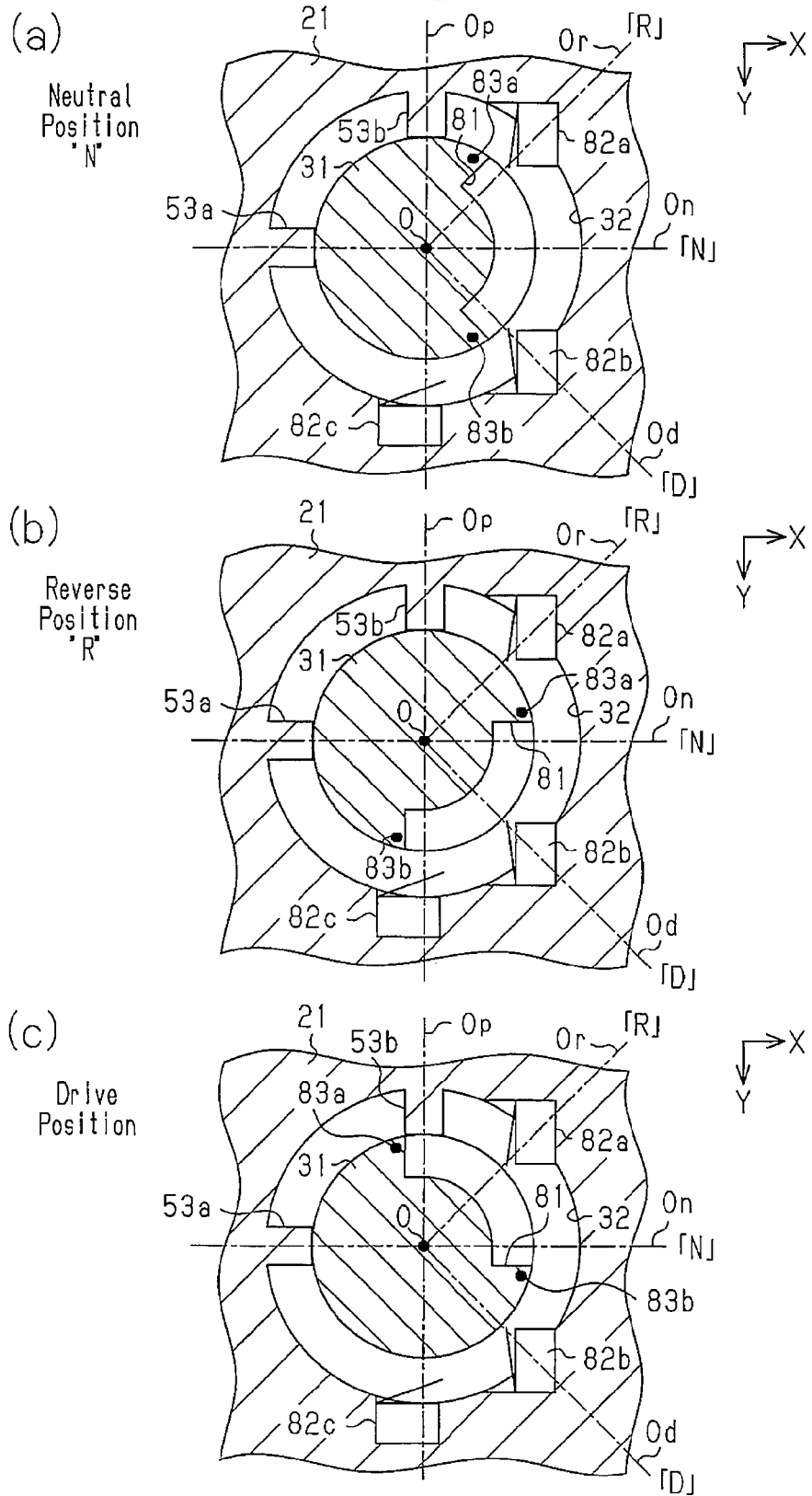
FIGS. 11(a), 11(b), and 11(c) are cross-sectional views taken along line 5-5 of FIG. 5.

As shown in FIG. 11(*a*), the first and the second micro-switches 82*a*, 82*b* are arranged on the sideward sliding side of the knob 22 indicated by the arrow X. Two corners 83*a*, 83*b* are formed at a boundary portion of the two inner side surfaces facing each other in the extending direction of the elongated groove 81, and the outer surface of the shaft 31. The first and the second micro-switches 82*a*, 82*b* are arranged substantially in correspondence to the positions of the two corners 83*a*, 83*b* when the knob 22 is at the neutral position "N". Therefore, when the knob 22 is moved sidewards in the direction of the arrow X at the neutral position "N", the first and the second micro-switches 82*a*, 82*b* are pushed by the two corners 83*a*, 83*b*, and activated.

As shown in FIG. 11(*b*), when the knob 22 is rotated from the neutral position "N" to the reverse drive position "R", the elongated groove 81 moves away from the first micro-switch 82*a*, and is held at a position facing the second micro-switch 82*b*. Therefore, when the knob 22 is moved sidewards in the direction of the arrow X at the reverse drive position "R", the first micro-switch 82*a* is pushed by the outer surface of the shaft 31, and activated. The second micro-switch 82*b*, on the other hand, relatively enters the elongated groove 81 and thus is not pushed, and is kept deactivated.

As shown in FIG. 11(*c*), when the knob 22 is rotated from the neutral position "N" to the forward drive position "D", the elongated groove 81 faces the first micro-switch 82*a* and is held at a position deviated from the second micro-switch 82*b*. Therefore, when the knob 22 is moved sidewards in the direction of the arrow X at the forward drive position "D", the first micro-switch 82*a* relatively enters the elongated groove 81 and is thus not pushed, and is maintained deactivated. The second micro-switch 82*b*, on the other hand, is pushed by the outer surface of the shaft 31, and activated.

A third micro-switch 82*c* is arranged facing the outer surface of the shaft 31 on the center axis Op extending in the vertical direction, and on the sideward sliding side indicated by the arrow Y. As described above, the knob 22 is slidable in the direction of the arrow Y only when at the neutral position "N" (specifically, the lock 66 is also required to be at the right rotation restriction position shown in FIG. 10). When the knob 22 is moved sidewards in the direction of the arrow Y at the neutral position "N", as shown in FIG. 11(*a*), the third micro-switch 82*a* is pushed by the outer surface of the shaft 31, and activated.

<Electrical Structure>

The electrical structure of the above gearshift device will now be described.

Figure 12:
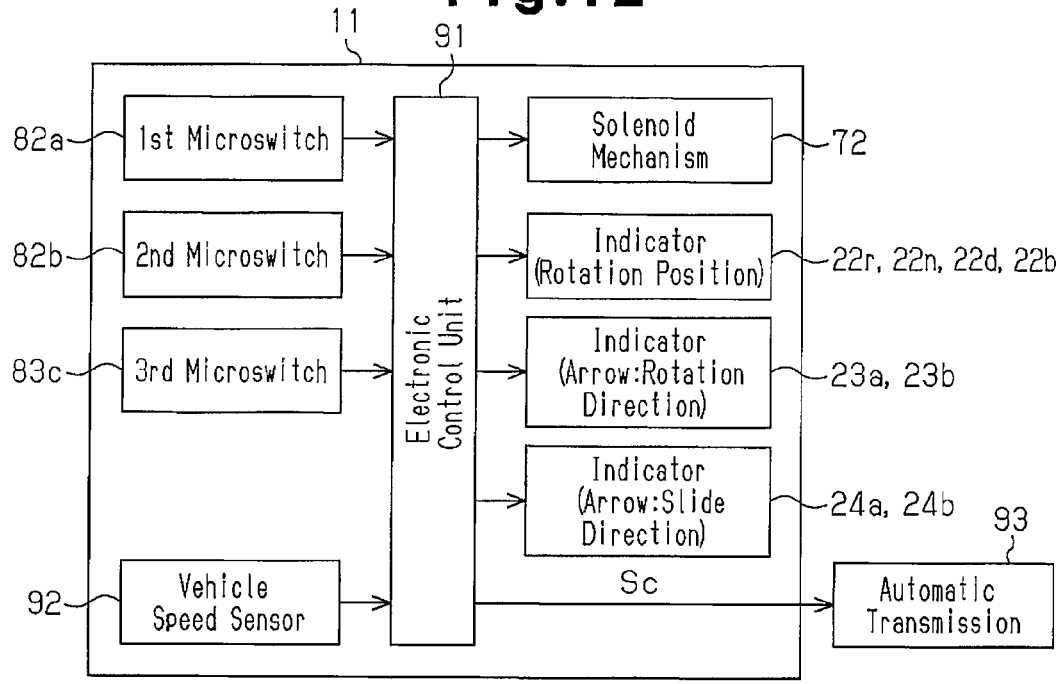
FIG. 12 is a schematic block diagram showing an electrical structure of the gearshift device of FIG. 1.
Figure 13:
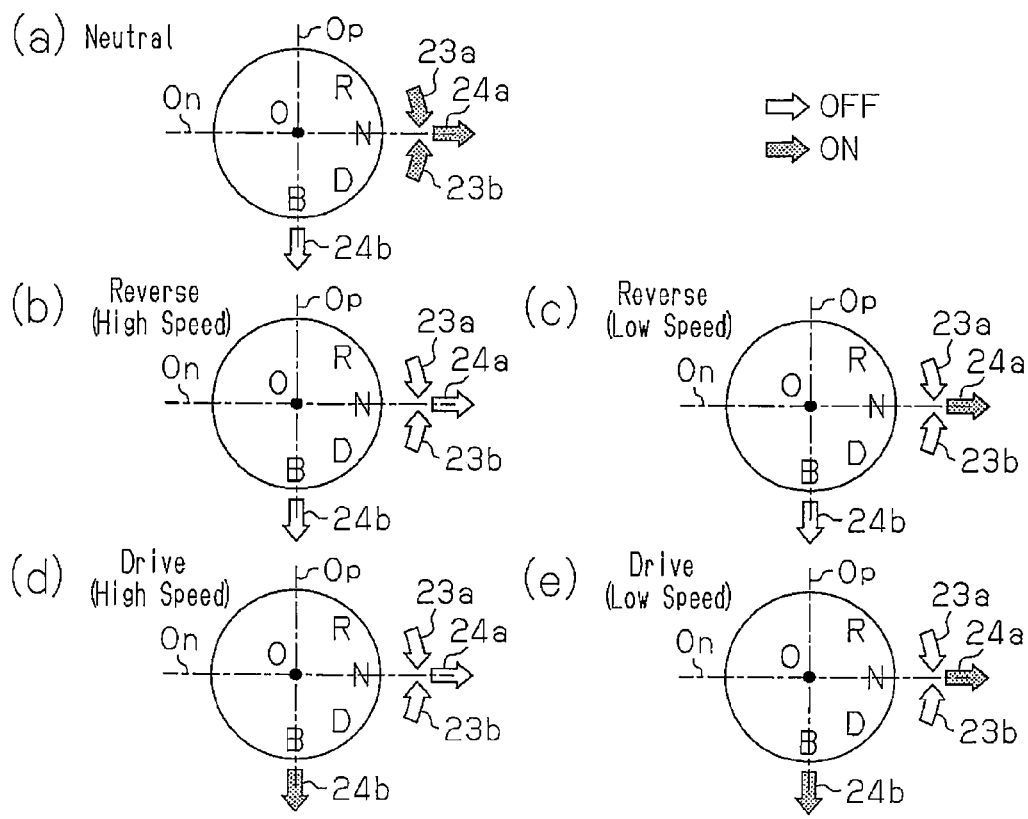
FIG. 13(a) is a front view showing a lighting state of various indicators when an automatic transmission is in a neutral state.
FIGS. 13(b) and 13(c) are front views showing the lighting state of various indicators when the vehicle is moving rearward.
FIGS. 13(d) and 13(e) are front views showing the lighting state of various indicators when the vehicle is moving forward.

As shown in FIG. 12, an electronic control unit 91 of the gearshift device 11 is connected to the first to the third micro-switches 82*a* to 82*c*, the four indicators 22*r*, 22*n*, 22*d*, 22*b* indicating the rotation positions of the knob 22, the two arrow-shaped indicators 24*a*, 24*b*, and the solenoid mechanism 72. The electronic control unit 91 is also connected to a vehicle speed sensor 92 (state detection sensor) and an automatic transmission 93. The vehicle speed sensor 92 detects the traveling speed of the vehicle to generate a vehicle speed signal as a detection signal.

The electronic control unit 91 provides to the solenoid mechanism 72 an activation control signal for stopping the supply of excitation current to the exciting coil 73 when determining that the traveling speed of the vehicle has not reached a predetermined speed determination threshold value based on the vehicle speed signal from the vehicle speed sensor 92. The supply of excitation current to the exciting coil 73 is thereby stopped, and the lock 66 is held at the rotation permission position shown in FIG. 8. The electronic control unit 91 provides to the solenoid mechanism 72 an activation control signal for supplying the excitation current to the exciting coil 73 when determining that the traveling speed of the vehicle has reached the predetermined speed determination threshold value based on the vehicle speed signal from the vehicle speed sensor 92. The excitation current having positive or negative polarity is thereby supplied to the exciting coil 73, and the lock 66 is held at the left rotation restriction position shown in FIG. 9 or the right rotation restriction position shown in FIG. 10. The predetermined speed determination threshold value is set to a value of a so-called low speed area of, for example, 0 km per hour to 10 km per hour. The speed determination threshold value is set to 10 km per hour in the first embodiment.

The electronic control unit 91 receives a detection signal indicating an activation signal or a deactivation signal from each of the first to the third micro-switches 82*a* to 82*c*. The electronic control unit 91 determines the rotation position of the knob 22 based on a combination of the detection signals of the micro-switches 82*a* to 82*c*. Specifically, when receiving the activation signal from both the first and the second micro-switches 82*a*, 82*b*, the electronic control unit 91 determines that the knob 22 is at the neutral position "N" and moved sidewards in the direction of the arrow X to determine the shifting of gears to the gear position (gear stage) corresponding to the neutral position "N". The electronic control unit 91 then generates a gearshift control signal Sc for shifting the gear to the gear position corresponding to the neutral position "N" of the knob 22, and provides the same to the automatic transmission 93. In this case, the electronic control unit 91 maintains the exciting coil 73 in a non-excited state to hold the lock 66 at the rotation permission position shown in FIG. 8.

When receiving the activation signal from the first micro-switch 82*a* and the deactivation signal from the second micro-switch 82*b*, the electronic control unit 91 determines that the knob 22 is at the reverse drive position "R" and moved sidewards in the direction of the arrow X to determine the shifting of gears to the gear position corresponding to the reverse drive position "R". The electronic control unit 91 then generates the gearshift control signal Sc for shifting the gear to the gear position corresponding to the reverse drive position "R" of the knob 22, and provides the same to the automatic transmission 93. In this case, the electronic control unit 91 moves the lock 66 from the rotation permission position shown in FIG. 8 to the left rotation restriction position shown in FIG. 9 by supplying the excitation current having positive polarity to the exciting coil 73 when determining that the traveling speed of the vehicle has reached the predetermined speed determination threshold value through the vehicle speed sensor 92.

When receiving the deactivation signal from the first micro-switch 82a and the activation signal from the second micro-switch 82b, the electronic control unit 91 determines that the knob 22 is at the forward drive position "D" and moved sidewards in the direction of the arrow X to determine the shifting of gears to the gear position corresponding to the forward drive position "D". The electronic control unit 91 then generates the gearshift control signal Sc for shifting the gear to the gear position corresponding to the forward drive position "D" of the knob 22 and provides the same to the automatic transmission 93. In this case, the electronic control unit 91 moves the lock 66 from the rotation permission position shown in FIG. 8 to the right rotation restriction position shown in FIG. 10 by supplying the excitation current having negative polarity to the exciting coil 73 when determining that the traveling speed of the vehicle has reached the predetermined speed determination threshold value through the vehicle speed sensor 92.

When receiving the activation signal from the third micro-switch 82c, the electronic control unit 91 determines that the knob 22 is at the neutral position "N", that is, at the manual operation position "B" and moved sidewards in the direction of the arrow Y to determine the activation of the vehicle function corresponding to the manual operation position "B". The electronic control unit 91 then activates the vehicle function corresponding to the manual operation position "B". In the first embodiment, the electronic control unit 91 controls the motor forming the drive source for driving of the vehicle to apply regenerative brake.

The activation of the vehicle function corresponding to the manual operation position "B" is based on the assumption that the sideward sliding in the direction of the arrow X is detected to determine the shifting of gears to the gear position corresponding to the forward drive position "D". In other words, even if the sideward sliding in the direction of the arrow Y is performed, the vehicle function corresponding to the manual operation position "B" cannot be activated unless after the gear is shifted to the gear position corresponding to the forward drive position "D". If not, that is, if the sideward sliding for shifting to the forward drive position "D" is not detected, the electronic control unit 91 generates the gearshift control signal Sc for shifting the gear to the gear position corresponding to the neutral position "N" of the knob 22, and provides the same to the automatic transmission 93. If the sideward sliding in the direction of the arrow X is performed to shift the gear to the gear position corresponding to the forward drive position "D" with the vehicle function corresponding to the manual operation position "B" activated, the electronic control unit 91 generates the gearshift control signal Sc for shifting the gear to the gear position corresponding to the neutral position "N", and provides the same to the automatic transmission 93.

Furthermore, the electronic control unit 91 lights the four indicators 22r, 22n, 22d, and 22b indicating the rotation positions of the knob 22 when the power of the vehicle is turned ON through the operation of a start switch (not shown). The electronic control unit 91 performs a lighting control of the arrow-shaped indicators 23a, 23b indicating the rotation direction of the knob 22, and the arrow-shaped indicators 24a, 24b indicating the movement direction of the knob 22. That is, the electronic control unit 91 lights only the indicator indicating the operable direction of the indicators 23a, 23b and the indicators 24a, 24b according to the rotation position of the knob 22 and the state of the vehicle. The user can thus visually check the direction in which the knob 22 can be operated.

Specifically, when the sideward sliding for determining the shifting of gears to the gear position corresponding to the neutral position "N" of the knob is performed, the electronic control unit 91 performs the lighting control as shown in FIG. 13(a). That is, the electronic control unit 91 lights the indicators 23a, 23b and the indicator 24a, and maintains the indicator 24b indicating the direction of the arrow Y of the knob 22 in the OFF state.

When the sideward sliding for determining the shifting of the gear to the gear position corresponding to the reverse drive position "R" of the knob 22 is performed and the traveling speed of the vehicle has reached the predetermined speed determination threshold value, the electronic control unit 91 performs the lighting control as shown in FIG. 13(b). That is, the electronic control unit 91 turns OFF all the indicators 23a, 23b, and the indicators 24a, 24b.

When the sideward sliding for determining the shifting of the gear to the gear position corresponding to the reverse drive position "R" of the knob 22 is performed and determination is made that the traveling speed of the vehicle has not reached the predetermined speed determination threshold value, the electronic control unit 91 performs the lighting control as shown in FIG. 13(c). That is, the electronic control unit 91 lights only the indicator 24a indicating the direction of the arrow X of the knob 22, and turns OFF the remaining indicators 23a, 23b, and the indicator 24b.

When the sideward sliding for determining the shifting of the gear to the gear position corresponding to the forward drive position "D" of the knob 22 is performed and determination is made that the traveling speed of the vehicle has reached the predetermined speed determination threshold value, the electronic control unit 91 performs the lighting control as shown in FIG. 13(d). That is, the electronic control unit 91 lights only the indicator 24b indicating the direction of the arrow Y, and turns OFF the remaining indicators 23a, 23b, and the indicator 24a.

When the sideward sliding for determining the shifting of the gear to the gear position corresponding to the forward drive position "D" of the knob 22 is performed and determination is made that the traveling speed of the vehicle has not reached the predetermined speed determination threshold value, the electronic control unit 91 performs the lighting control as shown in FIG. 13(e). That is, the electronic control unit 91 lights the indicator 24a indicating the direction of the arrow X and the indicator 24b indicating the direction of the arrow Y, and turns OFF the remaining indicators 23a, 23b.

As described above, when forces in the rotation direction and the movement direction applied to the knob 22 are eliminated, the knob 22 resiliently returns to the original position in the rotation direction and in the movement direction by the force of the torsion coil spring 42 of the recovery mechanism 40 and the compression coil springs 45, 47. In FIGS. 13(a) to 13(e), the rotation positions of the knob 22 are all shown to be held at the neutral position "N".

Operation of First Embodiment

The operation of the gearshift device 11 will now be described. In the vehicle in the parked state, the drive source for driving is stopped and the gear position of the automatic transmission 93 is held at the parking position. The gearshift device 11 is held at an initial state in the parked state. The rotation position of the knob 22 is held at the neutral position "N" in the initial state. The supply of excitation current to the solenoid mechanism 72 is stopped. Therefore, the lock 66 is held at the rotation permission position shown in FIG. 8.

<Starting of Drive Source>

The user first operates the start switch (not shown) to start the drive source for driving of the vehicle while depressing the brake pedal to drive the vehicle from the parked state. After the power of the vehicle is turned ON, the electronic control unit 91 lights the four indicators 22r, 22n, 22d, and 22b indicating the rotation positions of the knob 22. The electronic control unit 91 also lights the two indicators 23a, 23b indicating the rotation direction of the knob 22 and the indicator 24a indicating the movement direction of the knob 22, as shown in FIG. 13(a). The lock 66 is at the rotation permission position shown in FIG. 8, and the sliding to the lower side of the knob 22 is restricted. Therefore, the electronic control unit 91 maintains the indicator 24b in the OFF state. The user can shift the gear position of the automatic transmission 93 to the desired gear position by operating the knob 22.

<When Moving Rearward>

First, a case of driving the vehicle rearward will be described. In this case, the user rotates the knob 22 from the neutral position "N" to the reverse drive position "R". The fitting recess 51r of the shaft 31 then faces the first fitting projection 52a of the housing 21, and the shaft 31 is movable to the first fitting projection 52a side. The elongated groove 81 of the shaft 31 is held at a position separated from the first micro-switch 82a and facing the second micro-switch 82b, as shown in FIG. 11(b).

When the knob 22 is moved sidewards by the user in the direction indicated by the indicator 24a to determine shifting to the gear position (gear stage) of the automatic transmission 93 corresponding to the reverse drive position "R", this is detected by the first and the second micro-switches 82a, 82b. Specifically, the first micro-switch 82a is pushed by the outer surface of the shaft 31, thereby generating the activation signal. The second micro-switch 82b relatively enters the elongated groove 81, and thus is not pushed by the shaft 31. Therefore, the second micro-switch 82b generates the deactivation signal.

The electronic control unit 91 generates the gearshift control signal Sc for shifting the gear to the gear position corresponding to the reverse drive position "R" of the knob 22 and provides the same to the automatic transmission 93 in response to the activation signal from the first micro-switch 82a and the deactivation signal from the second micro-switch 82b.

Thereafter, the user releases the parking brake by operating a parking brake switch (not shown) and depresses an acceleration pedal (not shown) to drive the vehicle rearward.

When the force on the knob 22 is eliminated after the knob 22 is moved sidewards in the direction indicated by the indicator 24a at the reverse drive position "R", the shaft 31 moves in the direction opposite to the direction indicated by the indicator 24a by the force of the compression coil spring 47 of the recovery mechanism 40. That is, the shaft 31 returns to the original position in the movement direction. The shaft 31 also rotates in the direction opposite to the direction indicated by the indicator 23a by the force of the torsion coil spring 42, and returns to the original position in the rotation direction. Specifically, as shown in FIG. 7, the distal ends of the first and the second projections 53a, 53b contact the outer surface of the shaft 31, and the fitting recess 51r returns to the position facing the first fitting projection 52a. Moreover, the shaft 31 moves in the left direction indicated by the indicator 23ba. The knob 22 then returns to the original position in the horizontal direction and the vertical direction shown with the solid line in FIG. 3. Therefore, the rotation position of the knob 22 is held at the neutral position "N" when the vehicle is being driven rearward.

The electronic control unit 91 recognizes the traveling speed of the vehicle based on the vehicle speed signal from the vehicle speed sensor 92 when the vehicle is being driven rearward. If the traveling speed has not reached the predetermined speed determination threshold value, the electronic control unit 91 continuously stops the supply of excitation current to the exciting coil 73, and holds the lock 66 in the rotation permission state shown in FIG. 8. The electronic control unit 91 lights only the indicator 24a indicating the direction of the arrow X, as shown in FIG. 13(c). Therefore, the user can visually check that the knob 22 can be operated only in the direction indicated by the indicator 24a.

When the traveling speed of the vehicle reaches the predetermined speed determination threshold value thereafter, the electronic control unit 91 provides the activation control signal to the solenoid mechanism 72 to supply the excitation current having positive polarity to the exciting coil 73. The plunger 74 of the solenoid mechanism 72 then moves from the middle position shown in FIG. 8 to the projected position shown in FIG. 9, and the first lock strip 67 of the lock 66 engages the first engagement recess 61 of the shaft 31. That is, the lock 66 moves to the left rotation restriction position (first rotation restriction position). As a result, the left rotation of the shaft 31, that is, the left rotation of the knob 22 is restricted. This restricts shift of the rotation position of the knob 22 from the neutral position "N" to the forward drive position "D", and unintended gearshift of the user is prevented when the vehicle is moving rearward.

When the traveling speed of the vehicle reaches the predetermined speed determination threshold value, the electronic control unit 91 turns OFF all the indicators 23a, 23b and the indicators 24a, 24b, as shown in FIG. 13(b). The user can then visually check that the knob 22 cannot be operated in any direction of the indicators. The knob 22 is prevented from being operated in an unnecessary manner when the vehicle is being driven rearward.

When the brake pedal is depressed and the vehicle is stopped, more specifically, when the traveling speed of the vehicle becomes smaller than the predetermined speed determination threshold value, the electronic control unit 91 provides the activation control signal to the solenoid mechanism 72 to stop the supply of excitation current to the exciting coil 73. The plunger 74 of the solenoid mechanism 72 then moves from the projected position shown in FIG. 9 to the middle position shown in FIG. 8, and the lock 66 moves from the left rotation restriction position shown in FIG. 9 to the rotation permission position (unlock position) shown in FIG. 8. As a result, the rotation of the shaft 31, that is, the rotation of the knob 22 is permitted. The user then either stops the drive source of the vehicle and leaves the vehicle, or shifts the gear position of the automatic transmission 93 by operating the knob 22 and drives the vehicle once more.

<When Moving Forward>

A case of driving the vehicle forward after driving the vehicle rearward, as described above, will now be described. In this case, the user rotates the knob 22 from the neutral position "N" to the forward drive position "D". The fitting recess 51d of the shaft 31 then faces the first fitting projection 52a of the housing 21. Therefore, the shaft 31 is movable toward the first fitting projection 52a. The elongated groove 81 of the shaft 31 is held at the position facing the first micro-switch 82a and separated from the second micro-switch 82b, as shown in FIG. 11(c).

When the knob 22 is moved sidewards by the user in the direction indicated by the indicator 24a to determine the shift to the gear position (gear stage) of the automatic transmission 93 corresponding to the forward drive position "D", this is detected by the first and the second micro-switches 82a, 82b. Specifically, the first micro-switch 82a relatively enters the elongated groove 81, and is thus not pushed by the shaft 31. Therefore, the first micro-switch 82a generates the deactivation signal. The second micro-switch 82b is pushed by the outer surface of the shaft 31, thereby generating the activation signal.

The electronic control unit 91 generates the gearshift control signal Sc for shifting the gear to the gear position corresponding to the forward drive position "D" of the knob 22 and provides the same to the automatic transmission 93 in response to the deactivation signal from the first micro-switch 82a and the activation signal from the second micro-switch 82b. Thereafter, the user releases the parking brake by operating the parking brake switch and depresses the acceleration pedal to drive the vehicle forward.

In the same manner as when driving the vehicle rearward, as described above, the knob 22 returns to the original position in the horizontal direction and the vertical direction shown with the solid line in FIG. 3 when the force applied to the knob 22 is eliminated. The rotation position of the knob 22 is held at the neutral position "N" when the vehicle is being driven forward.

The electronic control unit 91 recognizes the traveling speed of the vehicle based on the vehicle speed signal from the vehicle speed sensor 92 when the vehicle is being driven forward. If the traveling speed has not reached the predetermined speed determination threshold value, the electronic control unit 91 continuously stops the supply of excitation current to the exciting coil 73 and holds the lock 66 in the rotation permission state shown in FIG. 8. The electronic control unit 91 lights only the indicator 24a indicating the direction of the arrow X and the indicator 24b indicating the direction of the arrow Y, as shown in FIG. 13(e). Therefore, the user can visually check that the knob 22 can be operated only in the directions indicated by the indicators 24a, 24b.

When the traveling speed of the vehicle reaches the predetermined speed determination threshold value thereafter, the electronic control unit 91 provides the activation control signal to the solenoid mechanism 72 to supply the excitation current having negative polarity to the exciting coil 73. The plunger 74 of the solenoid mechanism 72 then moves from the middle position shown in FIG. 8 to the retracted position shown in FIG. 10, and the second lock strip 68 of the lock 66 engages the second engagement recess 62 of the shaft 31. That is, the lock 66 moves to the right rotation restriction position (second rotation restriction position). As a result, the right rotation of the shaft 31, that is, the right rotation of the knob 22 is restricted. The shifting of the rotation position of the knob 22 from the neutral position "N" to the reverse drive position "R" is then restricted, and the unintended gearshift of the user is prevented when the vehicle is being driven forward. In this case, the lock wall 64 of the shaft 31 faces the cutout 69 of the lock 66. Therefore, the shaft 31, and furthermore, the knob 22 are only permitted to move to the lower side. The electronic control unit 91 turns OFF the indicators 23a, 23b and the indicator 24a, and lights only the indicator 24b, as shown in FIG. 13(d). Therefore, the user can visually check that the knob 22 can be operated only in the direction indicated by the indicator 24b. Thus, the knob 22 is prevented from being operated in an unnecessary manner when the vehicle is being driven rearward.

When the knob 22 is moved sidewards in the direction indicated by the indicator 24b when the vehicle is being driven forward, the third micro-switch 82c is pushed by the outer surface of the shaft 31, thereby generating the activation signal. When the force on the knob 22 is eliminated thereafter, the knob 22 returns to the original position in the vertical direction, as shown by a solid line in FIG. 3, by the force of the compression coil spring 45 of the recovery mechanism 40. That is, the rotation position of the knob 22 is held at the neutral position "N".

The electronic control unit 91 determines that the knob 22 is moved sidewards in the direction indicated by the indicator 24b to execute the vehicle function corresponding to the manual operation position "B" in response to the activation signal from the third micro-switch 82c. This determination is based on the assumption that the activation signal from the third micro-switch 82c is received after the gear is shifted to the gear position corresponding to the forward drive position "D", as described above. In the first embodiment, a switch function for activating the regenerative brake by the power generating operation of the motor forming the drive source for driving of the vehicle is corresponds to the manual operation position "B". Thus, the regenerative brake is applied by the sliding of the knob 22 in the direction indicated by the indicator 24b.

When the brake pedal is depressed and the vehicle is stopped, more specifically, when the traveling speed of the vehicle becomes smaller than the predetermined speed determination threshold value, the electronic control unit 91 recognizes this based on the vehicle speed signal from the vehicle speed sensor 92 and stops the supply of excitation current to the solenoid mechanism 72. As a result, the lock 66 moves from the right rotation restriction position shown in FIG. 10 to the rotation permission position shown in FIG. 8. The user can shift the knob 22 to any rotation position since rotation of the knob 22 is permitted.

<Neutral State>

A case where the automatic transmission 93 is in the neutral state will now be described. Gears are shifted by sliding the knob in the direction of the arrow X with the rotation position of the knob 22 held at the neutral position "N". As described above, the gearshift is permitted when the drive source of the vehicle is started in the parked state and when the traveling speed becomes smaller than the predetermined speed determination threshold value in driving the vehicle rearward and forward, as described above.

Here, the lock 66 is held at the rotation permission position shown in FIG. 8. The fitting recess 51n of the shaft 31 faces the first fitting projection 52a of the housing 21. Therefore, the movement to the first fitting projection 52a of the shaft 31 is permitted. Furthermore, the elongated groove 81 of the shaft 31 is held at the position separated from both the first and the second micro-switches 82a, 82b, as shown in FIG. 11(a). That is, the first and the second micro-switches 82a, 82b respectively face the two corners 83a, 83b at both sides of the elongated groove 81.

When the knob 22 is moved sidewards by the user in the direction indicated by the indicator 24a to determine shifting to the gear position of the automatic transmission 93 corresponding to the neutral position "N" in this state, this is detected by the first and the second micro-switches 82a, 82b. Specifically, the first and the second micro-switches 82a, 82b are pushed by the two corners 83a, 83b, thereby generating the activation signal.

The electronic control unit 91 generates the gearshift control signal Sc for shifting the gear to the gear position corresponding to the neutral position "N" of the knob 22 and provides the same to the automatic transmission 93 in response to the activation signals from both the first and the second micro-switches 82a, 82b. The automatic transmission 93 then cuts the power transmission of the drive source for driving of the vehicle.

In the same manner as when the vehicle is driven rearward and forward, as described above, the knob 22 returns to the original position in the horizontal direction shown with the solid line in FIG. 3 by the force of the compression coil spring 47 of the recovery mechanism 40 when the force on the knob 22 is eliminated. The indicators 23a, 23b and the indicator 24a are held in the lighted state, and the indicator 24b is held in the OFF state.

Advantages of First Embodiment

The gearshift device 11 of the first embodiment has the advantages described below.

(1) Three fitting recesses 51r, 51n, and 51d each corresponding to the three rotation positions (R, N, D) of the knob 22 are formed on the outer surface of the shaft 31. The first fitting projection 52a fittable to each fitting recess 51r, 51n, 51d is formed on the inner circumferential surface of the insertion hole 32 of the housing 21. When the knob 22 is rotated to one of the three rotation positions, the corresponding one of the fitting recesses 51r, 51n, and 51d faces the first fitting projection 52a. Thus, the sideward sliding of the knob 22 is permitted to determine the shifting to the gear position corresponding to one of the rotation positions only when the knob 22 is rotated to the one of the rotation position. That is, the operations in two different directions for the rotation and for the sideward sliding of the knob 22 are necessary when shifting the gear position of the automatic transmission 93. Thus, unintended shifting of gears (erroneous operation of the gearshift device 11) by the user is prevented.

(2) The sideward sliding of the knob 22 is restricted by the fitting relationship of each fitting recess 51r, 51n, 51d of the shaft 31 and the first fitting projection 52a arranged on the inner circumferential surface of the insertion hole 32. Thus, the sideward sliding of the knob 22 is restricted by a simple structure of arranging the fitting recess 51r, 51n, 51d corresponding to each rotation position of the knob 22 on the shaft 31, and arranging the first fitting projection 52a on the insertion hole 32.

(3) The lock 66 is arranged as the rotation restriction means for restricting the rotation of the knob 22 from one rotation position to another rotation position by engaging the first and the second engagement recesses 61, 62, which are part of the shaft 31. Unintended gearshift is more reliably prevented by mechanically restricting the rotation of the knob 22 by the lock 66. A situation where the rotation of the shaft 31 is not restricted due to failure etc. of the solenoid mechanism 72 serving as a driver means for moving the lock 66 can be assumed. However, even in such case, the operations in two different directions for the rotation and for the sideward sliding of the knob 22 are necessary when shifting the gear position of the automatic transmission 93, as described above. Therefore, erroneous operations of the gearshift device 11 are prevented.

(4) The lock 66 moves between the rotation restriction position (right rotation restriction position and left rotation restriction position) of restricting the rotation of the shaft 31 and the rotation permission position of permitting the rotation based on the excited state of the exciting coil 73 of the solenoid mechanism 72 (driver means). The forward and reverse rotation of the shaft 31 is thus restricted so that the unintended gearshift of the user is more reliably prevented. The electronic control unit 91 merely needs to control ON/OFF of the current flow to the exciting coil 73, and thus a complicated control is unnecessary when restricting the rotation of the knob 22. That is, the rotation of the knob 22 is restricted through a simple control. This prevents an increase in the calculation load of the electronic control unit 91.

(5) The shaft 31 is inserted into the lock 66. When the lock 66 is at the rotation restriction position, the first and the second lock strips 67, 68, which are part of the inner peripheral surface of the lock 66, engage the first and the second engagement recesses 61, 62, which are part of the shaft 31. The rotation of the shaft 31 is thereby restricted. Thus, the structure in which the shaft 31 is inserted into the lock 66 is prevented from being enlarged in the radial direction of the shaft 31 compared to the structure in which the shaft 31 is externally engaged to the lock 66.

(6) A plurality of rotation positions of the knob 22 includes the forward drive position "D", the neutral position "N", and the reverse drive position "R" corresponding to three gear positions of the automatic transmission 93, and the manual operation position "B" corresponding to a specific function performed while driving the vehicle forward. In this case, the neutral position "N" is set as the original position in the rotation direction of the knob 22. The fitting recess 51b corresponding to the manual operation position "B" is arranged on the outer surface of the shaft 31, and the second fitting projection 52b that is fitted to the fitting recess 51b is arranged on the inner circumferential surface of the insertion hole 32. The fitting recess 51b faces the second fitting projection 52b only when the knob 22 is held at the neutral position "N".

As described above, the knob 22 returns to the original position in the movement direction and the original position in the rotation direction by the recovery mechanism 40 when the force applied to the knob 22 is eliminated. The sideward sliding to another direction (direction of arrow Y) for determining the activation of the specific vehicle function corresponding to the manual operation position "B" is permitted only when the knob 22 is held at the neutral position "N", which is the original position in the rotation direction of the knob 22. Therefore, the activation (sideward sliding in the direction of the arrow Y) of the specific vehicle function corresponding to the manual operation position "B" is easily carried out. In the first embodiment, the lock 66 also needs to be held at the right rotation restriction position shown in FIG. 10 for the sideward sliding in the direction of the arrow Y to be permitted.

(7) The elongated groove 81 extending in the circumferential direction is formed on the outer surface of the shaft 31. The first to the third micro-switches 82a, 82b, and 82c arranged in correspondence to the path of the elongated groove 81 are used as detection means for detecting the rotation and the sideward sliding of the knob 22. The relative position of the first to the third micro-switches 82a to 82c with respect to the shaft 31 moves between the position corresponding to the outer surface of the shaft 31 and the position corresponding to the elongated groove 81 of the shaft 31 according to the rotation position of the knob 22. When the knob 22 is moved sidewards at the position the first to the third micro-switches 82a to 82c correspond to the outer surface of the shaft 31, the first to the third micro-switches 82a to 82c are pushed by the outer surface of the shaft 31 and thus are activated. When the knob 22 is moved sidewards at the position the first to the third micro-switches 82a to 82c face the elongated groove 81 of the shaft 31, the first to the third micro-switches 82*a* to 82*c* enter the elongated groove 81. The micro-switches 82*a* to 82*c* are not pushed by the outer surface of the shaft 31 and thus are deactivated. The electronic control unit 91 determines at which one of the rotation positions the knob 22 is moved sidewards at, that is, to which gear position the gear is shifted based on the combination of the activation signal and the deactivation signal from the first to the third micro-switches 82*a* to 82*c*. Thus, the electronic control unit 91 does not need to perform a complicated signal processing when detecting the operation position of the knob 22. This suppresses the calculation load of the electronic control unit 91.

(8) A movement recovery means for returning the knob 22 to the original position in the movement direction is used. The movement recovery means is inserted into the shaft 31 in the slide member accommodation portion 43, and includes an inner slide member 46 rotatable relative to the shaft 31 and movable sidewards (direction of arrow X) integrally with the shaft 31. Furthermore, the movement recovery means includes a compression coil spring 47, arranged between the inner slide member 46 and the inner surface of the slide member accommodation portion 43 (more precisely, inner peripheral surface of the outer slide member 44), serving as an urging member for constantly urging the inner slide member 46 in the direction opposite to the movement direction of the shaft 31. The shaft 31, and furthermore, the knob 22 are easily returned to the original position in the movement direction by the force of the compression coil spring 47. The failure that the compression coil spring 47 influences the rotation of the shaft 31 is avoided as the force of the compression coil spring 47 acts on the shaft 31 through the inner slide member 46.

(9) The torsion coil spring 42 attached to the shaft 31 is used as the rotation recovery means for returning the knob 22 to the original position in the rotation direction. The ends 42*a*, 42*b* of the torsion coil spring 42 intersect each other. The lock projection 41*b* arranged on the outer surface of the shaft 31 and the spring seat projection 48 arranged on the inner slide member 46 are arranged between the ends 42*a*, 42*b*. The lock projection 41*b* engages one end of the torsion coil spring 42 with the rotation of the shaft 31. The other end of the torsion coil spring 42 contacts the spring seat projection 48 and restricts the rotation of the torsion coil spring 42. Therefore, the lock projection 41*b* rotates in the same direction as the shaft 31 with the rotation of the shaft 31 while engaging one end of the torsion coil spring 42. The force in the direction opposite to the rotation direction of the shaft 31 is thereby accumulated in the torsion coil spring 42. When the rotational force on the knob 22 is eliminated, the shaft 31 returns to the original position in the rotation direction by the force of the torsion coil spring 42. Therefore, the structure of returning the knob 22 to the original position in the rotation direction is simple.

(10) Two indicators 23*a*, 24*b* for showing with light the rotation direction of the knob 22 and two indicators 24*a*, 24*b* for showing with light the movement direction of the knob 22 are arranged in the vicinity of the knob 22 on the ornamental surface 21*a* of the housing 21. The electronic control unit 91 lights the indicator indicating the operable direction at different times of the indicators 23*a*, 23*b*, 24*a*, 24*b* according to the rotation position of the knob 22. Thus, the user visually checks the operable direction of the knob 22. The knob 22 is prevented from being operated in an unnecessary manner in the direction indicated by the indicator that is not lighted.

(11) The first and the second contact walls 54*a*, 54*b* are arranged on the outer surface of the shaft 31 as a stopper for restricting the rotation range of the knob 22 to a predetermined angular range. Therefore, the rotation position of the knob 22 is set within the angular range of the stopper. The operation beyond the rotation range of the knob 22 is thereby restricted by a simple structure. The operability of the knob 22 is also ensured by restricting excessive rotation of the knob 22.

(12) The four fitting recesses 51*r*, 51*n*, 51*d*, 51*b*, the solenoid mechanism 72, the first to the third micro-switches 82*a* to 82*c*, and the electronic control unit 91 are all arranged inside the housing 21. In other words, the gearshift device 11 is formed as a single unit and attached to the accommodation portion 10*a* of the instrument panel 10. Thus, assembly outside the arrangement object becomes possible by providing the gearshift device 11 as a single unit. The attachment of the gearshift device 11 to the arrangement object is completed by simply attaching the unit assembled outside in advance to the attachment portion (the accommodation portion 10*a* of the instrument panel 10 herein) of the arrangement object. Thus, the attachment task of the gearshift device 11 to the arrangement object becomes simpler than the assembly task of individually assembling the components of the gearshift device 11 to the arrangement object. The assembly task of the gearshift device 11 does not exclude individual assembly of the components of the gearshift device 11 to the instrument panel 10 or the arrangement object. Such assembly method may be used.

Second Embodiment

A gearshift device according to a second embodiment of the present invention will now be described. The second embodiment differs from the first embodiment in the structure of the rotation restriction means for restricting the rotation of the knob 22.

Figure 14:
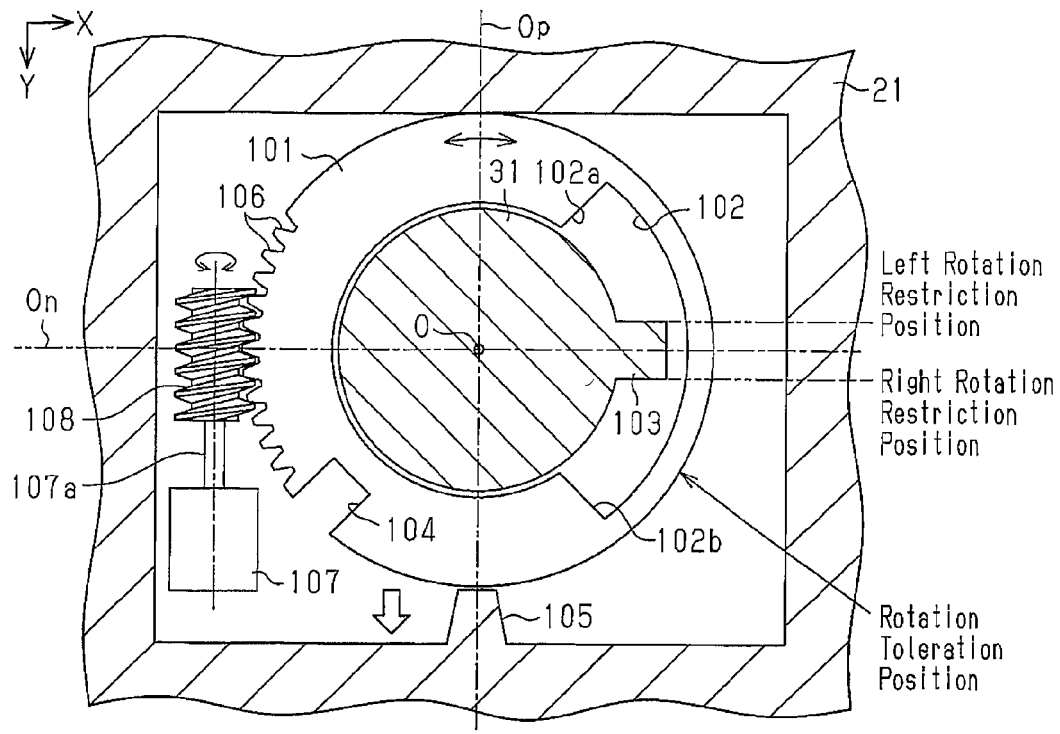
FIG. 14 is a cross-sectional view taken along line 4-4 of FIG. 5 showing a lock according to a second embodiment.

As shown in FIG. 14, a circular ring plate-shaped lock 101 is inserted into the shaft 31 in a slidable and rotatable manner in the lock accommodation portion 65 of the housing 21. A restriction cutout 102 extending in the circumferential direction of the lock 101 is formed at the portion on the arrow X side of the inner circumferential surface of the lock 101. The length of the restriction cutout 102 in the circumferential direction of the lock 101 corresponds to the rotation range of the shaft 31 determined based on the engagement relationship of the first and the second contact walls 54*a*, 54*b* and the first fitting projection 52*a*, described above, shown in FIG. 7. Furthermore, as shown in FIG. 14, when the rotation position of the knob 22 is held at the neutral position "N", the restriction cutout 102 is formed such that the center axis On extending in the horizontal direction passes through the center in the extending direction of the restriction cutout 102.

A restriction projection 103 formed on the outer surface of the shaft 31 is arranged in the restriction cutout 102. When the rotation position of the knob 22 is held at the neutral position "N", the restriction projection 103 is positioned on the center axis On extending in the horizontal direction. The rotation of the shaft 31 involved in the rotation of the knob 22 from the neutral position "N" to the reverse drive position "R", or from the neutral position "N" to the forward drive position "D" is permitted by the movement of the restriction projection 103 in the restriction cutout 102. At normal times, the lock 101 is held at the rotation permission position of permitting the rotation of the shaft 31 involved in the rotation of the knob 22.

The lock 101 rotationally moves between the left rotation restriction position at which the restriction projection 103 held on the center axis On engages an inner side surface 102*a* on the upper side of the restriction cutout 102, and the right rotation restriction position at which the restriction projection 103 engages an inner side surface 102b on the lower side of the restriction cutout 102. When the lock 101 is held at the left rotation restriction position, the left rotation of the shaft 31, that is, the rotation of the knob 22 from the neutral position "N" to the forward drive position "D" is restricted. When the lock 101 is held at the right rotation restriction position, the right rotation of the shaft 31, that is, the rotation of the knob 22 from the neutral position "N" to the reverse drive position "R" is restricted. In FIG. 14, the positions of the inner side surfaces 102a, 102b of when the lock 101 is at the right rotation restriction position and the left rotation restriction position are shown with a double-dashed line.

An engagement cutout 104 is formed with a predetermined spacing from the restriction cutout 102 on the right rotation direction side of the restriction cutout 102 at the outer circumferential surface of the lock 101. When the lock 101 is at the right rotation restriction position at which the inner side surface 102b of the restriction cutout 102 engages the restriction projection 103, the engagement cutout 104 faces an engagement projection 105 formed at the inner bottom surface of the lock accommodation portion 65. The engagement projection 105 is arranged to be engageable with the engagement cutout 104, and to be positioned on the center axis Op when seen from the axial direction of the shaft 31.

A plurality of teeth 106 are formed over a predetermined angular range at the portion on the opposite side of the restriction cutout 102 at the outer circumferential surface of the lock 101. The alignment of the teeth 106 is inclined with respect to the rotation axis of the lock 101 (coincide with the rotation axis C of the knob 22). In other words, the teeth 106 are formed in a helical form. The teeth 106 are engaged with a worm 108 (transmission mechanism) which rotates about an axis parallel to the center axis Op as an output shaft 107a of the motor 107 rotates. That is, the lock 101 (more accurately, portion including the teeth 106) and the worm 108 form a worm mechanism. Therefore, the rotational force of the motor 107 is converted to the rotational force of the lock 101 by the worm 108. The lock 101 rotates to the right when the motor 107 is rotated in the forward direction, and the lock 101 rotates to the left when the motor 107 is rotated in the reverse direction.

The lock 101, the motor 107, and the worm 108 described above are integrally movable in the directions of the arrows X, Y by way of a supporting mechanism (not shown).

When the traveling speed of the vehicle reaches the predetermined speed determination threshold value when the vehicle is moving forward, the electronic control unit 91 rotates in the reverse direction the motor 107 to rotationally move the lock 101 to the right rotation restriction position. The right rotation of the shaft 31, that is, the rotation of the knob 22 from the neutral position "N" to the reverse drive position "R" is restricted as the inner side surface 102b of the restriction cutout 102 engages the restriction projection 103.

When the traveling speed of the vehicle reaches the predetermined speed determination threshold value when the vehicle is moving rearward, the electronic control unit 91 rotates in the forward direction the motor 107 to rotationally move the lock 101 to the left rotation restriction position. The left rotation of the shaft 31, that is, the rotation of the knob 22 from the neutral position "N" to the forward drive position "D" is restricted as the inner side surface 102a of the restriction cutout 102 engages the restriction projection 103.

Therefore, according to the second embodiment, the rotation of the shaft 31 is restricted by activating the motor 107. Unintended gearshift by the user can thus be prevented in the same manner as the first embodiment.

Figure 15:
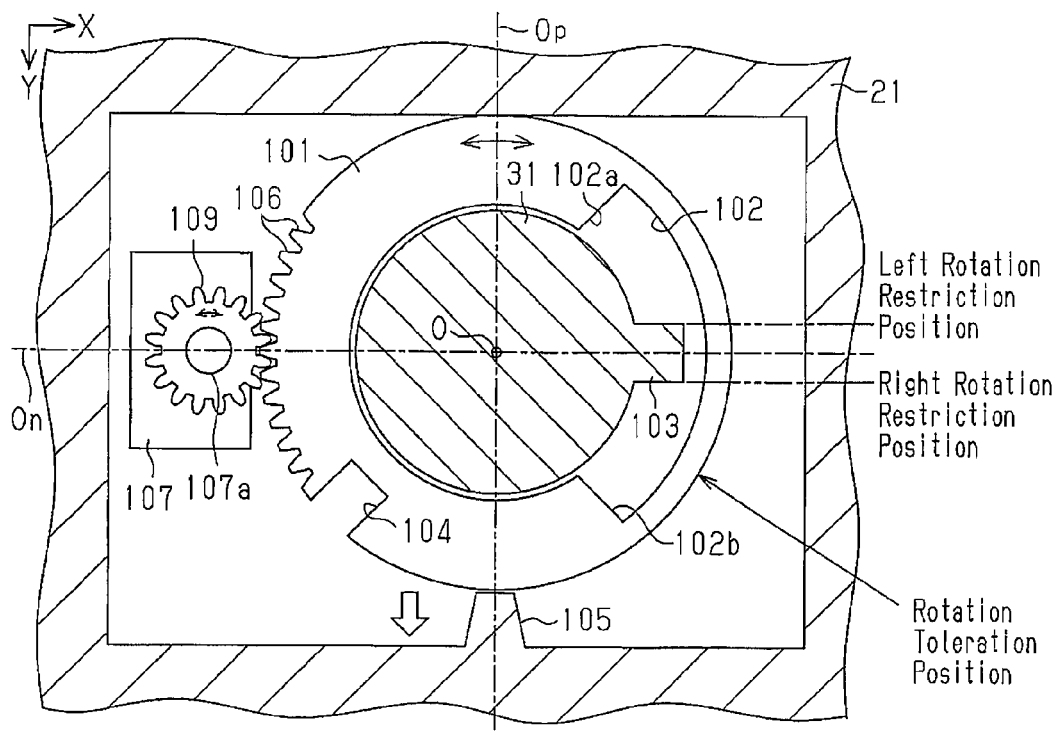
FIG. 15 is a cross-sectional view taken along line 4-4 of FIG. 5 showing a modification of the second embodiment.

The second embodiment may be modified as below. The alignment of the teeth 106 extends in the same direction as the rotation axis O of the knob 22. A spur gear 109 which rotates about an axis parallel to the rotation axis O of the knob 22 engages with the teeth 106 with the driving of the motor 107, as shown in FIG. 15. Therefore, the rotational force of the motor 107 is converted to the rotational force of the lock 101 through the spur gear 109. When the motor 107 is rotated in the forward direction, the lock 101 rotates to the right to the left rotation restriction position. When the motor 107 is rotated in the reverse direction, the lock 101 rotates to the left to the right rotation restriction position. In such a manner, the same advantages as the first embodiment are obtained.

In the second embodiment, a rotary solenoid which takes three rotation positions may be used as a rotary actuator for rotating the lock 101 other than the motor 107.

Third Embodiment

A gearshift device of the third embodiment of the present invention will now be described. The third embodiment is basically formed in a manner similar to the gearshift device 11 shown in FIGS. 1 to 13. The third embodiment differs from the first embodiment in the structure of the recovery means for returning the knob 22 to the original position in the movement direction when the force in the movement direction of the knob 22 is eliminated. The third embodiment may be applied to the second embodiment.

As shown in FIG. 16(a), a spring accommodation hole 111 is formed at an inner end face of the shaft 31. The spring accommodation hole 111 accommodates a cylindrical slidable member 113 with a compression coil spring 112 in a manner preventing the slidable member 113 from falling out. The distal end of the slidable member 113 has a spherical shape and is projected out from the inner end face of the shaft 31. The slidable member 113 is arranged to be movable towards the inner side of the spring accommodation hole 111 against the force of the compression coil spring 112.

First and second guide grooves 114, 115 extending in two movement directions of the knob 22 indicated by arrows X, Y are formed at the portion facing the distal end surface of the shaft 31 on the inner surface of the housing 21, more specifically, the inner bottom surface of the insertion hole 32. As shown in FIG. 16(b), the first and the second guide grooves 114, 115 are formed so as to overlap each other at one end. As shown in FIG. 16(c), an inclined surface 114a inclined to the inner side of the housing 21 (direction of moving closer to the distal end surface of the shaft 31) towards the direction of the arrow X is formed at the inner bottom surface of the first guide groove 114 extending in the direction indicated by the arrow X. Similarly, an inclined surface 115a inclined to the inner side of the housing 21 (direction of moving closer to the distal end surface of the shaft 31) towards the direction of the arrow Y is formed at the inner bottom surface of the second guide groove 115 extending in the direction indicated by the arrow Y.

When the force in the directions of the arrows X, Y is not applied to the knob 22, the spherical distal end of the slidable member 113 engages the overlapping portion of the first and the second guide grooves 114, 115, as shown in FIG. 16(c). The distal end of the slidable member 113 is held in a state pushed against the overlapping portion of the first and the second guide grooves 114, 115 by the force of the compression coil spring 112. If the force in the direction of the arrow X is applied to the knob 22 in this state, the slidable member 113 slides so as to move up the inclined surface 114a while moving into the spring accommodation hole 111 against the force of the compression coil spring 112, as shown by the double-dashed line in FIG. 16(c). If the force in the direction of the arrow X applied to the knob 22 is eliminated, the slidable member 113 slides so as to move down the inclined surface 114a while being urged out of the spring accommodation hole 111 by the force of the compression coil spring 112 and reaches the overlapping portion of the first and the second guide grooves 114, 115. This is the same for when the force in the direction of the arrow Y is applied to the knob 22.

Therefore, in the third embodiment as well, if the force in the movement direction applied to the knob 22 is eliminated, the knob 22 is returned to the original position in the movement direction. In this case, the compression coil springs 45, 47 of the recovery mechanism 40, as well as, the outer slide member 44 and the inner slide member 46 in the first embodiment may be omitted. The rotational return of the shaft 31 may be carried out by the torsion coil spring 42 in the same manner as the first embodiment, and thus the structure corresponding to the spring seat projection 48 is arranged inside the housing 21.

As shown in FIG. 16(d), the inclined surfaces 114a, 115a may be formed as curved surfaces in which the cross-sectional shape at the virtual plane orthogonal to the direction (direction of the arrow X and direction of the arrow Y) the distal end of the slidable member 113 is guided is convex in a separation direction with respect to the distal end of the shaft 31. In this case, the distal end of the slidable member 113 is more stably guided.

Fourth Embodiment

A gearshift device of a fourth embodiment of the present invention will now be described. The fourth embodiment is basically formed in a manner similar to the gearshift device 11 shown in FIGS. 1 to 13. However, the fourth embodiment differs from the first embodiment in that each rotation position of the knob is detected-by a magnetic sensor. In the fourth embodiment, the elongated groove 81 of the shaft 31 is omitted. The fourth embodiment may be applied to the second and the third embodiments.

As shown in FIG. 17(a), a magnet 121 is fixed at a portion closer to the periphery at the distal end surface (end surface on the side opposite to the knob 22) of the shaft 31. A substrate 122 is arranged in the housing 21, more specifically, the inner bottom surface of the insertion hole 32 so as to face the distal end surface of the shaft 31. Three hall sensors 123r, 123n, and 123d are arranged on the side surface of the substrate 122 facing the shaft 31. As shown in FIG. 17(b), the hall sensors 123r, 123n, and 123d are arranged in correspondence to the movement path of the magnet 121 involved in the rotation of the shaft 31. When the knob 22 is rotated to one of the reverse drive position "R", the neutral position "N", and the forward drive position "D", the corresponding one of the hall sensors 123r, 123n, and 123d faces the magnet 121. Such hall sensors 123r, 123n, and 123d have a hall element and a signal processing circuit thereof formed to an integrated circuit as a single IC chip, and generates a detection signal corresponding to magnetic field intensity. The hall sensors 123r, 123n, and 123d detect the magnetic field produced from the opposing magnet 121, and provide the detection signal indicating the rotation position of the knob 22 to the electronic control unit 91.

As shown in FIG. 17(c), two micro-switches 124a, 124b are arranged facing on the arrow X, Y side of the shaft 31. When the knob 22 is moved sidewards in the direction of the arrow X, the micro-switch 124a arranged on the arrow X side is pushed by the outer surface of the shaft 31 and activated. When the knob 22 is moved sidewards in the direction of the arrow Y, the micro-switch 124b arranged on the arrow Y side is pushed by the outer surface of the shaft 31 and activated. That is, the sideward sliding in the direction of the arrow X and the direction of the arrow Y of the knob 22 is detected by the two micro-switches 124a, 124b.

The electronic control unit 91 provides to the automatic transmission 93 the gearshift control signal Sc for shifting to the gear position corresponding to the rotation position of the knob 22 based on the detection signals from the hall sensors 123r, 123n, 123d and the detection signals from the micro-switches 124a, 124b. According to the fourth embodiment, the rotation position of the knob 22 is detected in a non-contact manner by the hall sensors 123r, 123n, and 123d. Therefore, wear by repetitive detection of the rotation position does not occur, and the detection reliability of the rotation position of the knob 22 is improved. Each hall sensors 123r, 123n, and 123d may be replaced by an MR sensor. The MR sensor has a magneto-resistance effect element and a signal processing circuit thereof formed to an integrated circuit as a signal IC chip, and generates a detection signal corresponding to the magnetic field direction.

The rotation position of the knob 22 may be obtained in the following manner. A circular disc-shaped magnet (not shown) is arranged at the distal end surface of the shaft 31, and a signal MR sensor (not shown) is arranged so as to face the magnet. The MR sensor generates a detection signal corresponding to the change in the magnetic flux direction produced from the magnet with the rotation of the shaft 31. The electronic control unit 91 can thus be detected by the rotational angle, that is, the rotation position of the knob 22 based on the detection signal from the MR sensor. In the same manner as described above, the sideward sliding of the knob 22 is detected by the micro-switches 124a, 124b.

Furthermore, in the fourth embodiment, the sideward sliding of the knob 22 may be detected using a magnetic sensor such as the hall sensor and the MR sensor described above. In this case, the micro-switches 124a, 124b shown in FIG. 17(c) are replaced by the magnetic sensor. That is, two magnetic sensors 125a, 125b are arranged on the shaft 31 facing the directions of arrows X and Y, as shown in FIG. 17(d). An annular magnet 12G polarized to multiple poles in the circumferential direction is externally fitted to the portion corresponding to the magnetic sensors 125a, 125b at the outer surface of the shaft 31. When the magnet 12G moves closer with the sideward sliding in the direction of the arrow X, Y of the knob 22, the magnetic sensors 125a, 125b generate an activation signal. The electronic control unit 91 detects the sideward sliding of the knob 22 based on the activation signals from the magnetic sensors 125a, 125b, and provides to the automatic transmission 93 the gearshift control signal Sc for shifting the gear to the gear position corresponding to the rotation position of the knob 22 in time of such sideward sliding. As even the sideward sliding of the knob 22 is detected in a non-contact manner by the magnetic sensors 125a, 125b, wear caused by repetitive detection of the sideward sliding does not occur, and the detection reliability of the sideward sliding of the knob 22 is enhanced. The annular magnet 126 is used in the fourth embodiment but the shape thereof may be appropriately changed, where the magnet merely needs to face the magnetic sensors 125a, 125b when the knob 22 is rotated to each rotation position.

In addition, the fourth embodiment may use the following structure. As shown in FIG. 17(e), the three hall sensors 123r, 123n, and 123d arranged on the side surface on the sideward sliding side of the substrate 122 are arranged such that the magnet 121 faces one of the hall sensors 123r, 123n, 123d when the knob 22 (shaft 31) is moved sidewards in the direction of the arrow X from one of the rotation positions of the reverse drive position "R", the neutral position "N", and the forward drive position "D". One of the hall sensors 123r, 123n, and 123d detects the magnetic field produced from the opposing magnet 121. The electronic control unit 91 receives the magnetic field detection signal as the detection signal indicating from which rotation position the knob 22 is moved sidewards. The electronic control unit 91 provides to the automatic transmission 93 the gearshift control signal Sc for shifting to the gear position corresponding to the rotation position of the knob 22 based on the detection signal from each hall sensor 123r, 123n, 123d.

According to such structure, from which rotation position the knob 22 is moved sidewards can be detected in a non-contact manner with only three hall sensors 123r, 123n, and 123d. Therefore, as shown in FIGS. 17(a), (b), and (d), the number of required magnetic sensors can be reduced compared to when arranging the magnetic sensor for two purposes, for detection of the rotation position and for detection of the sideward sliding of the knob 22.

Fifth Embodiment

A gearshift device 211 of the fifth embodiment of the present invention will be described centering on differences from the first embodiment.

<Brief Overview of the Operation of the Gearshift Device>

Figure 20:
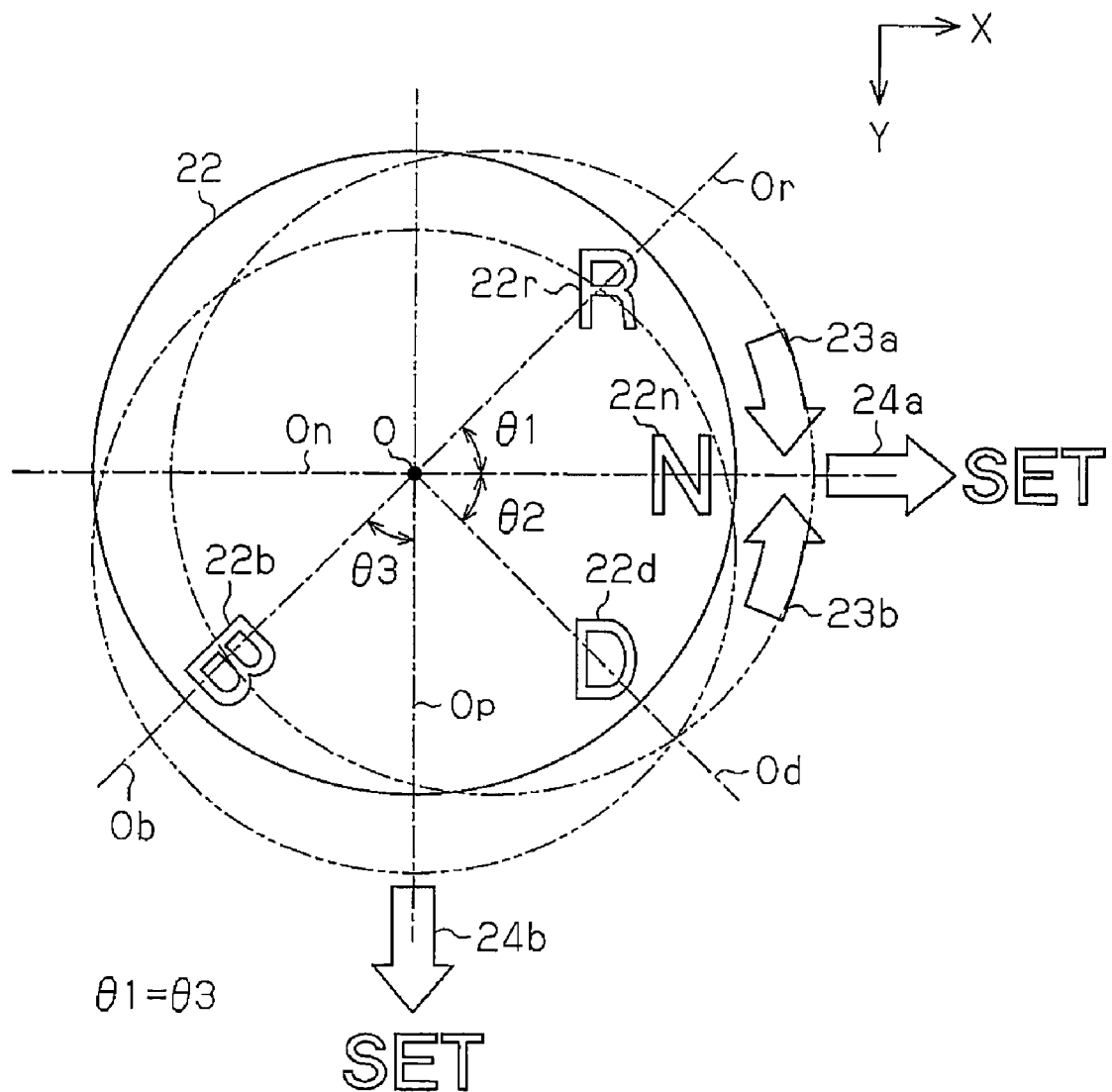
FIG. 20 is a front view showing an operation position of the knob arranged in a gearshift device of a fifth embodiment.

As shown in FIG. 20, the gearshift device 211 differs from that of the first embodiment (see FIG. 3) in the manual operation position "B" of the knob 222. In the fifth embodiment, the indicator 22b indicating the manual operation position "B" is on a center axis Ob at a predetermined angle θ3 in a right rotation direction of the knob 222 with respect to the center axis Op extending in a vertical direction orthogonal to the center axis On. In the fifth embodiment, the predetermined angle θ2 and the predetermined angle θ3 are set to the same value.

Therefore, when the knob 222 is rotated such that the indicator 22d indicating the forward drive position "D" is positioned on the center axis On, the indicator 22b indicating the manual operation position "B" is positioned on the center axis Op extending in the vertical direction. That is, the knob 222 is shifted to the forward drive position "D", and at the same time, shifted to the manual operation position "B". The knob 222 is moved sidewards in the direction of the arrow Y only at this position. When the vehicle is being driven forward where the knob 222 is shifted to the forward drive position "D", the function of the vehicle corresponding to the manual operation position "B" is activated when the knob 222 is moved sidewards in the direction of the arrow Y. In the fifth embodiment, the regenerative brake by the motor forming the drive source for driving of the vehicle is applied.

<Detailed Structure of the Gearshift Device>

In the same manner as the first embodiment, a cylindrical shaft 231 extending in a direction along the rotation axis O of the knob 222 is coaxially arranged at the knob 222, as shown in FIGS. 21(a), (b). The outer diameter of the shaft 231 is smaller than the outer diameter of the knob 222. The shaft 231 forms a gearshift member with the knob 222.

In a housing 221, an ornamental surface 221a or the attachment portion of the knob 222 is formed with an insertion hole 232 (see e.g., FIG. 22) that opens in the ornamental surface 221a and has a circular cross-section into which the shaft 231 can be inserted. The inner diameter of the insertion hole 232 is larger than the outer diameter of the shaft 231 and smaller than the outer diameter of the knob 222. The shaft 231 is inserted into the insertion hole 232 from the outer side. The shaft 231 is held so as to be rotatable relative to the housing 221, and slidable in a radial direction of the shaft 231 by a gap between an outer surface of the shaft 231 and an inner circumferential surface of the insertion hole 232.

<Holding Mechanism of the Shaft>

Figure 22:
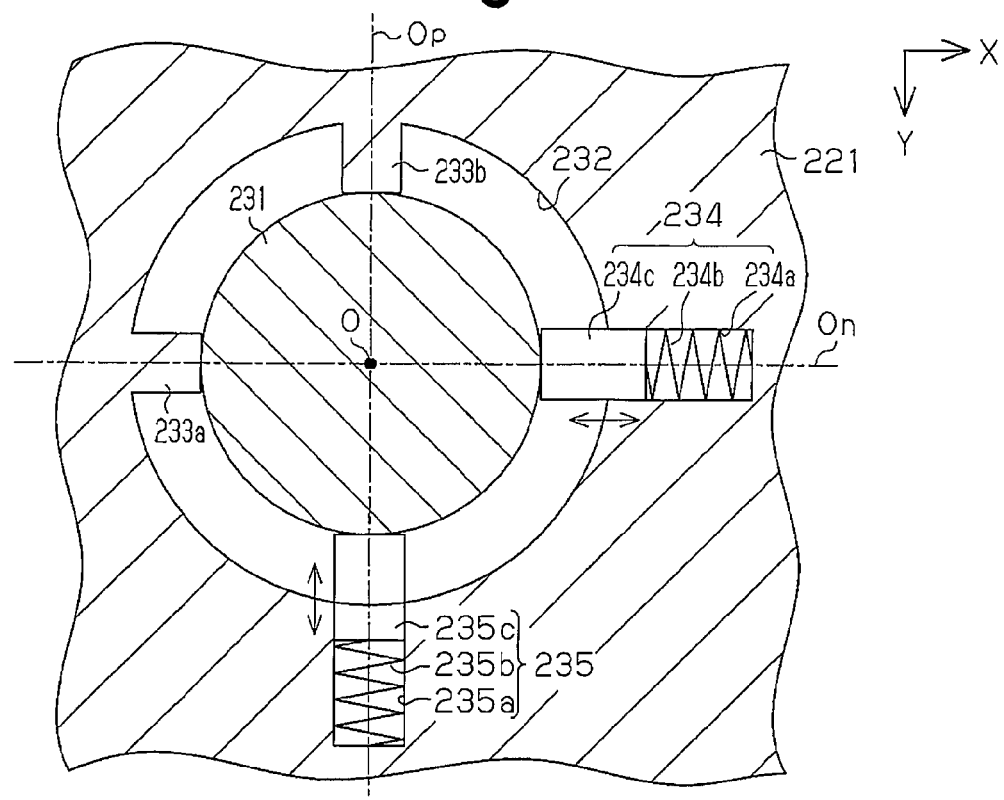
FIG. 22 is a cross-sectional view taken along line 2A-2A of FIG. 21.

As shown in FIG. 22, first and the second projections 233a, 233b (guide member) are formed at predetermined intervals in the circumferential direction at portions corresponding to the central part in the axial direction of the shaft 231. The first and the second projections 233a, 233b are formed over substantially the entire length of the shaft 231. When the insertion hole 232 is seen from its axial direction, the first projection 233a is formed at a portion on the center axis On extending in the horizontal direction and on the direction opposite to the movement direction of the knob 222 indicated by the arrow X in FIG. 22 at the inner circumferential surface of the insertion hole 232. The second projection 233b is formed at a portion on the center axis Op extending in the vertical direction and on the direction opposite to the movement direction of the knob 222 indicated by the arrow Y in FIG. 22 at the inner circumferential surface of the insertion hole 232.

A first urging mechanism 234 (movement recovery unit) for constantly urging the shaft 231 to the direction opposite to the movement direction in the horizontal direction of the knob 222 is arranged at a portion (right side in FIG. 22) on the center axis On extending in the horizontal direction and on the same side as the movement direction of the knob 222 indicated with the arrow X in FIG. 22 at the inner circumferential surface of the insertion hole 232. A second urging mechanism 235 (movement recovery means) for constantly urging the shaft 231 to the direction opposite to the movement direction in the vertical direction of the knob 222 is arranged at a portion (lower part in FIG. 22) on the center axis Op extending in the vertical direction and on the same side as the movement direction of the knob 222 indicated with the arrow Y in FIG. 22 at the inner circumferential surface of the insertion hole 232.

The first and the second urging mechanisms 234, 235 respectively include compression coil springs 234b, 235b accommodated in spring accommodation portions 234a, 235a that open in the inner circumferential surface of the insertion hole 232, and pushing rods 234c, 235c constantly urged in a direction for projecting out from the spring accommodation portion 234a, 235a by the force of the compression coil spring 234b, 235b. The two pushing rods 234c, 235c are arranged to be movable along the spring accommodation portions 234a, 235a. The movement of the pushing rods 234c, 235c in the direction of projecting out from the spring accommodation portions 234a, 235a is restricted when the distal ends of the pushing rods 234c, 235c come into contact with the outer surface of the shaft 231.

Therefore, the shaft 231 is constantly urged towards first projection 233a by the pushing rod 234c of the first urging mechanism 234, and constantly urged towards the second projection 233b by the pushing rod 235c of the second urging mechanism 235. The movement of the shaft 231 in the direction opposite to the direction of the arrow X shown in FIG. 22 is restricted when the outer surface of the shaft 231 contacts the first projection 233a. The movement of the shaft 231 in the direction opposite to the direction of the arrow Y shown in FIG. 22 is restricted when the outer surface of the shaft 231 contacts the second projection 233b. That is, the shaft 231 is positioned in the horizontal direction in the insertion hole 232 when pushed against the first projection 233a by the pushing rod 234c. Furthermore, the shaft 231 is positioned in the vertical direction in the insertion hole 232 when pushed against the second projection 233b by the pushing rod 235c.

When the knob 222 is rotated, the outer surface of the shaft 231 slides relative to the distal ends of the first and the second projections 233a, 233b and the distal ends of the pushing rods 234c, 235c. The shaft 231 then rotates about the rotation axis O of the knob 222 in the above positioned state. When the knob 222 is moved sidewards in the horizontal direction indicated by the arrow X in FIG. 22, the shaft 231 moves in the direction of the arrow X against the force of the compression coil spring 234b of the first urging mechanism 234. When the knob 222 is moved sidewards in the vertical direction indicated by the arrow Y in FIG. 22, the shaft 231 moves in the direction of the arrow Y against the force of the compression coil spring 235b of the second urging mechanism 235. When the force in the horizontal direction and the vertical direction applied to the knob 222 is eliminated, the shaft 231 returns to the original position (initial position) for contacting the first and the second projections 233a, 233b due to the force of the compression coil springs 234b, 235b of the first and the second urging mechanisms 234, 235.

<Movement Restriction Means>

Figure 23:
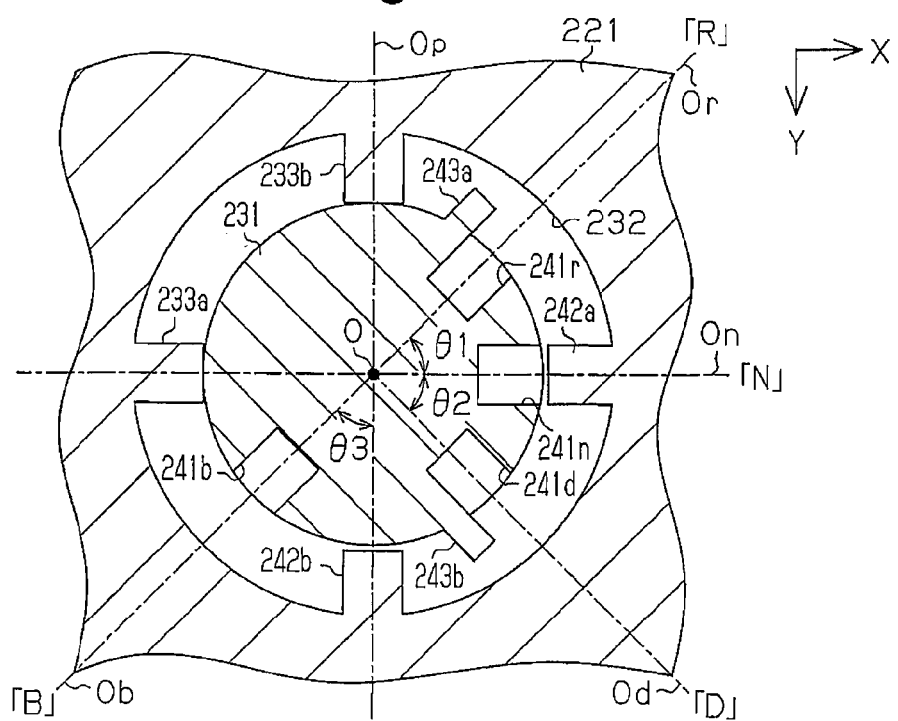
FIG. 23 is a cross-sectional view taken along line 3A-3A of FIG. 21.

The movement restriction means of the fifth embodiment is formed in a manner similar to the first embodiment. That is, four fitting recesses 241r, 241n, 241d, and 241b are formed closer to the knob 222 at the outer surface of the shaft 231, as shown in FIG. 23. The fitting recesses 241r, 241n, and 241d correspond to the three rotation positions of the knob 222, the reverse drive position "R", the neutral position "N", and the forward drive position "D", and the fitting recess 241b corresponds to the manual operation position "B".

In the fifth embodiment, the fitting recess 241b corresponding to the manual operation position "B" is arranged to be adjacent to the fitting recess 241d on the center axis Ob at a predetermined angle θ3 in the right rotation direction of the shaft 231 with respect to the center axis Op orthogonal to the center axis On when the shaft 231 is seen from the axial direction. The predetermined angle θ2 and the predetermined angle θ3 are set to the same value in the fifth embodiment.

When the fitting recess 241d corresponding to the forward drive position "D" is rotated to the position facing the first fitting projection 242a by the rotation of the knob 222, the fitting recess 241b corresponding to the manual operation position "B" faces the second fitting projection 242b. This is because the predetermined angle θ2 and the predetermined angle θ3 are set to the same value.

When the shaft 231 is moved in the direction of the arrow Y through the sideward sliding of the knob 222 with the fitting recess 241d corresponding to the forward drive position "D" facing the first fitting projection 242a, the second fitting projection 242b fits into the fitting recess 241b. The movement in the direction of the arrow Y of the shaft 231 is thereby permitted. If the shaft 231 is moved in the direction of the arrow Y without the fitting recess 241b corresponding to the manual operation position "B" corresponding to the second fitting projection 242b, the distal end of the second fitting projection 242b contacts the outer surface of the shaft 231. The movement in the direction of the arrow Y of the shaft 231 is thereby restricted. When the movement force in the direction of the arrow Y applied to the knob 222 is eliminated, the shaft 231 returns to the original position in the vertical direction at which the outer surface of the shaft 231 contacts the distal end of the second projection 233b by the force of the compression coil spring 235b of the second urging mechanism 235.

At normal times, the indicator 22n corresponding to the neutral position "N" of the knob 222 is held at the position corresponding to the indicator 24a indicating the direction of the arrow X. In this case, the shaft 231 is held in a neutral state in which the fitting recess 241n corresponding to the neutral position "N" faces the first fitting projection 242a. When the shaft 231 is rotated in the right direction by the predetermined angle θ1 through the right rotation of the knob 222 in the neutral state, the fitting recess 241r corresponding to the reverse drive position "R" faces the first fitting projection 242a. When the shaft 231 is rotated by a predetermined angle θ2(θ3) in the left direction in the above neutral state, the fitting recess 241d corresponding to the forward drive position "D" faces the first fitting projection 242a. The fitting recess 241b corresponding to the manual operation position "B" faces the second fitting projection 242b.

Therefore, the sideward sliding in the direction of the arrow X of the knob 222 is permitted only when the knob 222 is rotated to one of the plurality of rotation positions "R", "N", and "D". The sideward sliding in the direction of the arrow Y is also permitted when the knob 222 is rotated to the rotation position "D".

<Stopper>

The stopper of the fifth embodiment is formed similar to the first embodiment. That is, as shown in FIG. 23, first and the second contact walls 243a, 243b (formed in the same manner as the contact walls 54a, 54b of FIG. 7) function as the stopper for restricting the rotation range of the shaft 231 to a predetermined angular range.

<Rotation Restriction Means>

Figure 24:
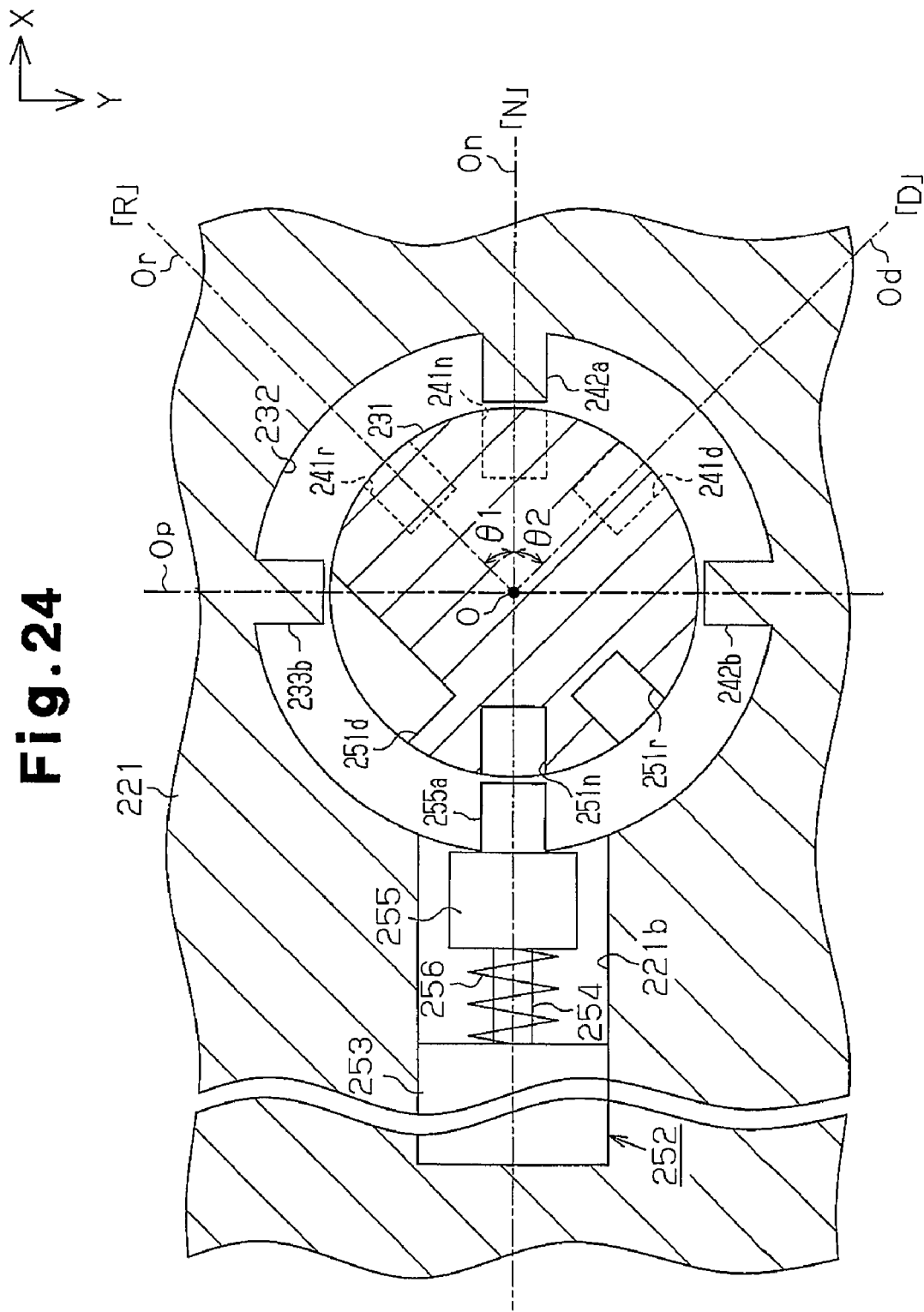
FIG. 24 is a cross-sectional view taken along line 4A-4A of FIG. 21.

As shown in FIGS. 21(a), (b), three engagement recesses 251r, 251n, 251d are formed at predetermined intervals in the circumferential direction of the shaft 231 in the outer surface of the shaft 231 at portions located closer to the knob 222 than the fitting recesses 241r, 241n, 241d, 241b. As shown in FIG. 24, the engagement recesses 251r, 251n, 251d are formed in the outer surface of the shaft 231 at portions opposite the three fitting recesses 241r, 241n, 241d. That is, the engagement recesses 251r, 251n, and 251d are formed in correspondence to the three fitting recesses 241r, 241n, 241d, namely, the reverse drive position "R", the neutral position "N", and the forward drive position "D" when the shaft 231 is seen from the axial direction (rotation axis side of the knob 222).

The engagement recess 251n corresponding to the neutral position "N" is arranged at the portion (left side in FIG. 24) on the center axis On and on the side opposite to the sideward sliding side of the knob 222 indicated by the arrow X when the shaft 31 is seen from its axial direction. The engagement recess 251r corresponding to the reverse drive position "R" is arranged adjacent to the engagement recess 251n on an extension of the center axis Or when the shaft 31 is seen from its axial direction. The engagement recess 251d corresponding to the forward drive position "D" is arranged adjacent to the engagement recess 251n on the extended line of the center axis Od when the shaft 31 is seen from its axial direction. The engagement recess 251n is formed so that its inner bottom surface is orthogonal to the center axis Od and extends away from the engagement recess 251n. Thus, the engagement recess 251r is arranged on the left rotation direction side with respect to the engagement recess 251n, and the engagement recess 251d is arranged on the right rotation direction side with respect to the engagement recess 251n.

A solenoid accommodation portion 221b formed in the housing 221, more specifically, the inner circumferential surface of the insertion hole 232 is arranged with a solenoid mechanism 252 as a rotation restriction means for restricting the rotation of the shaft 231 by engaging each engagement recess 251r, 251n, and 251d or part of the shaft 231. As shown in FIG. 24, the solenoid mechanism 252 includes an exciting coil 253 arranged facing the portion of the shaft 231 formed with each engagement recess 251r, 251n, 251d, and a plunger 254 that moves in a direction (direction of the arrow X) toward the shaft 231 and in a direction (direction opposite to the arrow X) away from the shaft 231 based on the excited state of the exciting coil 253. When the shaft 231 is seen from its axial direction, the exciting coil 253 and the plunger 254 are arranged so that the center axis extending in the movement direction of the plunger 254 and the center axis On extending in the horizontal direction coincide. The exciting coil 253 is accommodated in a solenoid case 253a, and the plunger 254 is arranged extending through a side wall on the shaft 231 side of the solenoid case 253a.

A box-shaped engagement member 255 is coupled to the distal end of the plunger 254, and an engagement projection 255a that engages each engagement recess 251r, 251n, and 251d is formed at the distal end face of the engagement member 255. The engagement projection 255a is arranged so as to be positioned on the center axis On extending in the horizontal direction. Thus, when one of the three fitting recesses 241r, 241n, 241d of the shaft 231 is rotated to the position facing the first fitting projection 242a (see FIG. 23) through rotation of the knob 222, the engagement projection 255a faces one of the three engagement recesses 251r, 251n, 251d. Specifically, when the fitting recess 241n corresponding to the neutral position "N" faces the first fitting projection 242a, the engagement recess 251n corresponding to the neutral position "N" also faces the engagement recess 255a. When the fitting recess 241r corresponding to the reverse drive position "R" faces the first fitting projection 242a, the engagement recess 251r corresponding to the reverse drive position "R" also faces the engagement recess 255a. When the fitting recess 241d corresponding to the forward drive position "D" faces the first fitting projection 242a, the engagement recess 251d corresponding to the forward drive position "D" also faces the engagement recess 255a.

In the plunger 254, a compression coil spring 256 is attached between the basal surface of the engagement member 255 and the side surface of the solenoid case 253a facing the shaft 231. The engagement member 255 is constantly urged toward the shaft 231 by the force of the compression coil spring 256. Thus, if the exciting coil 253 is in a non-excited state, the plunger 254 is projected by the force of the compression coil spring 256 so that the engagement projection 255a engages one of the engagement recesses 251r, 251n, 251d. That is, the solenoid mechanism 252 is in a rotation restriction state of restricting the rotation of the shaft 231 and the knob 222. This holds the rotation position of the knob 222. If the exciting coil 253 is in the excited state, the plunger 254 retracts against the force of the compression coil spring 256. As a result, the engagement state of the engagement projection 255a and one of the engagement recesses 251r, 251n, 251d is disengaged. In other words, the solenoid mechanism 252 is in a rotation permission state for permitting rotation of the shaft 231 and the knob 222. Therefore, the engagement member 255 moves between the rotation restriction position (lock position) at which the engagement projection 255a engages one of the engagement recesses 251r, 251n, 251d, and the rotation permission position (unlock position) at which the engagement state is disengaged according to the presence of current flow to the exciting coil 253.

The sideward sliding in the direction of the arrow Y, which is the operation for determining the manual operation position "B", is permitted even when the knob 222 is shifted to the forward drive position "D" and rotation thereof is restricted. This is because the inner bottom surface of the engagement recess 251d is formed so as to be orthogonal to the center axis Od and extend in a direction away from the engagement recess 251n as described above. According to such structure, the sideward sliding in the direction of the arrow Y is permitted while restricting the rotation of the shaft 231, and furthermore, from the forward drive position "D" to the neutral position "N" or the reverse drive position "R" of the knob 222. The sideward sliding in the direction of the arrow X of the shaft 231, that is, the knob 222 is permitted even when the solenoid mechanism 252 is in the rotation restriction state as described above, that is, when the engagement projection 255a is engaging each engagement recess 251r, 251n, 251d.

<Detection Means>

Figure 21:
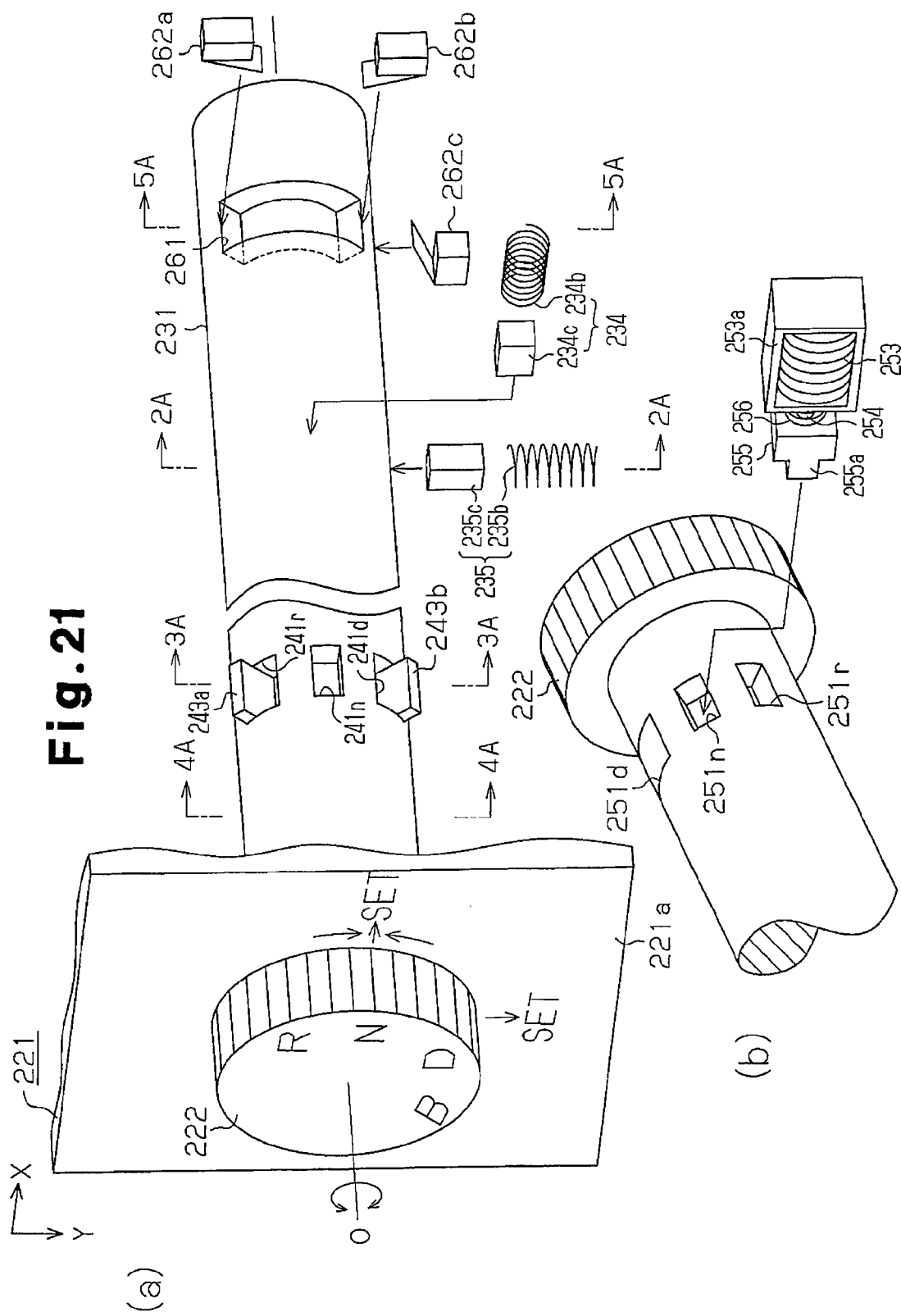
FIGS. 21(a) and 21(b) are schematic exploded perspective views of the gearshift device of the fifth embodiment.

As shown in FIG. 21, a detection means of the fifth embodiment is formed by first to third micro-switches 262a, 262b, 262c and an elongated groove 261 formed in the shaft 231. The first to the third micro-switches 262a, 262b, 262c are the same as the micro-switches 82a, 82b, 82c of the first embodiment, and the elongated groove 261 is the same as the elongated groove 81 (see FIG. 11) of the first embodiment.

As described above, the knob 222 can be moved sidewards in the direction indicated by the arrow Y only when at the forward drive position "D". When the knob 222 is held at the forward drive position "D", the positional relationship between the first to the third micro-switches 262a to 262c and the elongated groove 261 is similar to the positional relationship of FIG. 11(c) described in the first embodiment. Therefore, when the knob 222 is moved sidewards in the direction of the arrow Y, the third micro-switch 262c is pushed by the outer surface of the shaft 231 and activated.

<Electrical Structure>

Figure 25:
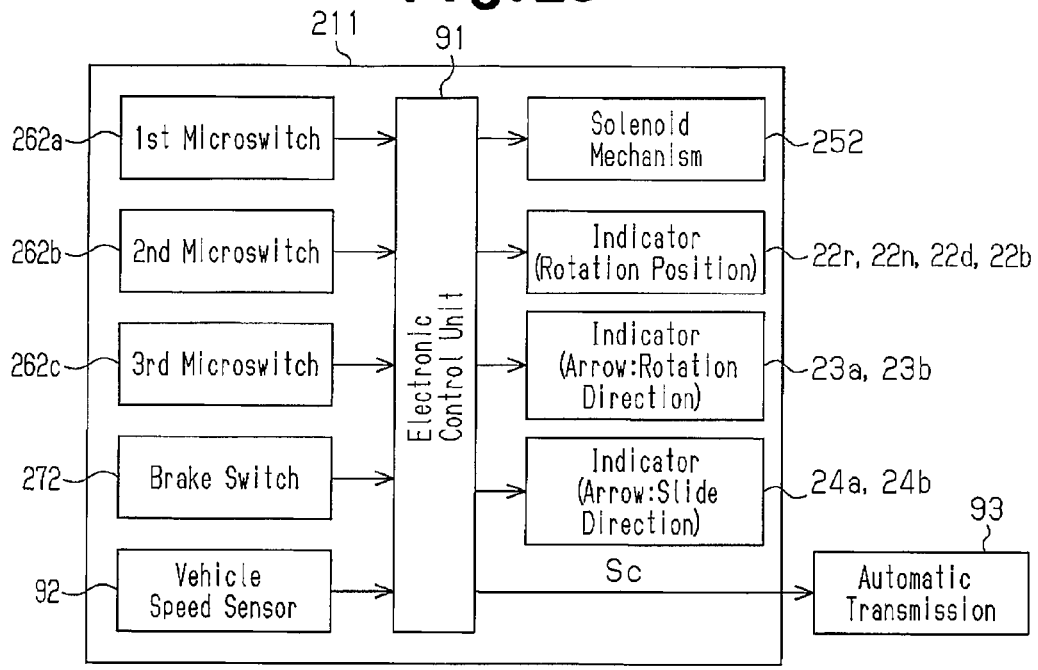
FIG. 25 is a schematic block diagram showing an electrical structure of a gearshift device of the fifth embodiment.

As shown in FIG. 25, the electronic control unit 91 of the fifth embodiment is further connected to a brake switch 272. The brake switch 272 detects the depression of the brake pedal (not shown) to generate a brake signal as the detection signal. The vehicle speed sensor 92 detects the traveling speed of the vehicle and outputs a vehicle speed signal as the detection signal.

The electronic control unit 91 activates the solenoid mechanism 252 based on the vehicle speed signal from the vehicle speed sensor 92 and the brake signal from the brake switch 272. Specifically, if the traveling speed of the vehicle has not reached a predetermined speed determination threshold value and the brake pedal is depressed, the electronic control unit 91 provides the solenoid mechanism 252 an activation control signal for supplying the excitation current to the exciting coil 253 in response to the vehicle speed signal from the vehicle speed sensor 92 and the brake signal from the brake switch 272. The excitation current is supplied to the exciting coil 253 as a result, and the solenoid mechanism 252 is in the rotation permission state in which the engagement with respect to the shaft 231 of the engagement member 255 is disengaged.

When the traveling speed of the vehicle reaches a predetermined speed determination threshold value and the depression of the brake pedal is released, the electronic control unit 91 provides the solenoid mechanism 252 with an activation control signal for stopping the supply of excitation current to the exciting coil 253 in response to the vehicle speed signal and the brake signal. This stops the supply of excitation current to the exciting coil 253, and the solenoid mechanism 252 is in the rotation restriction state in which the engagement member 255 engages the shaft 231.

When receiving the activation signal from the third micro-switch 262c, the electronic control unit 91 determines that the knob 222 is at the forward drive position "D", that is, the manual operation position "B", and that the sideward sliding in the direction of the arrow Y for determining the activation of the vehicle function corresponding to the manual operation position "B" is performed. The electronic control unit 91 then activates the vehicle function corresponding to the manual operation position "B". The activation of the vehicle function corresponding to the manual operation position "B" is based on the assumption that the sideward sliding in the direction of the arrow X is detected to determine the shifting of gears to the gear position corresponding to the forward drive position "D".

Figure 26:
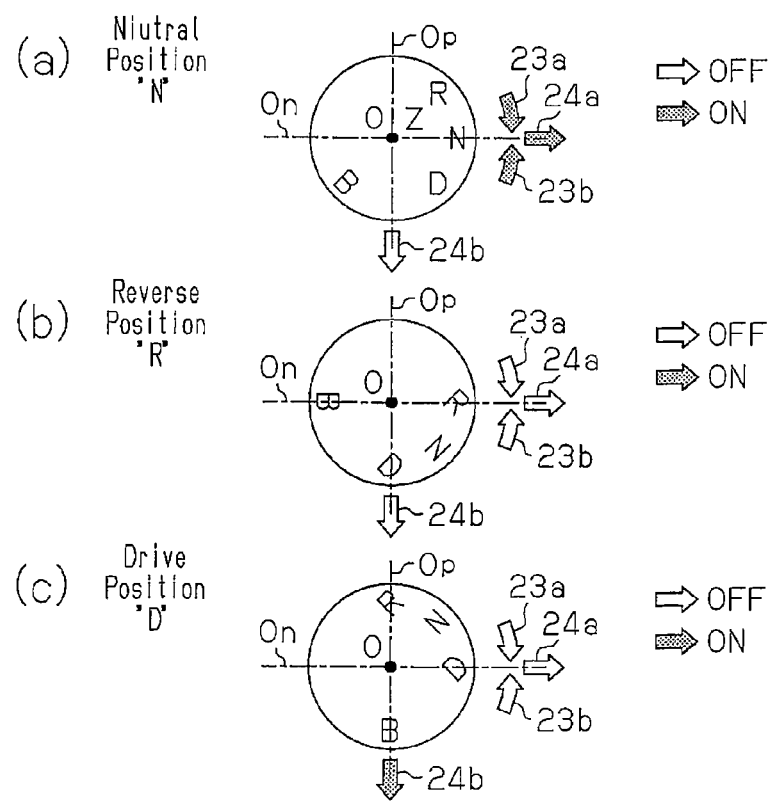
FIG. 26(a) is a front view showing a lighting state of various indicators when an automatic transmission is in a neutral state.
FIG. 26(b) is a front view showing the lighting state of various indicators when the vehicle is moving rearward.
FIG. 26(c) is a front view showing the lighting state of various indicators when the vehicle is moving forward.

As shown in FIG. 26(a), the electronic control unit 91 lights the indicators 23a, 23b, and the indicator 24a when the knob 222 is shifted to the neutral position "N". As shown in FIG. 26(b), the electronic control unit 91 turns OFF all the indicators 23a, 23b, and the indicators 24a, 24b when the knob 222 is shifted to the reverse drive position "R". As shown in FIG. 26(c), the electronic control unit 91 lights only the indicator 24b indicating the movement direction indicated by the arrow Y and turns OFF all the remaining indicators 23a, 23b, and the indicator 24a when the knob 222 is shifted to the forward drive position "D".

The electronic control unit 91 releases the rotation restriction state of the shaft 231 and permits the rotation of the knob 222 if the traveling speed of the vehicle is smaller than the predetermined speed determination threshold value and the brake-pedal is depressed even when the vehicle is moving rearward or moving forward. However, it is not preferable to shift the automatic transmission 93 to the gear position corresponding to the reverse drive position "R" when the vehicle is being driven forward, or to shift the automatic transmission 93 to the gear position corresponding to the forward drive position "D" when the vehicle is being driven rearward. Thus, if the rotation of the knob 222 is actually permitted but the knob 222 is shifted to the reverse drive position "R", all the indicators 23a, 23b indicating the rotation direction of the knob 222 and the indicators 24a, 24b indicating the movement direction are maintained turned OFF. If the knob 222 is shifted to the forward drive position "D", only the indicator 24b indicating the movement direction indicated by the arrow Y of the knob 222 is turned ON, and all the remaining indicators 23a, 23b and the indicator 24a are turned OFF.

However, if the traveling speed of the vehicle is lower than the predetermined speed determination threshold value and the brake pedal is depressed when the vehicle is being driven rearward or moving forward, the indicator indicating the operation direction of the knob 222 actually being permitted may be turned ON. The lighting control of each indicator is appropriately changed and implemented according to the specification etc. of the vehicle.

Operation of the Fifth Embodiment

The operation of the gearshift device 211 of the fifth embodiment will now be described. In the vehicle in the parked state, the drive source for driving is stopped and the gear position of the automatic transmission 93 is held at the parking position. In such a parked state, the gearshift device 211 is held at the initial state. In the initial state, the rotation position of the knob 222 is held at the neutral position "N". The supply of excitation current to the solenoid mechanism 252 is stopped. That is, the solenoid mechanism 252 is held in the rotation restriction state in which the engagement member 255 engages the shaft 231.

<Starting of Drive Source>

When driving the vehicle in the parked state, the user first operates the start switch (not shown) to start the drive source for driving of the vehicle while depressing the brake pedal. The electronic control unit 71 recognizes the depression of the brake pedal based on the brake signal from the brake switch 272 and provides the activation control signal to the solenoid mechanism 252 to supply the excitation current to the exciting coil 253. The plunger 254 of the solenoid mechanism 252 then moves away from the shaft 231. The engagement member 255 moves from the rotation restriction position (lock position) at which the engagement projection 255a and the engagement recess 251n are engaged to the rotation permission position (unlock position) at which the engagement state is disengaged. As a result, the shaft 231 is rotatable relative to the insertion hole 232, and the rotation of the knob 222 is permitted.

Therefore, the user can shift the gear position of the automatic transmission 93 to the desired gear position by operating the knob 222.

<When Moving Rearward>

When driving the vehicle rearward, the user rotates the knob 222 from the neutral position "N" to the reverse drive position "R". The shaft 231 is then movable toward the first fitting projection 42a.

When the knob 222 is moved sidewards as indicated by the indicator 24a to determine the shift to the gear position (gear stage) of the automatic transmission 93 corresponding to the reverse drive position "R" by the user, this is detected by the first and the second micro-switches-262a, 262b. This detection operation is the same as the detection operation of the first embodiment described in FIG. 11(b). That is, the first micro-switch 262a is pushed by the outer surface of the shaft 231, thereby generating the activation signal. The second micro-switch 262b relatively enters the elongated groove 261 thereby generating the deactivation signal.

Therefore, the electronic control unit 91 determines that the sideward sliding is performed in the direction indicated by the indicator 24a at the reverse drive position "R". The electronic control unit 91 generates the gearshift control signal Sc for shifting to the gear position corresponding to the reverse drive position "R" of the knob 222 and provides the same to the automatic transmission 93.

Thereafter, the user releases the parking brake by operating the parking brake switch (not shown) depresses the acceleration pedal (not shown) to drive the vehicle rearward.

When the force applied to the knob 222 is eliminated after the knob 222 is moved sidewards from the reverse drive position "R", the shaft 231 returns to the original position of contacting the first projection 233a by the force of the compression coil spring 234b of the first urging mechanism 234. The knob 222 then returns to the original position in the horizontal direction shown by a solid line in FIG. 20. The rotation position of the knob 222 is held at the reverse drive position "R" when the vehicle is being driven rearward.

The electronic control unit 91 recognizes the traveling speed of the vehicle based on the vehicle speed signal from the vehicle speed sensor 92. When the traveling speed reaches the predetermined speed determination threshold value, the electronic control unit 91 provides the activation control signal to the solenoid mechanism 252 to stop the supply of excitation current to the exciting coil 253. The plunger 254 of the solenoid mechanism 252 then moves in the direction of moving closer to the shaft 231 by the force of the compression coil spring 256. Thus, the engagement member 255 moves to the rotation restriction position (lock position) at which the engagement projection 255a engages the engagement recess 251r of the shaft 231. As a result, the rotation of the shaft 231, that is, the rotation of the knob 222 is restricted. The rotation position of the knob 222 is restricted from being shifted from the reverse drive position "R" to the neutral position "N" or the forward drive position "D" when the vehicle is being driven rearward, and unintended shifting of gears by the user is prevented.

The electronic control unit 91 turns OFF all the indicators 23a, 23b and the indicators 24a, 24b, as shown in FIG. 26(b), when the vehicle is being driven rearward. The user can visually check that the knob 222 cannot be operated to any direction with the indicators. Thus, the knob 222 is prevented from being operated in an unnecessary manner when the vehicle is being driven rearward.

When the brake pedal is depressed and the vehicle is stopped, specifically, when the traveling speed of the vehicle becomes smaller than the predetermined speed determination threshold value, the electronic control unit 91 sets the solenoid mechanism 252 to the rotation permission state in response to the brake signal and the vehicle speed signal. That is, the electronic control unit 91 provides the activation control signal to the solenoid mechanism 252 to supply the excitation current to the exciting coil 253. The plunger 254 of the solenoid mechanism 252 then moves in the direction of moving away from the shaft 231 against the force of the compression coil spring 256. Therefore, the engagement member 255 moves to the rotation permission position (unlock position) described above. The rotation of the shaft 231, that is, the rotation of the knob 222 is permitted as a result. The user then either stops the drive source of the vehicle and gets off from the vehicle, or shifts the gear position of the automatic transmission 93 by operating the knob 222 and again drives the vehicle.

<When Moving Forward>

A case of driving the vehicle forward after driving the vehicle rearward, as described above, will now be described. In this case, the user rotates the knob 222 from the reverse drive position "R" to the forward drive position "D". The fitting recess 241d of the shaft 231 then faces the first fitting projection 242a on the housing 221. Therefore, the shaft 231 is movable to the first fitting projection 242a side.

When the knob 222 is moved sidewards by the user in the direction indicated by the indicator 24a to determine shifting to the gear position (gear stage) of the automatic transmission 93 corresponding to the forward drive position "D", this is detected by the first and the second micro-switches 262a, 262b. The detection operation is the same as the detection operation of the first embodiment described in FIG. 11(c). That is, the first micro-switch 262a relatively enters the elongated groove 261, and thus is not pushed by the shaft 231, and generates the deactivation signal. The second micro-switch 262b is pushed by the outer surface of the shaft 231, thereby generating the activation signal.

Therefore, the electronic control unit 91 determines that the sideward sliding in the direction indicated by the indicator 24a is performed at the forward drive position "D". The electronic control unit 71 generates the gearshift control signal Sc for shifting the gear to the gear position corresponding to the forward drive position "D" of the knob 222, and provides the same to the automatic transmission 93. The user then releases the parking brake by operating the parking brake switch and depresses the acceleration pedal to drive the vehicle forward.

When the force applied to the knob 222 is eliminated, the knob 222 returns to the original position in the horizontal direction shown by the solid line in FIG. 20 in the same manner as when the vehicle is moving rearward. The rotation position of the knob 222 is held at the forward drive position "D" when the vehicle is being driven forward.

When the traveling speed of the vehicle reaches the predetermined speed determination threshold value thereafter, the electronic control unit 91 provides the activation control signal to the solenoid mechanism 252 to stop the supply of excitation current to the exciting coil 253. The plunger 254 of the solenoid mechanism 252 is then moved toward the shaft 231 by the force of the compression coil spring 256. Thus, the engagement member 255 moves to the rotation restriction position (lock position). As a result, the rotation of the shaft 231, that is, the rotation of the knob 222 is restricted. The rotation position of the knob 222 is restricted from being shifted from the forward drive position "D" to the neutral position "N" or the reverse drive position "R" when the vehicle is being driven forward, and unintended shifting of gears by the user is prevented.

When the knob 222 is shifted to the forward drive position "D", the knob 222 is also simultaneously shifted to the manual gear position "B". As described above, only the sideward sliding (lower side) indicated by the indicator 24b is permitted when the knob 222 is shifted to the forward drive position "D". Therefore, the electronic control unit 91 lights only the indicator 24b when the vehicle is being driven forward. The user can visually check that only the sideward sliding indicated by the indicator 24b can be carried out. The knob 222 is prevented from being operated in an unnecessary manner when the vehicle is being driven forward.

As described above, the sideward sliding in the direction indicated by the indicator 24a is actually permitted when the vehicle is being driven forward. However, it is recommended that the sideward sliding in the direction indicated by the indicator 24a of the knob 222 is restricted when the vehicle is being driven forward. Therefore, the sideward sliding is practically restricted by turning OFF the indicator 24a.

When the knob 222 is moved sidewards as indicated by the indicator 24b when the vehicle is being driven forward, the third micro-switch 262c is pushed by the outer surface of the shaft 231 thereby generating the activation signal. When the force applied to the knob 222 is eliminated, the knob 222 returns to the original position in the vertical direction shown by the solid line in FIG. 20 by the force of the compression coil spring 235b of the second urging mechanism 235. The rotation position of the knob 222 is held at the forward drive position "D" (manual operation position "B").

The electronic control unit 91 determines that the knob 222 is moved sideward in the direction indicated by the indicator 24b to execute the vehicle function corresponding to the manual operation position "B" in response to the activation signal from the third micro-switch 262c. The determination is based on the assumption that the activation signal from the third micro-switch 262c is received after the shift to the gear position corresponding to the forward drive position "D", as described above. In the fifth embodiment, a switch function of activating the regenerative brake by the power generating operation of the motor forming the drive source for driving of the vehicle is assigned as the function corresponding to the manual operation position "B". Thus, the regenerative brake is applied by the sideward sliding in the direction indicated by the indicator 24b of the knob 222.

When the brake pedal is depressed and the vehicle is stopped, specifically, when the traveling speed of the vehicle becomes smaller than the predetermined speed determination threshold value, the electronic control unit 91 recognizes this fact based on the brake signal and the vehicle speed signal, and sets the solenoid mechanism 252 in the rotation permission state. The rotation of the knob 222 is then permitted, and the user can shift the knob 222 to an arbitrary rotation position. When the power supply of the vehicle is turned OFF by operating the start switch, the supply of excitation current to the exciting coil 253 is shielded, and thus the solenoid mechanism 252 is in the rotation restriction state of restricting the rotation of the shaft 231.

When driving the vehicle forward while in parking, the knob 222 is shifted from the neutral position "N" to the forward drive position "D", and moved sidewards as indicated by the indicator 24a, similar to the above.

<Neutral State>

A case where the automatic transmission 93 is in the neutral state will now be described. First, the knob 222 is held at the neutral position "N" when the gearshift device 211 is in the initial state in parking. The shaft 231 is movable to the first fitting projection 242a side. The elongated groove 261 of the shaft 231 is held at a position deviated from both the first and the second micro-switches 262a, 262b (similar to FIG. 11(a)).

When the knob 222 is moved sidewards by the user in the direction indicated by the indicator 24a to determine shifting to the gear position of the automatic transmission 93 corresponding to the neutral position "N", this is detected by the first and the second micro-switches 262a, 262b. The first and the second micro-switches 262a, 262b generate the activation signals.

The electronic control unit 91 generates the gearshift control signal Sc for shifting the gear to the gear position corresponding to the neutral position "N" of the knob 222 and provides the same to the automatic transmission 93 in response to the activation signals from both the first and the second micro-switches 262a, 262b. The automatic transmission 93 then shields the power transmission of the drive source for driving of the vehicle.

In the same manner as when the vehicle is driven rearward or forward, as described above, the knob 222 returns to the original position in the horizontal direction shown with the solid line in FIG. 20 by the force of the compression coil spring 234b of the first urging mechanism 234 when the force applied to the knob 22 is eliminated. The rotation position of the knob 222 is held at the neutral position "N".

While the vehicle is stopped, the solenoid mechanism 252 is in the rotation permission state, and only the sideward sliding in the direction indicated by the indicator 24b is restricted. Here, the electronic control unit 91 lights the indicators 23a, 23b and the indicator 24a, and turns OFF only the indicator 24b, as shown in FIG. 26(a). The user can visually check the direction the operation of the knob 222 is permitted and the direction the operation of the knob 222 is restricted based on the lighting state of the indicators. Thus, the knob 222 is prevented from being operated in an unnecessary manner.

When the vehicle is moving rearward or moving forward, the solenoid mechanism 252 is in the rotation restriction state and the rotation position of the knob 222 is held at the reverse drive position "R" or the forward drive position "D", as described above. Thus, when changing the rotation position of the knob 222 to the neutral position "N" when the vehicle is moving rearward or forward, the vehicle is stopped by depressing the brake pedal. The operation condition ("unlock condition") for setting the solenoid mechanism 252 in the rotation permission state is thereby satisfied.

The unlock condition of the solenoid mechanism 252 may be appropriately changed depending on the specification and the like of the vehicle.

The gearshift device 211 of the fifth embodiment has advantages substantially the same as the advantages (1) to (12) of the gearshift device 11 of the first embodiment described above.

It should be apparent to those skilled in the art that the present invention may be embodied in many other specific forms without departing from the spirit or scope of the invention. Particularly, it should be understood that the present invention may be embodied in the following forms.

In each embodiment, the manual operation position "B" is set as one of the rotation positions of the knob 22, but may be omitted. The vehicle function assigned to the manual operation position "B" may be operated by other switches such as paddle switch and steering switch.

The manual operation position "B" may be assigned with a so-called sequential gearshift function of manually shifting the gear position of the automatic transmission 93. In this case, the knob 22 is formed such that the sideward sliding in the direction opposite to the arrow Y is permitted in addition to the sideward sliding in the direction of the arrow Y. For instance, the gear is shifted down when the knob 22 is moved sidewards in the direction of the arrow Y (lower side) and the gear is shifted up when the knob 22 is moved sidewards in the direction opposite to the arrow Y (upper side) with the knob 22 shifted to the forward drive position "D".

If the sideward sliding in the direction of the arrow Y is again performed after the sideward sliding in the direction of the arrow Y is performed to determine the activation of the vehicle function corresponding to the manual operation position "B", the activation of the vehicle function corresponding to the manual operation position "B" is deactivated. In this case, the automatic transmission 93 is shifted to the gear position corresponding to the forward drive position "D" when the knob 22 is moved sidewards in the direction of the arrow Y with the regenerative brake applied as the vehicle function. The task of shifting to the gear position corresponding to the forward drive position "D", for example, from the state in which the vehicle function corresponding to the manual operation position "B" is activated is thereby simplified.

In other words, in each embodiment, the gearshift device 11 includes a so-called momentary (automatic recovery) knob 22. Thus, the knob 22 automatically returns to the original position in the movement direction and the rotation direction when the force applied to the knob 22 is eliminated. Therefore, when deactivating the activation of the regenerative brake and shifting the gear position of the automatic transmission 93 to the position corresponding to the forward drive position "D", the knob 22 needs to be rotated and moved sidewards in the direction of the arrow X. According to the modification described above, the sideward sliding in the direction of the arrow Y merely needs to be performed.

In each embodiment, a push button may be incorporated in the knob 22, and an activation function of a specific in-vehicle equipment may be given to the push button. For instance, a start switch for starting the drive source of the vehicle by pushing may be incorporated in the knob 22. The parking switch for shifting the gear position of the automatic transmission 93 to the parked position may be incorporated in the knob 22. The integration of various switches is thereby achieved, and an installation space of various switches is saved.

In each embodiment, one set of recovery mechanism 40 (44, 45, 46, 47) for returning the knob 22 to the original position in the movement direction when the force in the movement direction of the knob 22 is eliminated is arranged, but plural sets of recovery mechanism 40 may be arranged. In this case, the plural sets of recovery mechanism 40 are arranged at a predetermined interval in the extending direction of the shaft 31. Since the shaft 31 is urged to the direction opposite to the movement direction at plural locations, the shaft 31 can be stably returned to the original position in the movement direction. The shaft 31 can be more stably supported in the insertion hole 32.

In each embodiment, the first and the second contact walls 54a, 54b are arranged on the outer surface of the shaft 31 as the stopper for restricting the rotation of the knob 22 to the predetermined angular range, but may be omitted.

In each embodiment, the indicators 23a, 23b indicating the rotation direction of the knob 22 and the indicators 24a, 24b indicating movement direction are arranged, but may be omitted.

In each embodiment, the electronic control unit 91 lights the indicator indicating the operable direction at different times according to the rotation position of the knob 22 of the indicators 23a, 23b indicating the rotation direction of the knob 22 and the indicators 24a, 24b indicating the movement direction, but such display control may not be performed.

In each embodiment, the knob 22 is moved sidewards in two directions orthogonal to each other, but the directions do not necessarily need to be orthogonal. The two movement directions are set orthogonal to the rotation axis of the knob 22 and in different directions from each other.

In each embodiment, the arrangement positions of the recovery mechanism 40, the four fitting recesses 51r, 51n, 51d, and 51b, the lock 66, and the first to the third microswitches 82a to 82c may be changed in the axial direction of the shaft 31. The arrangement positions of the first and the second fitting projections 52a, 52b, the solenoid mechanism 72, and the elongated groove 81 may be accordingly changed.

In each embodiment, all structures are arranged on the single shaft 31, but the shaft 31 may be divided into a plurality of divided bodies in the axial direction. In this case, the divided bodies are combined to form the single shaft 31. As shown in FIGS. 18(a) and (b), the shaft 31 may be divided into two with the portion formed with the four fitting recesses 51r, 51n, 51d, and 51b as the boundary. In this case, the shaft 31 includes a first divided body 131 coupled to the knob 22, and a second divided body 132 including the fitting recesses 51r, 51n, 51d, and 51b. The first and the second divided bodies 131, 132 are coupled to form the single shaft 31. A fitting 133 including a cylindrical small diameter portion 133a and a plurality of extensions 133b formed on the outer circumferential surface of the small diameter portion 133a is formed at the distal end of the first divided body 131. The plurality of extensions 133b is formed at a predetermined interval in the circumferential direction and so as to extend in the axial direction at the outer circumferential surface of the small diameter portion 133a. In the second divided body 132, a fitting recess 134 corresponding to the outer shape of the fitting 133 is formed on the side surface on the coupling side with respect to the first divided body 131. The first and the second divided bodies 131, 132 are coupled by fitting the fitting 133 to the fitting recess 134. The rotational force of the knob 22 is transmitted to the second divided body 132 through the extensions 133b of the first divided body 131. The first and the second divided bodies 131, 132 thereby integrally rotate. The fitting 133 may be formed on the second divided body 132 side, and the fitting recess 134 may be formed on the first divided body 131 side. The shaft 31 may be divided to three, four, or more portions.

Figure 19:
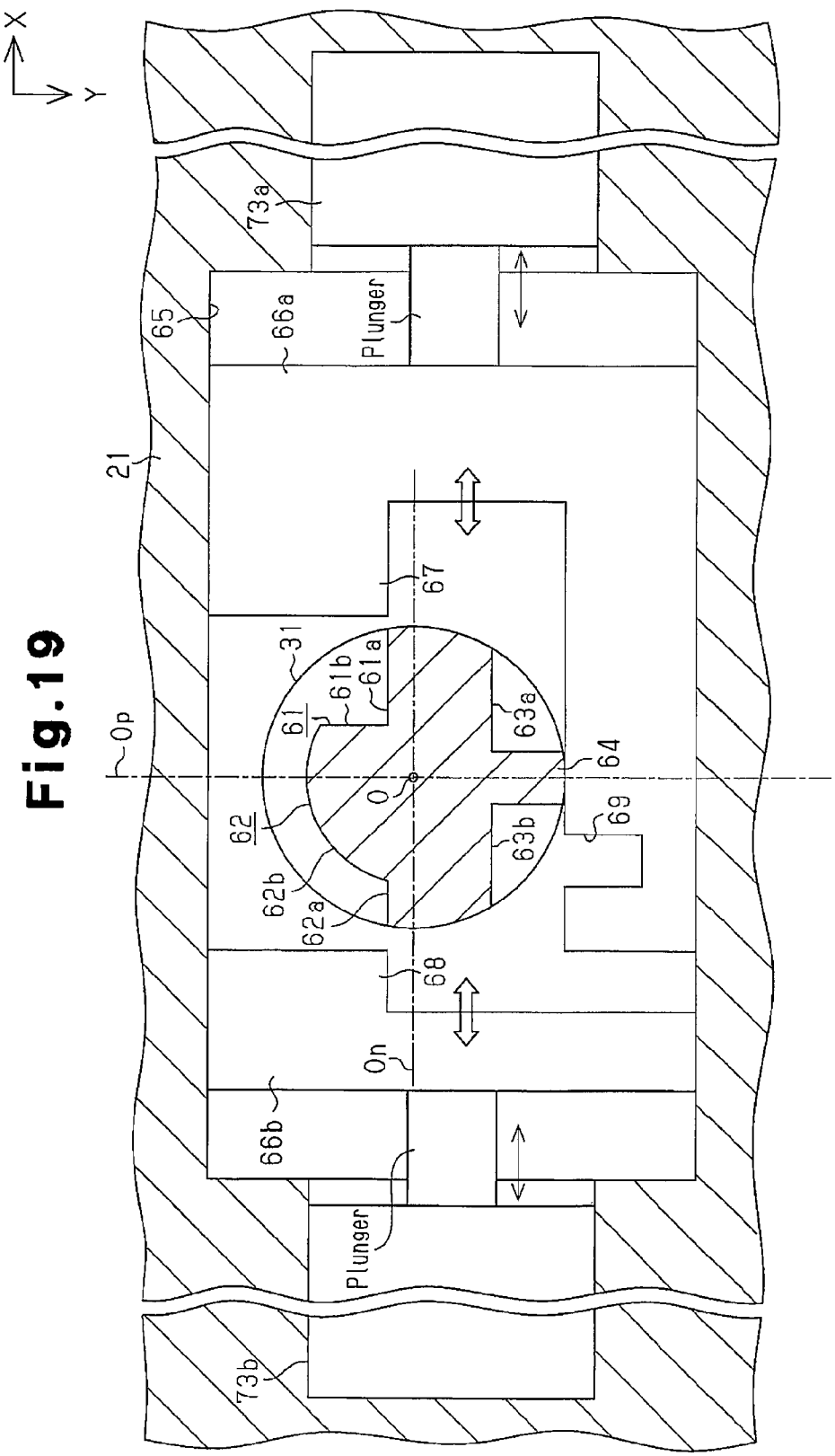
FIG. 19 is a cross-sectional view taken along line 4-4 of FIG. 5 showing the lock according to another embodiment.

In each embodiment, the shaft 31 is inserted into the lock 66 of square frame shape, and the rotation of the shaft 31 is restricted based on the engagement relationship thereof, but the rotation restriction mechanism may be modified as below. As shown in FIG. 19, the lock 66 is divided into a first lock 66a having the first lock strip 67 and the cutout 69, and a second lock 66b having the second lock strip 68. The plunger of the first solenoid mechanism 73a is coupled to the side surface on the arrow X side of the first lock 66a. The plunger of the second solenoid mechanism 73b is coupled to the side surface on the side opposite to the arrow X of the second lock 66b. When restricting the left rotation of the shaft 31, the first lock strip 67 of the first lock 66a is engaged to the first engagement recess 61 of the shaft 31 from the outer side by activating the first solenoid mechanism 73a. When restricting the right rotation of the shaft 31, the second lock strip 68 of the second lock 66b is engaged to the second engagement recess 62 of the shaft 31 from the outer side by activating the second solenoid mechanism 73b. Thus, the lock may be engaged from the outer side of the shaft 31. The rotation of the shaft 31 may be restricted in this case as well. Each plunger of the first and the second solenoid mechanism 73a, 73b is selectively moved to the projected position and the retracted position.

In each embodiment, the lock 66 is arranged as the rotation restriction means for restricting the rotation of the shaft 31, and furthermore, the knob 22, but may be omitted. In this case as well, the operation of the knob 22 in two different directions for the rotation and for the sideward sliding is required when shifting the gear position of the automatic transmission 93. Thus, the unintended gearshift (erroneous operation of the gearshift device 11) of the user is prevented. In this case, the solenoid mechanism 72, the first and the second engagement recesses 61, 62, and the two recesses 63a, 63b may be omitted.

In each embodiment, the gearshift device 11 is applied to the hybrid vehicle having the engine and the motor as the drive source for driving, but may be applied to a vehicle having only the engine as the drive source for driving or an electrical automobile and the like having only the motor as the drive source for driving.

The present examples and embodiments are to be considered as illustrative and not restrictive, and the invention is not to be limited to the details given herein, but may be modified within the scope and equivalence of the appended claims.

What is claimed is:

1. A by-wire gearshift device for shifting gear positions of an automatic transmission for a vehicle, the gearshift device comprising:

a housing fixed to the vehicle;

a shaft-shaped gearshift member arranged in the housing in a partially exposed state so as to be rotatable relative to the housing about a rotation axis and movable sidewards in at least a first direction that intersects the rotation axis, with the gearshift member being rotatable to a plurality of rotation positions respectively corresponding to the gear positions of the automatic transmission;

a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;

a detector which detects movement of the gearshift member in the first direction and generates a first detection signal in accordance with the selected one of the rotation positions; and a control unit which generates and provides the automatic transmission with a gearshift control signal corresponding to the selected one of the rotation positions based on the first detection signal from the detector, wherein the shifting of the gear position requires a two-step operation including rotation of the gearshift member to a rotated position corresponding to the gear position and movement of the gearshift member in the first direction from the rotated position for each of the plurality of rotation positions; and wherein the movement restriction unit includes:
a fitting projection arranged in the housing; and
a plurality of fitting recesses to which the fitting projection is fittable arranged in the gearshift member, in which the quantity of the fitting recesses corresponds to the quantity of the rotation positions, wherein the fitting projection is fittable to a corresponding one of the fitting recesses when the gearshift member is at the selected one of the rotation positions.

2. The gearshift device according to claim 1, wherein:
the plurality of rotation positions include a forward drive position, a neutral position, and a reverse drive position respectively corresponding to three gear positions of the automatic transmission;
the gearshift member is further movable sidewards along a second direction that intersects the rotation axis at a manual operation position corresponding to a specific vehicle function of which activation is enabled when the vehicle is being driven forward;
the movement restriction unit permits movement of the gearshift member in the second direction to determine activation of the specific vehicle function corresponding to the manual operation position only when the gearshift member is rotated to the forward drive position;
the detector further detects movement of the gearshift member in the second direction and generates a second detection signal; and
the control unit activates the specific vehicle function corresponding to the manual operation position when receiving the second detection signal from the detector after receiving the first detection signal indicating the gearshift member being in the forward drive position from the detector.

3. The gearshift device according to claim 1, further comprising:
a plurality of indicators arranged near the gearshift member which indicates a rotation direction and movement direction of the gearshift member;
wherein the controller lights at least one of the indicators indicating the presently operable direction in accordance with the rotation position of the gearshift member.

4. The gearshift device according to claim 1, wherein the gearshift member includes a stopper which engages part of the housing to restrict rotation of the gearshift member within a predetermined angular range, with the plurality of rotation positions being set within the angular range.

5. The gearshift device according to claim 1, further comprising:
a recovery unit which returns the gearshift member to its original position with respect to the first direction when force applied to the gearshift member in the first direction is eliminated.

6. The gearshift device according to claim 1, further comprising:
a magnet arranged on the gearshift member;
wherein the detector includes a plurality of magnetic sensors arranged in the housing in correspondence with the plurality of rotation positions along a path of the magnet formed when the gearshift member is rotated, with each of the magnetic sensors generating the first detection signal in accordance with changes in a magnetic field produced by the magnet at a corresponding one of the rotation positions.

7. The gearshift device according to claim 5, wherein the recovery unit includes:
a pushing rod extending along at least a first direction toward the gearshift member;
a spring which urges the pushing rod in a direction in which the pushing rod comes into contact with the gearshift member.

8. The gearshift device according to claim 5, wherein:
the gearshift member includes a knob exposed from the housing and a shaft having a basal surface, which is connected to the knob, and a distal surface;
the housing includes an inner bottom surface facing toward the distal surface of the shaft, with the inner bottom surface including a guide groove extending parallel to at least the first direction and having an inclined surface inclined toward the shaft from an original position of the gearshift member to a movement terminal position with respect to the movement direction;
the recovery unit includes a guided member engageable with the guide groove and a spring, arranged between the guided member and the distal surface of the shaft, urging the guided member toward the guide groove;
wherein the guided member moves in the guide groove while receiving urging force from the spring when the gearshift member is moved.

9. The gearshift device according to claim 1, further comprising:
at least one guide member arranged in the housing which slides along the gearshift member to guide rotation of the gearshift member.

10. The gearshift device according to claim 1 being configured as a single unit integrally attached to an attachment portion in the vehicle.

11. A by-wire gearshift device for shifting gear positions of an automatic transmission for a vehicle, the gearshift device comprising:
a housing fixed to the vehicle;
a shaft-shaped gearshift member arranged in the housing in a partially exposed state so as to be rotatable relative to the housing about a rotation axis and movable sidewards in at least a first direction that intersects the rotation axis, with the gearshift member being rotatable to a plurality of rotation positions respectively corresponding to the gear positions of the automatic transmission;
a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;
a detector which detects movement of the gearshift member in the first direction and generates a first detection signal in accordance with the selected one of the rotation positions;
a control unit which generates and provides the automatic transmission with a gearshift control signal corresponding to the selected one of the rotation positions based on the first detection signal from the detector;
wherein:
the shifting of the gear position requires a two-step operation including rotation of the gearshift member to a rotated position corresponding to the gear position and movement of the gearshift member in the first direction from the rotated position for each of the plurality of rotation positions;

the gearshift member includes a circumferential surface turned about the rotation axis and a groove having a predetermined length and extending along a circumferential direction of the circumferential direction;

the detector includes a plurality of micro-switches arranged in correspondence with a path formed by the groove as the circumferential surface of the gearshift member turns, with each of the micro-switches generating when the gearshift member is moved in the first direction and in accordance with the selected one of the rotation positions, an activation signal when in contact with the circumferential surface of the gearshift member or a deactivation signal when relatively entering the groove of the gearshift member; and the control unit receives from the micro-switches a plurality of first detection signals, each indicating an activation signal or a deactivation signal, and determines the selected rotation position based on a combination of the first detection signals.

12. A by-wire gearshift device for shifting gear positions of an automatic transmission for a vehicle, the gearshift device comprising:

a housing fixed to the vehicle;

a shaft-shaped gearshift member arranged in the housing in a partially exposed state so as to be rotatable relative to the housing about a rotation axis and movable sidewards in at least a first direction that intersects the rotation axis, with the gearshift member being rotatable to a plurality of rotation positions respectively corresponding to the gear positions of the automatic transmission;

a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;

a detector which detects movement of the gearshift member in the first direction and generates a first detection signal in accordance with the selected one of the rotation positions;

a control unit which generates and provides the automatic transmission with a gearshift control signal corresponding to the selected one of the rotation positions based on the first detection signal from the detector, and a rotation restriction unit including:
    a driver activated in accordance with an activation control signal from the control unit; and
    a lock moved by the activated driver between a rotation restriction position at which the lock engages part of the gearshift member to restrict rotation of the gearshift member and a rotation permission position at which the lock is disengaged from the part of the gearshift member to permit rotation of the gearshift member; and a state detection unit arranged in the vehicle which detects a predetermined vehicle state;

wherein the shifting of the gear position requires a two-step operation including rotation of the gearshift member to a rotated position corresponding to the gear position and movement of the gearshift member in the first direction from the rotated position for each of the plurality of rotation positions; and wherein the control unit provides the driver of the rotation restriction unit with the activation control signal to move the lock from the rotation permission position to the rotation restriction position when the state detection unit detects the predetermined vehicle state.

13. A by-wire gearshift device for shifting gear positions of an automatic transmission for a vehicle, the gearshift device comprising:

a housing fixed to the vehicle;

a shaft-shaped gearshift member arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission;

a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;

a detector which detects movement of the gearshift member in the first direction and generates a first detection signal in accordance with the selected one of the rotation positions;

a movement recovery unit which returns the gearshift member to its original position with respect to the first direction when force applied to the gearshift member in the first direction is eliminated;

a rotation recovery unit which returns the gearshift member to its original position with respect to a rotation direction when force applied to the gearshift member in the rotation direction is eliminated; and a control unit which generates and provides the automatic transmission with a gearshift control signal corresponding to the selected one of the rotation positions based on the first detection signal from the detector, wherein the shifting of the gear position requires a two-step operation including rotation of the gearshift member to a rotated position corresponding to the gear position and movement of the gearshift member in the first direction from the rotated position for each of the plurality of rotation positions and wherein the movement restriction unit includes:
    a fitting projection arranged in the housing; and
    a plurality of fitting recess to which the fitting projection is fittable arranged in the gearshift member, in which the quantity of the fitting recesses is corresponds to the quantity of the rotation positions, wherein the fitting projection is fittable to a corresponding one of the fitting recesses when the gearshift member is at the selected one of the rotation positions.

14. The gearshift device according to claim 13, further comprising:

a plurality of indicators arranged near the gearshift member which indicates a rotation direction and movement direction of the gearshift member;

wherein the controller lights at least one of the indicators indicating the presently operable direction in accordance with the rotation position of the gearshift member.

15. The gearshift device according to claim 13, wherein the gearshift member includes a stopper which engages part of the housing to restrict rotation of the gearshift member within a predetermined angular range, with the plurality of rotation positions being set within the angular range.

16. The gearshift device according to claim 13, further comprising:
a magnet arranged on the gearshift member;
wherein the detector includes a plurality of magnetic sensors arranged in the housing in correspondence with the plurality of rotation positions along a path of the magnet formed when the gearshift member is rotated, with each of the magnetic sensors generating the first detection signal in accordance with changes in a magnetic field produced by the magnet at a corresponding one of the rotation positions.

17. The gearshift device according to claim 13, wherein:
the gearshift member includes a knob exposed from the housing and a shaft having a basal surface, which is connected to the knob, and a distal surface;
the housing includes an inner bottom surface facing toward the distal surface of the shaft, with the inner bottom surface including a guide groove extending parallel to at least the first direction and having an inclined surface inclined toward the shaft from an original position of the gearshift member to a movement terminal position with respect to the movement direction;
the movement recovery unit includes a guided member engageable with the guide groove and a spring urging the guided member toward the guide groove;
wherein the guided member moves in the guide groove while receiving urging force from the spring when the gearshift member is moved.

18. The gearshift device according to claim 13 being configured as a single unit integrally attached to an attachment portion in the vehicle.

19. A by-wire gearshift device for shifting gear positions of an automatic transmission for a vehicle, the gearshift device comprising:
a housing fixed to the vehicle;
a shaft-shaped gearshift member arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission;
a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;
a detector which detects movement of the gearshift member in the first direction and generates a first detection signal in accordance with the selected one of the rotation positions;
a movement recovery unit which returns the gearshift member to its original position with respect to the first direction when force applied to the gearshift member in the first direction is eliminated;
a rotation recovery unit which returns the gearshift member to its original position with respect to a rotation direction when force applied to the gearshift member in the rotation direction is eliminated;
a control unit which generates and provides the automatic transmission with a gearshift control signal corresponding to the selected one of the rotation positions based on the first detection signal from the detector, and
a rotation restriction unit including:
a driver activated in accordance with an activation control signal from the control unit; and
a lock moved by the activated driver between a rotation restriction position at which the lock engages part of the gearshift member to restrict rotation of the gearshift member and a rotation permission position at which the lock is disengaged from the part of the gearshift member to permit rotation of the gearshift member; and
a state detection unit arranged in the vehicle which detects a predetermined vehicle state;
wherein the shifting of the gear position requires a two-step operation including rotation of the gearshift member to a rotated position corresponding to the gear position and movement of the gearshift member in the first direction from the rotated position for each of the plurality of rotation positions; and
wherein the control unit provides the driver of the rotation restriction unit with the activation control signal to move the lock from the rotation permission position to the rotation restriction position when the state detection unit detects the predetermined vehicle state.

20. The gearshift device according to claim 19, wherein:
the rotation restriction position includes:
a first rotation restriction position at which the lock is engaged with a first portion of the gearshift member to restrict rotation of the gearshift member in a forward direction; and
a second rotation restriction position at which the lock engaged with a second portion of the gearshift member to restrict rotation of the gearshift member in a reverse direction;
the rotation permission position is a position at which the lock is disengaged from the first and second portions of the gearshift member to permit rotation of the gearshift member in the forward and reverse directions; and
the lock moves between the first rotation restriction position, the second rotation restriction position, and the rotation permission position by the activated driver.

21. The gearshift device according to claim 19, wherein:
the lock is movable relative to the gearshift member in a direction parallel to the first direction; and
the driver includes a linear drive actuator including:
a solenoid excited by the activation control signal from the control unit; and
a plunger connected to the lock and moved to extend or retract in the movement direction of the lock based on the excited state of the solenoid.

22. The gearshift device according to claim 19, wherein:
the lock is rotatable relative to the gearshift member about the rotation axis; and
the driver includes a rotational drive actuator including:
an output shaft rotated based on the activation control signal from the control unit; and
a transmission mechanism which converts rotational force of the output shaft into rotational force of the lock.

23. The gearshift device according to claim 19, wherein the gearshift member is inserted into the lock, with the part of the gearshift member being engaged with part of the lock when the lock is at the rotation restriction position to restrict rotation of the gearshift member.

24. A by-wire gearshift device for shifting gear positions of an automatic transmission for a vehicle, the gearshift device comprising:
- a housing fixed to the vehicle;
- a shaft-shaped gearshift member arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission;
- a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;
- a detector which detects movement of the gearshift member in the first direction and generates a first detection signal in accordance with the selected one of the rotation positions;
- a movement recovery unit which returns the gearshift member to its original position with respect to the first direction when force applied to the gearshift member in the first direction is eliminated;
- a rotation recovery unit which returns the gearshift member to its original position with respect to a rotation direction when force applied to the gearshift member in the rotation direction is eliminated; and
- a control unit which generates and provides the automatic transmission with a gearshift control signal corresponding to the selected one of the rotation positions based on the first detection signal from the detector;

wherein:
the shifting of the gear position requires a two-step operation including rotation of the gearshift member to a rotated position corresponding to the gear position and movement of the gearshift member in the first direction from the rotated position for each of the plurality of rotation positions;
the plurality of rotation positions include a forward drive position, a neutral position, and a reverse drive position respectively corresponding to three gear positions of the automatic transmission, in which the neutral position corresponds to the original position of the gearshift member with respect to the rotation direction;
the gearshift member is further movable sidewards along a second direction that intersects the rotation axis at a manual operation position corresponding to a specific vehicle function of which activation is enabled when the vehicle is being driven forward;
the movement restriction unit permits movement of the gearshift member in the second direction to determine activation of the specific vehicle function corresponding to the manual operation position only when the gearshift member is held at the neutral position;
the detector further detects movement of the gearshift member in the second direction and generates a second detection signal; and the control unit activates the specific vehicle function corresponding to the manual operation position when receiving the second detection signal from the detector after receiving the first detection signal indicating the gearshift member being in the forward drive position from the detector.

25. A by-wire gearshift device for shifting gear positions of an automatic transmission for a vehicle, the gearshift device comprising:
- a housing fixed to the vehicle;
- a shaft-shaped gearshift member arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission;
- a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;
- a detector which detects movement of the gearshift member in the first direction and generates a first detection signal in accordance with the selected one of the rotation positions;
- a movement recovery unit which returns the gearshift member to its original position with respect to the first direction when force applied to the gearshift member in the first direction is eliminated;
- a rotation recovery unit which returns the gearshift member to its original position with respect to a rotation direction when force applied to the gearshift member in the rotation direction is eliminated; and
- a control unit which generates and provides the automatic transmission with a gearshift control signal corresponding to the selected one of the rotation positions based on the first detection signal from the detector;

wherein:
the shifting of the gear position requires a two-step operation including rotation of the gearshift member to a rotated position corresponding to the gear position and movement of the gearshift member in the first direction from the rotated position for each of the plurality of rotation positions;
the gearshift member includes a circumferential surface turned about the rotation axis and a groove having a predetermined length and extending along a circumferential direction of the circumferential direction;
the detector includes a plurality of micro-switches arranged in correspondence with a path formed by the groove as the circumferential surface of the gearshift member turns, with each of the micro-switches generating when the gearshift member is moved in the first direction and in accordance with the selected one of the rotation positions, an activation signal when in contact with the circumferential surface of the gearshift member or a deactivation signal when relatively entering the groove of the gearshift member; and
the control unit receives from the micro-switches a plurality of first detection signals, each indicating an activation signal or a deactivation signal, and determines the selected rotation position based on a combination of the first detection signals.

26. A by-wire gearshift device for shifting gear positions of an automatic transmission for a vehicle, the gearshift device comprising:
- a housing fixed to the vehicle;
- a shaft-shaped gearshift member arranged in the housing in a partially exposed state so as to be rotatable relative to the housing about a rotation axis and movable sidewards in at least a first direction that intersects the rotation axis, with the gearshift member being rotated to a plurality of rotation positions respectively corresponding to the gear positions of the automatic transmission;

a movement restriction unit arranged between the gearshift member and the housing which permits movement of the gearshift member in the first direction only when the gearshift member is rotated to a selected one of the rotation positions to determine shifting to the gear position corresponding to the selected one of the rotation positions;

a detector which detects movement of the gearshift member in the first direction and generates a first detection signal in accordance with the selected one of the rotation positions;

a movement recovery unit which returns the gearshift member to its original position with respect to the first direction when force applied to the gearshift member in the first direction is eliminated;

a rotation recovery unit which returns the gearshift member to its original position with respect to a rotation direction when force applied to the gearshift member in the rotation direction is eliminated; and a control unit which generates and provides the automatic transmission with a gearshift control signal corresponding to the selected one of the rotation positions based on the first detection signal from the detector, wherein the shifting of the gear position requires a two-step operation including rotation of the gearshift member to a rotated position corresponding to the gear position and movement of the gearshift member in the first direction from the rotated position for each of the plurality of rotation positions; and wherein the movement recovery unit includes;

a slide member through which the gearshift member is inserted into the housing so that the slide member is rotatable relative to the gearshift member and so that the slide member is movable sidewards integrally with the gearshift member; and an urging member arranged between an outer surface of the slide member and an inner surface of the housing which constantly urges the slide member in a direction opposite the movement direction of the gearshift member.

27. The gearshift device according to claim 26, wherein the rotation recovery unit includes:
- a torsion coil spring attached to the shaft of the gearshift member and including two intersecting ends;
- a lock projection extending from the outer surface of the shaft and arranged between the two ends of the torsion coil spring; and
- a spring seat projection arranged to the slide member between the two ends of the torsion coil spring.

* * * * *